United States Patent
Gil et al.

(10) Patent No.: US 10,981,072 B1
(45) Date of Patent: Apr. 20, 2021

(54) MODULAR STACKED MOTION SIMULATION SYSTEM

(71) Applicant: SimEx Inc., Toronto (CA)

(72) Inventors: Alexis Gil, Etobicoke (CA); Salvatore Agosta, Stouffville (CA); Riaz Zahiruddin Kazim, Brampton (CA); Alexandru Mihai Teodorescu, Toronto (CA)

(73) Assignee: Simex Inc., Toronto (CA)

( * ) Notice: Subject to any disclaimer, the term of this patent is extended or adjusted under 35 U.S.C. 154(b) by 0 days.

(21) Appl. No.: 16/668,755

(22) Filed: Oct. 30, 2019

(30) Foreign Application Priority Data

Oct. 18, 2019 (CA) ..................................... 3059189

(51) Int. Cl.
*A63G 31/16* (2006.01)
*E04H 3/30* (2006.01)
*A63G 31/02* (2006.01)
*A63G 7/00* (2006.01)

(52) U.S. Cl.
CPC ............... *A63G 31/16* (2013.01); *A63G 7/00* (2013.01); *A63G 31/02* (2013.01); *E04H 3/30* (2013.01)

(58) Field of Classification Search
CPC ........ A63G 31/00; A63G 31/04; A63G 31/16; E04H 3/00; E04H 3/24; E04H 3/26; E04H 3/30; G09B 9/00; G09B 9/12
USPC .......................... 472/59–61, 130; 434/29, 55
See application file for complete search history.

(56) References Cited

U.S. PATENT DOCUMENTS

| | | |
|---|---|---|
| 5,182,836 A | 2/1993 | Burkat |
| 5,402,730 A | 4/1995 | Salter et al. |
| 5,403,238 A | 4/1995 | Baxter et al. |
| 5,473,990 A | 12/1995 | Anderson et al. |
| 5,583,844 A | 12/1996 | Wolf et al. |
| 5,595,121 A | 1/1997 | Elliott et al. |
| 5,623,878 A | 4/1997 | Baxter et al. |
| 6,007,338 A | 12/1999 | Dinunzio et al. |

(Continued)

FOREIGN PATENT DOCUMENTS

| | | |
|---|---|---|
| CA | 2502519 C | 6/2009 |
| CA | 2793598 C | 10/2015 |

(Continued)

OTHER PUBLICATIONS

US 8,328,651 B2, 12/2012, Howard (withdrawn)

(Continued)

*Primary Examiner* — Kien T Nguyen
(74) *Attorney, Agent, or Firm* — Philip C. Mendes da Costa; Bereskin & Parr LLP/ S.E.N.C.R.L., s.r.l.

(57) ABSTRACT

A motion simulator system includes a display screen and multiple rider motion apparatuses. Each rider motion apparatus supports at least one rider accommodation and is positionable in a ride position facing the display screen. The motion simulator system includes multiple motion bays with an open front end facing the display screen. Each motion bay encloses at least one of the rider motion apparatuses. Multiple motion bays can be stacked facing the same display screen. A subset of the rider motion apparatuses may be activated, even when one or more rider motion apparatuses are in an inactive state. A visual display can be provided on the display screen that is synchronized with motion of the active rider motion apparatuses.

17 Claims, 44 Drawing Sheets

(56) References Cited

U.S. PATENT DOCUMENTS

| | | | |
|---|---|---|---|
| 6,348,004 | B1 | 2/2002 | Houben |
| 6,733,398 | B1 | 5/2004 | Clerx |
| 7,166,032 | B2 | 1/2007 | Smith et al. |
| 7,177,706 | B2 | 2/2007 | Schweizer et al. |
| 7,837,566 | B2 | 11/2010 | Smith et al. |
| 7,987,793 | B2 | 8/2011 | Blonk et al. |
| 8,020,494 | B2 | 9/2011 | Smith et al. |
| 8,360,893 | B2 | 1/2013 | Howard |
| 8,444,496 | B2 | 5/2013 | Lai et al. |
| 8,573,131 | B2 | 11/2013 | Nemeth et al. |
| 8,926,441 | B2 * | 1/2015 | Fox ................. G03B 21/60 472/75 |
| 9,079,109 | B2 | 7/2015 | Buhler |
| 9,289,337 | B2 | 3/2016 | Fritsche et al. |
| 9,463,391 | B2 | 10/2016 | Job et al. |
| 9,631,324 | B2 | 4/2017 | Jalayer et al. |
| 9,757,658 | B1 * | 9/2017 | Kaufmann ............ A63G 1/00 |
| 9,941,779 | B2 | 4/2018 | Paine et al. |
| 2003/0131537 | A1 * | 7/2003 | Krikorian ............ E04H 3/22 52/6 |
| 2004/0092323 | A1 | 5/2004 | Clerx |
| 2005/0145430 | A1 | 7/2005 | Smith et al. |
| 2007/0021845 | A1 | 1/2007 | Schweizer et al. |
| 2007/0082747 | A1 | 4/2007 | Smith et al. |
| 2009/0193997 | A1 | 8/2009 | Payne |
| 2010/0066111 | A1 | 3/2010 | Fritsche et al. |
| 2010/0236444 | A1 | 9/2010 | Blonk et al. |
| 2011/0120340 | A1 | 5/2011 | Smith et al. |
| 2011/0265679 | A1 | 11/2011 | Smith et al. |
| 2011/0319178 | A1 | 12/2011 | Howard |
| 2011/0319179 | A1 | 12/2011 | Howard |
| 2012/0258810 | A1 | 10/2012 | Lai et al. |
| 2015/0161833 | A1 | 6/2015 | Smith |
| 2015/0273348 | A1 | 10/2015 | Job et al. |
| 2016/0222593 | A1 | 8/2016 | Jalayer et al. |
| 2016/0327137 | A1 | 11/2016 | Paine et al. |
| 2017/0072327 | A1 | 3/2017 | Wach |
| 2018/0125172 | A1 | 5/2018 | Chien et al. |
| 2018/0162227 | A1 | 6/2018 | Roodenburg et al. |

FOREIGN PATENT DOCUMENTS

| | | |
|---|---|---|
| CA | 2868662 C | 6/2016 |
| CA | 2973238 A1 | 7/2016 |
| CA | 2984755 A1 | 11/2016 |
| CA | 2907278 | 8/2018 |
| CN | 1753710 A | 3/2006 |
| CN | 1890138 A | 1/2007 |
| CN | 100436207 C | 11/2008 |
| CN | 100441257 C | 12/2008 |
| CN | 202028180 U | 11/2011 |
| CN | 203633605 U | 6/2014 |
| CN | 203916059 U | 11/2014 |
| CN | 203930372 U | 11/2014 |
| CN | 203930373 U | 11/2014 |
| CN | 104870064 A | 8/2015 |
| CN | 107109804 A | 8/2017 |
| CN | 107708826 A | 2/2018 |
| CN | 108065511 A | 5/2018 |

OTHER PUBLICATIONS

English machine translation of CN203930373, published on Nov. 5, 2014.
English machine translation of CN107708826, published on Feb. 16, 2018.
English machine translation of CN203916059 published on Nov. 5, 2014.
English machine translation of CN203633605, published on Jun. 11, 2014.
English machine translation of CN202028published on Nov. 9, 2011.
English machine translation of CN108065511, published on May 25, 2018.
English machine translation of CN107109804, published on Aug. 29, 2017.
English machine translation of CN104870064, published on Aug. 26, 2015.
English machine translation of CN100441257, published on Dec. 10, 2008.
English machine translation of CN100436207, published on Nov. 26, 2008.
English machine translation of CN1890138, published on Jan. 3, 2007.
English machine translation of CN1753710, published on Aug. 29, 2017.
English machine translation of CN203930372, published on Nov. 5, 2014.

* cited by examiner

MODULAR STACKED MOTION SIMULATION SYSTEM

FIELD

The specification relates generally to amusement ride systems, and in particular motion simulator systems for riders viewing a display screen.

INTRODUCTION

The following is not an admission that anything discussed below is part of the prior art or part of the common general knowledge of a person skilled in the art.

U.S. Pat. No. 8,444,496 purports to disclose a lateral dynamic simulation device includes a positioning platform, a motor mechanism and a carriage. The positioning platform has an upright positioned arm. The motor mechanism has multiple degrees of freedom and comprises a base, a platform and a plurality of stretchable bars to join the base and the platform by universal joints. The carriage has a space at the frontal portion for carrying passengers and a back portion at the rear portion. The base of the motor mechanism is fixed to the arm of the positioning platform and the platform of the motor mechanism is fixed to the back portion of the carriage.

U.S. Pat. No. 9,463,391 purports to disclose a motion base, comprising a pivot structure having a pivot point near the center of gravity of the pivot structure; a platform support by the pivot structure, the platform having a generally horizontal position and a generally vertical position; and, a drive for rotating of the pivot structure at the pivot point to move the platform from the generally horizontal position to the generally vertical position.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with an aspect of this disclosure, a motion simulation system can include a plurality of motion bays and a display screen. Each motion bay can include one or more movable rider assemblies configured to support rider accommodations. The rider assemblies can be configured to provide motion to the rider accommodations that is synchronized with a display provided on the display screen. The motion simulator system can independently control the operation of the motion bays and the rider assemblies so that only a subset of the motion bays and/or rider assemblies are actuated at a given time. This may allow the system to continue operations even when one or more bays are non-operational, e.g. undergoing maintenance. The motion simulator system can also operate below capacity while not actuating rider assemblies that do not currently have riders. This may prevent unnecessary wear on the rider assemblies and/or motion bays.

The motion bays can also be arranged in a modular fashion facing the display screen. Multiple motion bays can be stacked vertically and/or horizontally. This may allow the motion simulator system to maximize the space usage within a given venue. This may also facilitate installation of the motion simulator system within existing buildings rather than always requiring purpose-built venues.

In accordance with this aspect, there is provided a motion simulation system comprising:

(a) a display screen;

(b) a plurality of rider motion apparatuses, wherein each rider motion apparatus is configured to support at least one rider accommodation, and each rider motion apparatus is positionable in a ride position with the at least one rider accommodation facing the display screen;

(c) a plurality of motion bays, wherein each motion bay extends between a bay front end that is closer to the display screen than a bay rear end of that bay in a forward-rearward direction, and the bay front end of each motion bay is positioned facing the display, wherein each motion bay encloses a bay set of rider motion apparatuses that includes at least one of the rider motion apparatuses from the plurality of rider motion apparatuses; and (d) a controller coupled to the display and to the motion bays, wherein the controller is configured to provide a motion simulation experience by:

positioning a set of rider motion apparatuses in the ride position, wherein the set of rider motion apparatuses includes at least some of the rider motion apparatuses from the plurality of rider motion apparatuses;

providing a visual display on the display screen, wherein the visual display is visible from each and every rider accommodation when the rider motion apparatus corresponding to that rider accommodation is positioned in the ride position; and controlling motion of the rider accommodations during the visual display to move the rider accommodations supported by the set of rider motion apparatuses in a defined motion sequence, wherein the defined motion sequence is coordinated with the visual display provided on the display screen;

wherein the controller is configured to actuate a subset of the rider motion apparatuses in response to determining that at least one of the rider motion apparatuses is in an inactive state, wherein the subset excludes the at least one of the rider motion apparatuses in the inactive state.

In some embodiments, the controller may be configured to determine that a particular rider motion apparatus is in the inactive state when the particular rider motion apparatus is at least one of nonoperational and unoccupied.

In some embodiments, each rider motion apparatus may be adjustable between a load position and the ride position, where in the load position the rider motion apparatus is fully enclosed within the corresponding motion bay, and in the ride position a front end of the rider motion apparatus extends outward from the bay front end; and the controller can be configured to position only the subset of rider motion apparatuses in the ride position.

In some embodiments, each motion bay can include an openable front door positioned at the bay front end, where the front door is adjustable between an open position and a closed position, where when the front door is in the open position the bay front end is open and the display is visible from an interior of the motion bay, and when the front door is in the closed position the bay front end is closed; at least one motion bay is in an inactive bay state in which all of the rider motion apparatuses in that motion bay are in the inactive state; and the controller can be configured to adjust the front door of the motion bays corresponding to the subset of rider motion apparatuses to the open position and to retain the front door of any motion bays in the inactive bay state in the closed position.

In some embodiments, the plurality of motion bays may include a plurality of vertically stacked motions bays, where the plurality of vertically stacked motions bays includes a first motion bay and a second motion bay, and the first motion bay is above the second motion bay.

In some embodiments, each motion bay may extend between a first lateral bay side and a second lateral bay side in a lateral direction; and, the plurality of motion bays may include a plurality of laterally stacked motions bays, where the plurality of laterally stacked motions bays includes the first motion bay and a third motion bay, and the first lateral bay side of the first motion bay is adjacent to the second lateral bay side of the third motion bay in the lateral direction.

In some embodiments, each motion bay may extend between a first lateral bay side and a second lateral bay side in a lateral direction; and, the plurality of motion bays can include a plurality of laterally stacked motions bays, where the plurality of laterally stacked motions bays comprises a first motion bay and a second motion bay, and the first lateral bay side of the first motion bay is adjacent to the second lateral bay side of the second motion bay in the lateral direction.

In some embodiments, the bay front end of the first motion bay may be forward of the bay front end of the second motion bay.

In some embodiments, the second motion bay may include an extension member that extends laterally across the bay front end of the second motion bay above the at least one rider motion apparatus enclosed by that motion bay; and the extension member extends outwardly from the bay front end of the second motion bay whereby the extension member is positioned to catch debris falling from the second motion bay.

In some embodiments, each motion bay may include an extension member that extends laterally across the bay front end of that motion bay above the at least one rider motion apparatus enclosed by that motion bay; and the extension member can include a feature delivery system positioned to face that motion bay, where the feature delivery system is configured to direct at least one of a fluid element and a scent element towards the at least one rider motion apparatus enclosed by that motion bay.

In some embodiments, each rider accommodation may be positioned forward of the bay front end of the corresponding motion bay when the corresponding rider motion apparatus is positioned in the ride position.

In some embodiments, the motion simulation system may omit any visual obstructions between the display and each rider accommodation in each motion bay when the rider motion apparatus corresponding to that rider accommodation is positioned in the ride position.

In some embodiments, each rider motion apparatus may include: a fixed base having a front end and a rear end, the base including an upper base surface and a track, where the upper base surface extends between the front end and the rear end in a forward-rearward direction and the track extends in the forward-rearward direction; a motion platform that extends between a platform front end and a platform rear end in the forward-rearward direction, where the motion platform is movably mounted on the track and the motion platform is movable along the track in the forward-rearward direction; and a seating assembly that is mounted on the motion platform, where the seating assembly includes at least one user seat having a seat base and a seat back, where each seat base extends between a seat front end and a seat rear end in the forward-rearward direction, and the at least one rider accommodation is defined by the at least one user seat.

In accordance with this aspect, there is also provided a non-transitory computer readable medium having computer-executable instructions stored thereon for configuring a processor to perform a method of controlling a motion simulation system comprising a display screen, a plurality of rider motion apparatuses, wherein each rider motion apparatus is configured to support at least one rider accommodation, and each rider motion apparatus is positionable in a ride position with the at least one rider accommodation facing the display screen, and a plurality of motion bays wherein each motion bay encloses a bay set of rider motion apparatuses that includes at least one of the rider motion apparatuses from the plurality of rider motion apparatuses, wherein the method comprises:

(a) positioning a set of rider motion apparatuses in the ride position, wherein the set of rider motion apparatuses includes at least some of the rider motion apparatuses from the plurality of rider motion apparatuses;

(b) providing a visual display on the display screen, wherein the visual display is visible from each and every rider accommodation when the rider motion apparatus corresponding to that rider accommodation is positioned in the ride position; and (c) controlling motion of the rider accommodations during the visual display to move the rider accommodations supported by the set of rider motion apparatuses in a defined motion sequence, wherein the defined motion sequence is coordinated with the visual display provided on the display screen;

(d) determining that at least one of the rider motion apparatuses is in an inactive state; and (e) actuating only a subset of the rider motion apparatuses in response to determining that the at least one of the rider motion apparatuses is in the inactive state, wherein the subset excludes the at least one of the rider motion apparatuses in the inactive state.

In some embodiments, the method may include determining that a particular rider motion apparatus is in the inactive state when the particular rider motion apparatus is at least one of nonoperational and unoccupied.

In some embodiments, each rider motion apparatus may be adjustable between a load position and the ride position, where in the load position the rider motion apparatus is fully enclosed within the corresponding motion bay, and in the ride position a front end of the rider motion apparatus extends outward from the bay front end; and the method can include positioning only the subset of rider motion apparatuses in the ride position.

In some embodiments, the method may include each motion bay may include an openable front door positioned at the bay front end, where the front door is adjustable between an open position and a closed position, where when the front door is in the open position the bay front end is open and the display is visible from an interior of the motion bay, and when the front door is in the closed position the bay front end is closed; and the method can include determining that at least one motion bay is in an inactive bay state in which all of the rider motion apparatuses in that motion bay are in the inactive bay state; and adjusting the front door of the motion bays corresponding to the subset of rider motion apparatuses to the open position and retaining the front door of any motion bays in the inactive bay state in the closed position.

In accordance with an aspect of this disclosure, a tolerance accommodation member is provided that can be used to mount a motion apparatus to a track. The tolerance accommodation member may have a first connector that attaches to the motion apparatus and a second connector that attaches to an actuator that drives the motion apparatus along the track in a longitudinal direction. An intermediate connector connects the first and second connectors. The intermediate connector can be movably mounted to both the first and second connectors to permit lateral and/or vertical motion between the first and second connectors.

The tolerance accommodation member permits a range of manufacturing tolerances in the track while still enabling the motion apparatus to be mounted to the track. This may simplify track manufacturing and installation and reduce installation costs. The tolerance accommodation member may also allow the motion apparatus to continue operation with debris in the track or with slight changes to the track or motion apparatus due to wear.

In accordance with this aspect, there is provided a user motion apparatus comprising:

(a) a track;

(b) a motion assembly movably mounted to the track, the motion assembly configured to support at least one rider accommodation;

(c) a drive member operable to drive the motion assembly along the track; and (d) a tolerance accommodation member comprising a first connector portion, a second connector portion, and a third connector portion, wherein the first connector portion is fixedly mounted to the motion assembly, the second connector portion is fixedly mounted to the drive member, and the third connector portion extends between the first connector portion and the second connector portion;

wherein the third connector portion is movably mounted to a first end of the first connector portion; and the third connector portion is separately movably mounted to a first end of the second connector portion whereby the first connector portion and the second connector portion are movable relative to one another allowing a distance between the first end of the first connector portion and the first end of the second connector portion to vary thereby accommodating a range of manufacturing tolerances in the track.

In some embodiments, the track may be provided by a support, the support defines an outer support surface, and the track may include an open track section that extends through the outer support surface; and the third connector portion may extend through the open track section, the third connector portion is mounted to the motion support on a first side of the outer support surface, and the third connector portion is mounted to the drive member on a second side of the outer support surface.

In some embodiments, the third connector portion may be movably mounted to the first connector portion by a first movable coupling; the first movable coupling may permit the third connector portion to move relative to the first connector portion in a first direction; the third connector portion may be movably mounted to the second connector portion by a second movable coupling; the second movable coupling may permit the third connector portion to move relative to the second connector portion in a second direction; and the second direction is perpendicular to the first direction.

In some embodiments, the track extends in a forward-rearward direction; the third connector portion may be movably mounted to the first connector portion by a first movable coupling; and the first movable coupling may permit movement in a lateral direction perpendicular to the forward-rearward direction.

In some embodiments, the third connector portion may be movably mounted to the second connector portion by a second movable coupling; and the second movable coupling may permit the third connector portion to move relative to the second connector portion in a vertical direction perpendicular to the forward-rearward direction.

In some embodiments, the third connector portion may be movably mounted to the second connector portion by a second movable coupling; and the second movable coupling may permit the third connector portion to move relative to the second connector portion in a vertical direction.

In some embodiments, the track extends in a forward-rearward direction; the third connector portion may be movably mounted to the first connector portion by a first movable coupling; the first movable coupling may inhibit the third connector portion from moving relative to the first connector portion in the forward-rearward direction; the third connector portion may be movably mounted to the second connector portion by a second movable coupling; and the second movable coupling may inhibit the third connector portion from moving relative to the second connector portion in the forward-rearward direction.

In some embodiments, the third connector portion may be movably mounted to the first connector portion by a first movable coupling, and the first movable coupling may include a sliding bushing.

In some embodiments, the third connector portion may be movably mounted to the second connector portion by a second movable coupling, and the second movable coupling may include a sliding bushing.

In some embodiments, the user motion apparatus may include two track connector assemblies, where each track connector assembly is mounted to the motion assembly and movably mounted to the track.

In some embodiments, the track may be provided by a support, the support has a front end, a rear end, a first lateral side, and a second lateral side, and the support extends between the front end and the rear end in a forward-rearward direction, and between the first lateral side and the second lateral side in a lateral direction; the track extends in the forward-rearward direction; and the tolerance accommodation member and the track connector assemblies may be spaced apart in the lateral direction with the tolerance accommodation member positioned at a location between the two track connector assemblies in the lateral direction.

In some embodiments, the motion assembly may include a plurality of rider accommodations.

In accordance with this aspect, there is also provided a tolerance accommodation member for a user motion apparatus comprising a track, a motion assembly movably mounted to the track, and a drive member operable to drive the motion assembly along a track, wherein the tolerance accommodation member comprises:

(a) a first connector portion that is fixedly mountable to the motion assembly;

(b) a second connector portion that is fixedly mountable to the drive member; and (c) a third connector portion that extends between the first connector portion and the second connector portion;
wherein
the third connector portion is movably mounted to a first end of the first connector portion; and
the third connector portion is separately movably mounted to a first end of the second connector portion whereby the first connector portion and the second connector portion are movable relative to one another allowing a distance between the first end of the first connector portion and the first end of the second connector portion to vary thereby accommodating a range of manufacturing tolerances in the track.

In some embodiments, the track is provided by a support, the support defines an outer support surface, and the track may include an open track section that extends through the outer support surface; and the third connector portion can be shaped to extend through the open track section with the third connector portion mounted to the motion assembly on a first side of the outer support surface and the third connector portion mounted to the drive member on a second side of the outer support surface.

In some embodiments, the third connector portion may be movably mounted to the first connector portion by a first movable coupling; the first movable coupling may permit the third connector portion to move relative to the first connector portion in a first direction; the third connector portion may be movably mounted to the second connector portion by a second movable coupling; the second movable coupling may permit the third connector portion to move relative to the second connector portion in a second direction; and the second direction is perpendicular to the first direction.

In some embodiments, the track extends in a forward-rearward direction; the third connector portion may be movably mounted to the first connector portion by a first movable coupling; and the first movable coupling can be configured to permit movement in a lateral direction perpendicular to the forward-rearward direction when the tolerance accommodation member is installed with the first connector portion fixedly mounted to the motion assembly.

In some embodiments, the third connector portion may be movably mounted to the second connector portion by a second movable coupling; and the second movable coupling may permit the third connector portion to move relative to the second connector portion in a vertical direction perpendicular to the forward-rearward direction.

In some embodiments, the third connector portion may be movably mounted to the second connector portion by a second movable coupling; and the second movable coupling may be configured to permit the third connector portion to move relative to the second connector portion in a vertical direction when the tolerance accommodation member is installed with the second connector portion fixedly mounted to the motion actuator.

In some embodiments, the track extends in a forward-rearward direction; the third connector portion may be movably mounted to the first connector portion by a first movable coupling; the first movable coupling may be configured to inhibit the third connector portion from moving relative to the first connector portion in the forward-rearward direction when the tolerance accommodation member is installed with the first connector portion fixedly mounted to the motion assembly; the third connector portion may be movably mounted to the second connector portion by a second movable coupling; and the second movable coupling may be configured to inhibit the third connector portion from moving relative to the second connector portion in the forward-rearward direction when the tolerance accommodation member is installed with the second connector portion fixedly mounted to the motion actuator.

In some embodiments, the third connector portion may be movably mounted to the first connector portion by a first movable coupling, and the first movable coupling can include a sliding bushing.

In some embodiments, the third connector portion may be movably mounted to the second connector portion by a second movable coupling, and the second movable coupling can include a sliding bushing.

In accordance with an aspect of this disclosure, a track mounting assembly is provided to mount a motion assembly on a track. The track mounting apparatus allows the motion assembly to be moved along the track. The track mounting apparatus includes a first track member connected to the motion assembly and a captive arm connected to the motion assembly. The first track member is mounted on the surface of the track. The first track member includes a coupling section that extends at least partially through the track. The captive arm extends through the track and engages the coupling section at an engagement height. The captive arm may be adjustably mounted to the motion assembly to allow the engagement height to be adjusted on installation and re-adjusted for wear or changes in the track and/or motion platform. This may facilitate installation and extend the usable life of the track and motion assembly.

In accordance with this aspect, there is provided a user motion apparatus comprising:
a track having a front end and a rear end, and an outer track surface;
a motion assembly configured to support at least one rider accommodation;
a mounting assembly configured to movably mount the motion assembly to the outer track surface with the motion assembly movable along the track, the mounting assembly comprising:
a first track member connected to the motion assembly, wherein the first track member is movably mounted to the outer track surface, and the first track member includes a coupling section that extends through the outer track surface; and
a captive arm having a first arm portion connected to the motion assembly and a second arm portion that extends through the outer track surface to an engagement height, wherein the second arm portion is configured to engage the coupling section of the first track member at the engagement height, wherein the second arm portion is configured to maintain engagement with the coupling section of the first track member at the engagement height as the first track member moves along the track whereby the first track member and second track member cooperate to maintain the motion assembly on the track.

In some embodiments, the first arm portion may be connected to the motion assembly by an adjustable connector assembly, and the adjustable connector assembly is usable to adjust the engagement height of the second arm portion.

In some embodiments, the adjustable connector assembly may include a pivot connector connecting the first arm portion and the motion assembly, and the first arm portion may be pivotable about the pivot connector to adjust the engagement height of the second arm portion.

In some embodiments, the adjustable connector assembly may include a pivot limiting member, the pivot limiting member defining a pivot range, and the first arm portion can be prevented from pivoting outside of the pivot range.

In some embodiments, the adjustable connector assembly may include an adjustment limiting member that defines an adjustment range that limits the range of the engagement height.

In some embodiments, the second arm portion may include a wheel shaped to engage the coupling section of the first track member.

In some embodiments, the first track member may include a roller.

In some embodiments, the roller may include a flanged wheel; the flanged wheel may include a wheel section and a flange section; the wheel section may be connected to the motion assembly and mounted to the track on the outer track surface; and the flanged section may extend through the track and defines the coupling section.

In some embodiments, the second arm portion may include a wheel shaped to engage the flanged section.

In accordance with this aspect, there is also provided a mounting assembly for a user motion apparatus comprising a track having an outer track surface and a motion assembly configured to support at least one rider accommodation, the mounting assembly comprising:

a first track member connectable to the motion assembly, wherein the first track member is movably mountable to the outer track surface, and the first track member includes a coupling section shaped to extend through the outer track surface when the first track member is mounted to the outer track surface; and a captive arm having a first arm portion connectable to the motion assembly and a second arm portion shaped to extend through the outer track surface to an engagement height when the first arm portion is connected to the motion assembly, wherein the second arm portion is configured to engage the coupling section of the first track member at the engagement height, wherein the second arm portion is configured to maintain engagement with the coupling section of the first track member at the engagement height as the first track member moves along the track whereby the first track member and second track member cooperate to maintain the motion assembly on the track.

In some embodiments, the mounting assembly may also include an adjustable connector assembly usable to connect the first arm portion to the motion assembly, where the adjustable connector assembly is usable to adjust the engagement height when the first arm portion is connected to the motion assembly.

In some embodiments, the adjustable connector assembly may include a pivot connector, and the first arm portion may be pivotable about the pivot connector to adjust the engagement height of the second arm portion.

In some embodiments, the adjustable connector assembly may include a pivot limiting member, the pivot limiting member defining a pivot range, and the first arm portion may be prevented from pivoting outside of the pivot range.

In some embodiments, the adjustable connector assembly may include an adjustment limiting member that defines an adjustment range that limits the range of the engagement height.

In some embodiments, the second arm portion may include a wheel shaped to engage the coupling section of the first track member.

In some embodiments, the first track member may include a roller.

In some embodiments, the roller may include a flanged wheel; the flanged wheel may include a wheel section and a flange section; the wheel section may be connectable to the motion assembly and mountable to the track on the outer track surface; and the flanged section may extend through the track when the wheel section is mounted to the track on the outer track surface, the flanged section defining the coupling section of the first track member.

In some embodiments, the second arm portion may include a wheel shaped to engage the flanged section.

In accordance with an aspect of this disclosure, a user motion apparatus includes a motion assembly that operates in a load position and an in-use position. The user motion apparatus includes a locking system that secures the motion assembly in each of the load position and the in-use position. The locking system includes separate lock units for the load position and the in-use position.

The motion assembly may be driven between the load position and in-use position by a drive member. The load position lock may include a drive member brake that prevents the drive member from moving. The in-use position lock unit may include a mechanical lock that secures the motion assembly in position directly. The mechanical lock unit can be structured to handle dynamic loading while in the ride position to reduce the impact of load forces due to motion of the motion assembly. This may allow the user motion apparatus to disengage the drive member motion and avoid transferring load forces from motion of the motion assembly to the motor while in the in-use position.

In accordance with this aspect, there is provided a user motion apparatus comprising:

(a) a track extending between a front track end and a rear track end in a forward-rearward direction;

(b) a motion assembly movably mounted to the track, wherein the motion assembly is configured to support at least one rider accommodation, and wherein the motion assembly is movable along the track between a load position and an in-use position and the load position is rearward of the in-use position;

(c) a first lock unit operable to secure the motion assembly in the load position wherein the first lock unit holds the motion assembly in the load position when the first lock unit is engaged, and when the first lock unit is released the motion assembly is movable to the in-use position;

(d) a second lock unit operable to secure the motion assembly in the in-use position wherein the second lock unit holds the motion assembly in the in-use position when the second lock unit is engaged, and when the second lock unit is released the motion assembly is movable to the load position.

In some embodiments, the second lock unit may include a mechanical lock positioned to automatically engage the motion assembly when the motion assembly is moved to the in-use position.

In some embodiments, the track may be provided by a support, the mechanical lock may include a latch mounted to the support and an engagement arm extending from the motion assembly, where the engagement arm is received by the latch member when the motion assembly is moved to the in-use position.

In some embodiments, the user motion apparatus may include a drive member that is movable along the track; where the drive member can be drivingly connected to the motion assembly and the drive member is operable to drive the motion assembly along the track between the load position and the in-use position; and the first lock unit may be adjustable between a locked stated and an unlocked state, in the locked state the first lock unit may prevent the drive member from moving along the track, and in the unlocked state the drive member may be movable along the track.

In some embodiments, the user motion apparatus may include a drive member that is movable along the track; where the drive member can be drivingly connected to the motion assembly and the drive member is operable to drive the motion assembly along the track between the load position and the in-use position; and the first lock unit may be adjustable between a locked stated and an unlocked state, in the locked state the first lock unit may prevent the drive member from moving along the track, and in the unlocked state the drive member may be movable along the track.

In some embodiments, the user motion apparatus may include a rear stop member positioned to engage the motion assembly when the motion assembly is moved to the load position, where the rear stop member prevents the motion assembly from travelling rearward of the load position.

In some embodiments, the user motion apparatus may include a damping member positioned to engage the motion assembly when the motion assembly is moved to the in-use position, where the damping member slows the motion assembly as it reaches the in-use position and prevents the motion assembly from travelling forward of the in-use position.

In some embodiments, the user motion apparatus may include a front stop member positioned to engage the motion assembly when the motion assembly is moved to the in-use position, where the front stop member prevents the motion assembly from travelling forward of the load position.

In some embodiments, the user motion apparatus may include a position sensor positioned proximate the in-use position, where the position sensor is operable to determine whether the motion assembly is positioned in the in-use position.

In some embodiments, the user motion apparatus may include a position sensor positioned proximate the in-use position, where the position sensor is operable to determine whether the motion assembly is positioned in the in-use position.

In some embodiments, when the motion assembly is positioned in the in-use position, the second lock unit may be adjustable between a locked state and an unlocked state, in the locked state the second lock unit may secure the motion assembly in the in-use position and prevent the motion assembly from travelling rearward along the track, and in the unlocked state the motion assembly may be movable rearward along the track; the second lock unit may be biased to the locked state whereby when the motion assembly is moved to the in-use position, the second lock unit automatically secures the motion assembly in the load position; and the second lock unit may be adjustable to the unlocked state in response to a release signal from a remote release override switch.

In some embodiments, the second lock unit may include a mechanical lock positioned to automatically engage the motion assembly when the motion assembly is moved to the in-use position.

In accordance with this aspect, there is also provided a method of controlling a motion assembly configured to support at least one rider accommodation comprising:

(a) positioning the motion assembly in a load position along a track, wherein the track extends between a front end and a rear end in a forward-rearward direction;

(b) securing the motion assembly in the load position using a first lock unit, wherein the first lock unit holds the motion assembly in the load position when the first lock unit is engaged;

(c) releasing the first lock unit;

(d) moving the motion assembly along the track from the load position to an in-use position; and (e) securing the motion assembly in the in-use position using a second lock unit, wherein in operation the second lock unit holds the motion assembly in the in-use position when the second lock unit is engaged.

In some embodiments, the second lock unit may include a mechanical lock, and the method may include securing the motion assembly in the in-use position by automatically engaging the motion assembly with the mechanical lock as the motion assembly is moved to the in-use position.

In some embodiments, the method may include driving the motion assembly along the track using a drive member; and securing the motion assembly in the load position by preventing the drive member from moving along the track using the first lock unit.

In some embodiments, the method may include driving the motion assembly along the track using a drive member; and securing the motion assembly in the load position by preventing the drive member from moving along the track using the first lock unit.

In some embodiments, the method may include damping the forward motion of the motion assembly as the motion assembly reaches the in-use position.

In some embodiments, the method may include releasing the second lock unit; and returning the motion assembly to the load position along the track.

In some embodiments, the method may include transmitting a release signal to the second lock unit from a remote control unit; and releasing the second lock unit in response to the release signal.

In accordance with an aspect of this disclosure, a vehicle safety device includes a momentum lock actuator. The momentum lock actuator can deactivate the momentum lock on the seatbelt realer to permit the seatbelt to move freely on the seatbelt realer. This may facilitate rapid loading and unloading of the vehicle, by allowing users to easily extend and retract the seatbelt during loading. The vehicle safety device also includes a momentum lock sensor that monitors whether the momentum lock is activated or deactivated. The momentum lock sensor can be used to ensure that the vehicle does not operate while the momentum lock is deactivated.

In accordance with this aspect, there is provided a vehicle safety device comprising:

(a) a seat belt mounted to a seat belt reel, wherein the seat belt is extendable from and retractable by the seat belt reel;

(b) a receiver configured to secure the seat belt;

(c) a lock unit movable between a locked position and an unlocked position, wherein in the locked position the lock unit inhibits the seat belt from being extended from the seat belt reel, and in the unlocked position the seat belt is freely movable on the seat belt reel;

(d) a lock control unit operable to move the lock unit from the locked position to the unlocked position; and (e) a lock position sensor operable to monitor the position of the lock unit.

In some embodiments, the lock unit may include a lock member configured to lockingly engage the seat belt, where in the locked position the lock member may engage the seat belt and inhibit motion of the seat belt from the seat belt reel; and the lock control unit may include a release member that is operable to drive the lock member from the locked position to the unlocked position.

In some embodiments, the lock control unit may include a solenoid, and the solenoid may be configured to control the operation of the release member.

In some embodiments, the lock position sensor may include a solenoid monitoring sensor, and the lock position sensor may be operable to determine the position of the lock unit based on the state of the solenoid.

In some embodiments, the lock control unit may be remotely connected to a vehicle controller, where the vehicle controller is operable to control motion of a vehicle on which the vehicle safety device is installed; and operation of the lock control unit may be controlled by signals from the vehicle controller.

In some embodiments, the lock control unit may be configured to receive a load signal from the vehicle controller, the load signal indicating that user loading is occurring; and the lock control unit may be configured to adjust the lock unit to the unlocked position in response to the load signal.

In some embodiments, the lock position sensor may be remotely connected to the vehicle controller; the lock position sensor may be configured to transmit a lock position signal to the vehicle controller indicating whether the lock unit is in the locked position or the unlocked position; and the vehicle controller may be configured to prevent operation of the vehicle in response to determining that the lock position signal indicates that the lock unit is in the unlocked position.

In accordance with this aspect, there is also provided a retractor for a vehicle safety device, the retractor comprising:

(a) a seat belt mounted to a seatbelt real, wherein the seat belt is extendable from and retractable by the seat belt reel;

(b) a lock unit movable between a locked position and an unlocked position, wherein in the locked position the lock unit inhibits the seat belt from being extended from the seat belt reel, and in the unlocked position the seat belt is freely movable on the seat belt reel;

(c) a lock control unit operable to move the lock unit from the locked position to the unlocked position; and (d) a lock position sensor operable to monitor the position of the lock unit.

In some embodiments, the lock unit may include a lock member configured to lockingly engage the seat belt, where in the locked position the lock member may engage the seat belt and inhibit motion of the seat belt from the seat belt reel; and the lock control unit may include a release member that is operable to drive the lock member from the locked position to the unlocked position.

In some embodiments, the lock control unit may include a solenoid, and the solenoid may be configured to control the operation of the release member.

In some embodiments, the lock position sensor may include a solenoid monitoring sensor, and the lock position sensor may be operable to determine the position of the lock unit based on the state of the solenoid.

In some embodiments, the lock control unit may be remotely connected to a vehicle controller, where the vehicle controller is operable to control motion of a vehicle on which the vehicle safety device is installed; and operation of the lock control unit may be controlled by signals from the vehicle controller.

In some embodiments, the lock control unit may be configured to receive a load signal from the vehicle controller, the load signal indicating that user loading is occurring; and the lock control unit may be configured to adjust the lock unit to the unlocked position in response to the load signal.

In some embodiments, the lock position sensor may be remotely connected to the vehicle controller; the lock position sensor may be configured to transmit a lock position signal to the vehicle controller indicating whether the lock unit is in the locked position or the unlocked position; and the vehicle controller may be configured to prevent operation of the vehicle in response to determining that the lock position signal indicates that the lock unit is in the unlocked position.

In accordance with this aspect, there is also provided a method of controlling the operation of a user vehicle, wherein the user vehicle comprises at least one seat, and each seat comprises a vehicle safety device that includes a seat belt mounted to a seat belt reel, the method comprising:

(a) identifying a vehicle activation condition, the vehicle activation condition indicating that the user vehicle is to be moved;

(b) transmitting an activation signal to a lock control unit, wherein the lock control unit is configured to control the operation of a seat belt lock, wherein the lock control unit is configured to adjust the seat belt lock to a locked position in response to the vehicle activation signal, wherein in the locked position the seat belt lock inhibits the seat belt from moving on the seat belt reel;

(c) monitoring a position of the seat belt lock unit;

(d) transmitting the monitored position of the seat belt lock unit to a vehicle controller; and (e) preventing the user vehicle from moving in response to the monitored position indicating that the seat belt lock unit is in an unlocked position.

In some embodiments, the method may include determining that the user vehicle is in a load position; transmitting a lock deactivation signal to the lock control unit in response to determining that the user vehicle is in the load position; in response to the lock deactivation signal adjusting, by the lock control unit, the seat belt lock to the unlocked position, wherein in the unlocked position the seat belt is freely movable on the seat belt reel.

In some embodiments, the lock control unit may include a release member usable to adjust the position of the seat belt lock unit; and the position of the seat belt lock unit may be monitored by monitoring the release member.

In some embodiments, the method may include determining that the seat belt lock is in the locked position; and moving the user vehicle along a track from a load position to an in-use position.

In accordance with an aspect of this disclosure, a motion platform apparatus includes a motion platform that supports a seating assembly. The motion platform is movable along a track between a loading position and an in-use position. The seating assembly can be adjusted between a load position in which the front of each seat is lowered to facilitate loading and a motion position in which the front of each seat is raised. The seating assembly can be adjusted to the motion position prior to moving the motion platform along the track. This may prevent users from dragging their feet along the track as the motion platform moves between the loading position and the in-use position.

The seating assembly may also be mounted so that when the motion platform is in the ride position, the front end of each seat is positioned forward of the front end of the platform and/or track. This may help prevent users from contacting the track or motion platform as the seating assembly moves during a motion simulation experience.

In accordance with this aspect, there is provided a motion platform apparatus comprising:

(a) a fixed base having a front end and a rear end, the base comprising an upper base surface and a track, wherein the upper base surface extends between the front end and the rear end in a forward-rearward direction and the track extends in the forward-rearward direction;

(b) a motion platform that extends between a platform front end and a platform rear end in the forward-rearward direction, wherein the motion platform is movably mounted on the track and the motion platform is movable along the track in the forward-rearward direction; and (c) a seating assembly that is mounted on the motion platform, wherein the seating assembly comprises at least one user seat having a seat base and a seat back, wherein each seat base extends between a seat front end and a seat rear end in the forward-rearward direction;

wherein the motion platform is movable along the track to position the seating assembly in a load position and in an in-use position, wherein the load position of the seating assembly is rearward of the in-use position;

each seat front end is forward of the platform front end; and the seating assembly is mounted to the motion platform underneath the seat base.

In some embodiments, the seating assembly may be adjustable between a load state and a motion state, where in the load state each user seat is positioned in a first orientation, and in the motion state each user seat is positioned in a second orientation, where in the second orientation each user seat is tilted rearwardly relative to the first orientation.

In some embodiments, in the second orientation the seat base may be tilted rearwardly with the seat front end positioned higher than the seat rear end.

In some embodiments, the seating assembly may be configured to be maintained in the motion state while the motion platform moves along the track between the load position and the in-use position.

In some embodiments, when the motion platform is in the load position and the seating assembly is in the load state, the seat front end may be positioned at a first height relative to the motion platform; and when the motion platform moves along the track, the seat front end may be positioned at a second height relative to the motion platform, where the second height is greater than the first height.

In some embodiments, when the seating assembly is positioned in the in-use position, each seat front end may be forward of the front end of the base.

In some embodiments, the seating assembly may be mounted to the motion platform by a movable seat support assembly; and the seat support assembly may be operable to move the seating assembly with at least three degrees of freedom when the seating assembly is positioned in the in-use position.

In some embodiments, the motion platform apparatus may be enclosed within a motion bay, where the motion bay extends between a bay front end and a bay rear end in the forward-rearward direction, and a display screen may be positioned forward of the bay front end; and when the seating assembly is positioned in the in-use position, each seat front end may be forward of the bay front end.

In some embodiments, a motion simulation system may include at least two motion platform apparatuses, the at least two motion platform apparatuses including a first motion platform apparatus and a second motion platform apparatus, where the first motion platform apparatus may be enclosed within a first motion bay, where the first motion bay extends between a first bay front end and a first bay rear end in the forward-rearward direction; the second motion platform apparatus may be enclosed within in a second motion bay, wherein the second motion bay extends between a second bay front end and a second bay rear end in the forward-rearward direction; a display screen may be positioned forward of the first bay front end and the second bay front end; and the first motion bay may be positioned underneath the second motion bay, with the second bay front end forward of the first bay front end.

In some embodiments, the first motion bay may include an extension member that extends laterally across the front end of the base of the first motion bay above the first motion platform; the extension member may include a feature delivery system positioned to face the first motion bay, where the feature delivery system is configured to direct at least one of a fluid element and a scent element to the first motion bay.

In some embodiments, the extension member may extend outwardly from the first motion bay forward of the second bay front end whereby the extension member is positioned to catch debris from the second motion bay.

In accordance with this aspect, there is also provided a motion platform apparatus comprising:

(a) a fixed base having a front end and a rear end, the base comprising an upper base surface and a track, wherein the upper base surface extends between the front end and the rear end in a forward-rearward direction and the track extends in the forward-rearward direction;

(b) a motion platform that extends between a platform front end and a platform rear end in the forward-rearward direction, wherein the motion platform is movably mounted on the track and the motion platform is movable along the track in the forward-rearward direction; and (c) a seating assembly that is mounted to the motion platform, wherein the seating assembly comprises at least one user seat having a seat base and a seat back, wherein each seat base extends between a seat front end and a seat rear end in the forward-rearward direction;

wherein the motion platform is movable along the track to position the seating assembly in a load position and in an in-use position, wherein the load position of the seating assembly is rearward of the in-use position;

the seating assembly is adjustable between a load state and a motion state, wherein in the load state each user seat is positioned in a first orientation, and in the motion state each user seat is positioned in a second orientation, wherein in the second orientation each user seat is tilted rearwardly relative to the first orientation; and the seating assembly is mounted to the motion platform underneath the seat base.

In some embodiments, in the second orientation the seat base may be tilted rearwardly with the seat front end positioned higher than the seat rear end.

In some embodiments, the seating assembly may be configured to be maintained in the motion state while the motion platform moves along the track between the load position and the in-use position.

In some embodiments, when the motion platform is in the load position and the seating assembly is in the load state, the seat front end may be positioned at a first height relative to the motion platform; and when the motion platform moves along the track, the seat front end may be positioned at a second height relative to the motion platform, where the second height is greater than the first height.

In some embodiments, when the seating assembly is positioned in the in-use position, each seat front end may be forward of the front end of the base.

In some embodiments, each seat front end may be forward of the platform front end.

In some embodiments, the seating assembly may be mounted to the motion platform by a movable seat support assembly; and the seat support assembly may be operable to move the seating assembly with at least three degrees of freedom when the seating assembly is positioned in the in-use position.

In some embodiments, the motion platform apparatus may be enclosed within a motion bay, where the motion bay extends between a bay front end and a bay rear end in the forward-rearward direction, and a display screen may be positioned forward of the bay front end; and when the seating assembly is positioned in the in-use position, each seat front end may be forward of the bay front end In accordance with an aspect of this disclosure, a user motion apparatus is positioned within a motion bay. The motion apparatus can move between a load position and a ride position. The motion bay includes a retractable bay wall that is movable between a load position and a motion position. In the load position, the bay wall is retracted to provide access to the motion assembly from the entranceway of the motion bay. In the motion position, the bay wall provides a continuous wall surface along the side of the motion assembly. The continuous wall section may avoid changes in surface textures and pinch points adjacent to the motion assembly as it moves between the load position and the in-use position, which may prevent user injuries. The movable bay wall may thus permit the motion assembly to occupy a greater portion of the motion bay while providing a safe rider experience.

In accordance with this aspect, there is provided a motion platform system comprising:

(a) a motion bay having a bay front end, a bay rear end, a first lateral bay side, and a second lateral bay side opposed to the first lateral bay side, wherein the motion bay extends between the bay front end and the bay rear end in a forward-rearward direction;

(b) a motion platform that is moveably mounted within the motion bay, wherein the motion platform has a platform front end, a platform rear end, a first lateral platform side and a second lateral platform side, wherein the motion platform extends between the platform front end and the platform rear end in the forward-rearward direction, and the motion platform supports at least one rider accommodation;

(c) an entranceway formed in the first lateral side of the motion bay, the entranceway sized to permit riders to enter and exit the motion bay through the entranceway; and (d) a bay wall that is movably mounted on the first lateral bay side, wherein the bay wall is movable between a wall load position and a wall motion position;

wherein the motion platform is movable along a platform motion path between a load position and an in-use position, wherein the platform motion path extends in the forward-rearward direction, the in-use position is proximate the bay front end, and the load position is rearward of the in-use position;

the entranceway is adjacent to a portion of the platform motion path;

in the wall motion position, the bay wall defines a continuous wall section adjacent to the first lateral platform side throughout the platform motion path, wherein the continuous wall section separates the motion platform from the entranceway; and in the wall load position, the bay wall is receded to provide access from the entranceway to the motion platform.

In some embodiments, the bay wall may be adjustable between the wall load position and the wall motion position when the motion platform is in the load position; and the bay wall may be positioned in the wall motion position prior to the motion platform being moved to the in-use position.

In some embodiments, the motion platform may only be movable between the load position and the in-use position when the bay wall is positioned in the wall motion position.

In some embodiments, the entranceway may be located proximate the bay front end; and the wall load position may be rearward of the wall motion position.

In some embodiments, when the bay wall is positioned in the wall motion position, the bay wall may define a continuous wall section extending from the load position of the seating assembly to the bay front end.

In some embodiments, the motion platform system may include a retractable front door, where the front door is adjustable between an open position in which the bay front end is open and a closed position in which the bay front end is closed by the front door.

In some embodiments, the bay wall and the retractable front door may share a track section.

In some embodiments, the motion platform system may include a wall position sensor operable to monitor a position of the bay wall; and a door control unit in communication with the wall position sensor, where the door control unit may be configured to prevent the front door from opening when the bay wall is in the wall load position.

In some embodiments, the motion platform system may include: a front door position sensor operable to monitor a position of the front door; and a wall control unit in communication with the front door position sensor, where the wall control unit may be configured to prevent the bay wall from moving to the wall load position unless the front door is in the closed position.

In some embodiments, the motion platform system may include a wall position sensor operable to monitor a position of the bay wall; and a control unit in communication with the position sensor, where the control unit may be configured to prevent the motion platform from moving to the in-use position unless the bay wall is in the wall motion position.

In some embodiments, the bay wall may be spaced apart from the first lateral platform side of the motion platform by less than 18 inches when the bay wall is in the wall load position.

In some embodiments, the bay wall may be spaced apart from the first lateral platform side of the motion platform by less than 12 inches when the bay wall is in the wall load position.

Also in accordance with this aspect, there is provided a user motion system comprising:

(a) a motion bay having a bay front end, a bay rear end, a first lateral bay side, and a second lateral bay side opposed to the first lateral bay side, wherein the motion bay extends between the bay front end and the bay rear end in a forward-rearward direction;

(b) a motion assembly that is moveably mounted within the motion bay, wherein the motion assembly has an assembly front end, an assembly rear end, a first lateral assembly side and a second lateral assembly side, wherein the motion assembly extends between the assembly front end and the assembly rear end in the forward-rearward direction, and the motion assembly supports at least one rider accommodation;

(c) an entranceway formed in the first lateral side of the motion bay, the entranceway sized to permit riders to enter and exit the motion bay through the entranceway; and (d) a bay wall that is movably mounted on the first lateral bay side, wherein the bay wall is movable between a wall load position and a wall motion position;

wherein the motion assembly is movable along an assembly motion path between a load position and an in-use position, wherein the assembly motion path extends in the forward-rearward direction, the in-use position is proximate the bay front end, and the load position is rearward of the in-use position;

the entranceway is adjacent to a portion of the assembly motion path;

in the wall motion position, the bay wall defines a continuous wall section adjacent to the first lateral assembly side, wherein the continuous wall section separates the motion assembly from the entranceway; and in the wall load position, the bay wall is receded to provide access from the entranceway to the motion assembly.

In some embodiments, the bay wall may be adjustable between the wall load position and the wall motion position when the motion assembly is in the load position; and the bay wall may be positioned in the wall motion position prior to the motion assembly being moved to the in-use position.

In some embodiments, the motion assembly may only be movable between the load position and the in-use position when the bay wall is positioned in the wall motion position.

In some embodiments, the entranceway may be located proximate the bay front end; and the wall load position may be rearward of the wall motion position.

In some embodiments, when the bay wall is positioned in the wall motion position, the bay wall may define a continuous wall section extending from the load position of the motion assembly to the bay front end.

In some embodiments, the user motion system may include a retractable front door, where the front door is adjustable between an open position in which the bay front end is open and a closed position in which the bay front end is closed by the front door.

In some embodiments, the bay wall and the retractable front door may share a track section.

In some embodiments, the user motion system may include a wall position sensor operable to monitor a position of the bay wall; and a door control unit in communication with the wall position sensor, where the door control unit is configured to prevent the front door from opening when the bay wall is in the wall load position.

In some embodiments, the user motion system may include a front door position sensor operable to monitor a position of the front door; and a wall control unit in communication with the front door position sensor, where the wall control unit is configured to prevent the bay wall from moving to the wall load position unless the front door is in the closed position.

In some embodiments, the user motion system may include a wall position sensor operable to monitor a position of the bay wall; and a control unit in communication with the position sensor, where the control unit is configured to prevent the motion assembly from moving to the in-use position unless the bay wall is in the wall motion position.

In some embodiments, the bay wall may be spaced apart from the first lateral assembly side of the motion assembly by less than 18 inches when the bay wall is in the wall load position.

In some embodiments, the bay wall may be spaced apart from the first lateral assembly side of the motion assembly by less than 12 inches when the bay wall is in the wall load position.

It will be appreciated by a person skilled in the art that an apparatus, system or method disclosed herein may embody any one or more of the features contained herein and that the features may be used in any particular combination or sub-combination.

These and other aspects and features of various embodiments will be described in greater detail below.

DRAWINGS

For a better understanding of the described embodiments and to show more clearly how they may be carried into effect, reference will now be made, by way of example, to the accompanying drawings in which.

Figure 1:
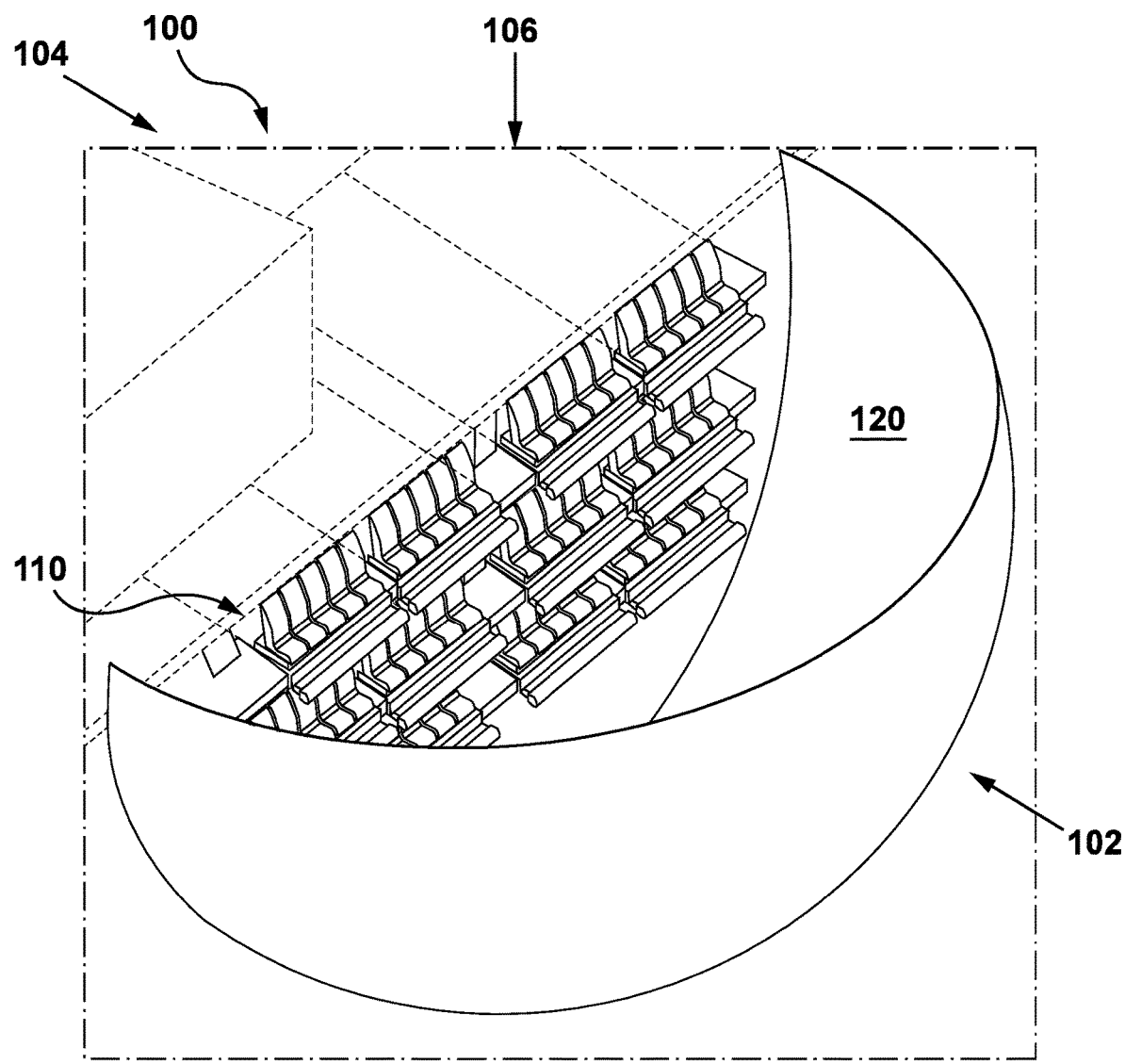
FIG. 1 is a top perspective view of an example motion simulator installation in accordance with an embodiment.
Figure 2:
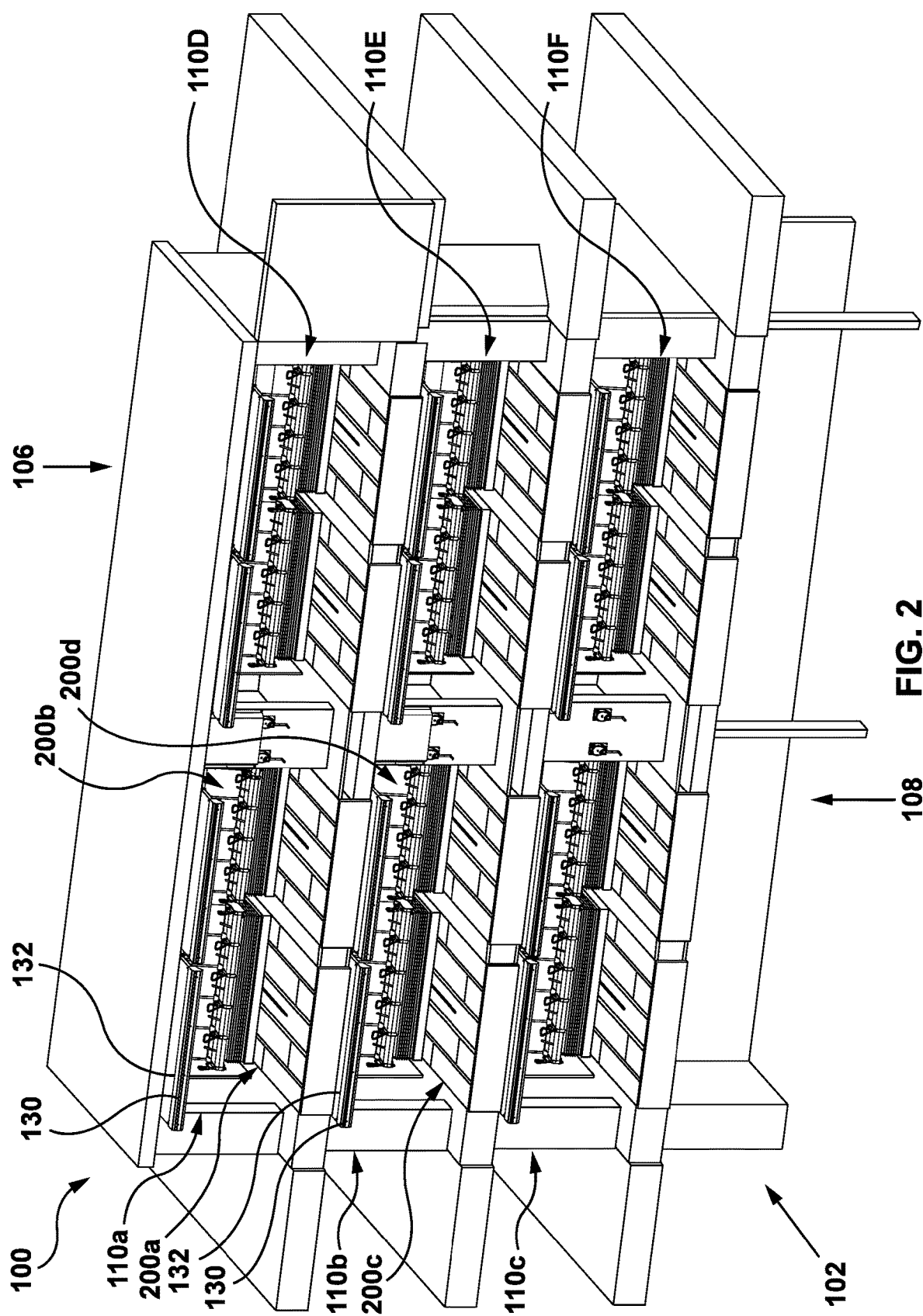
FIG. 2 is a front perspective view of an example seating installation that may be used with the motion simulator installation of FIG. 1 in accordance with an embodiment.
Figure 3:
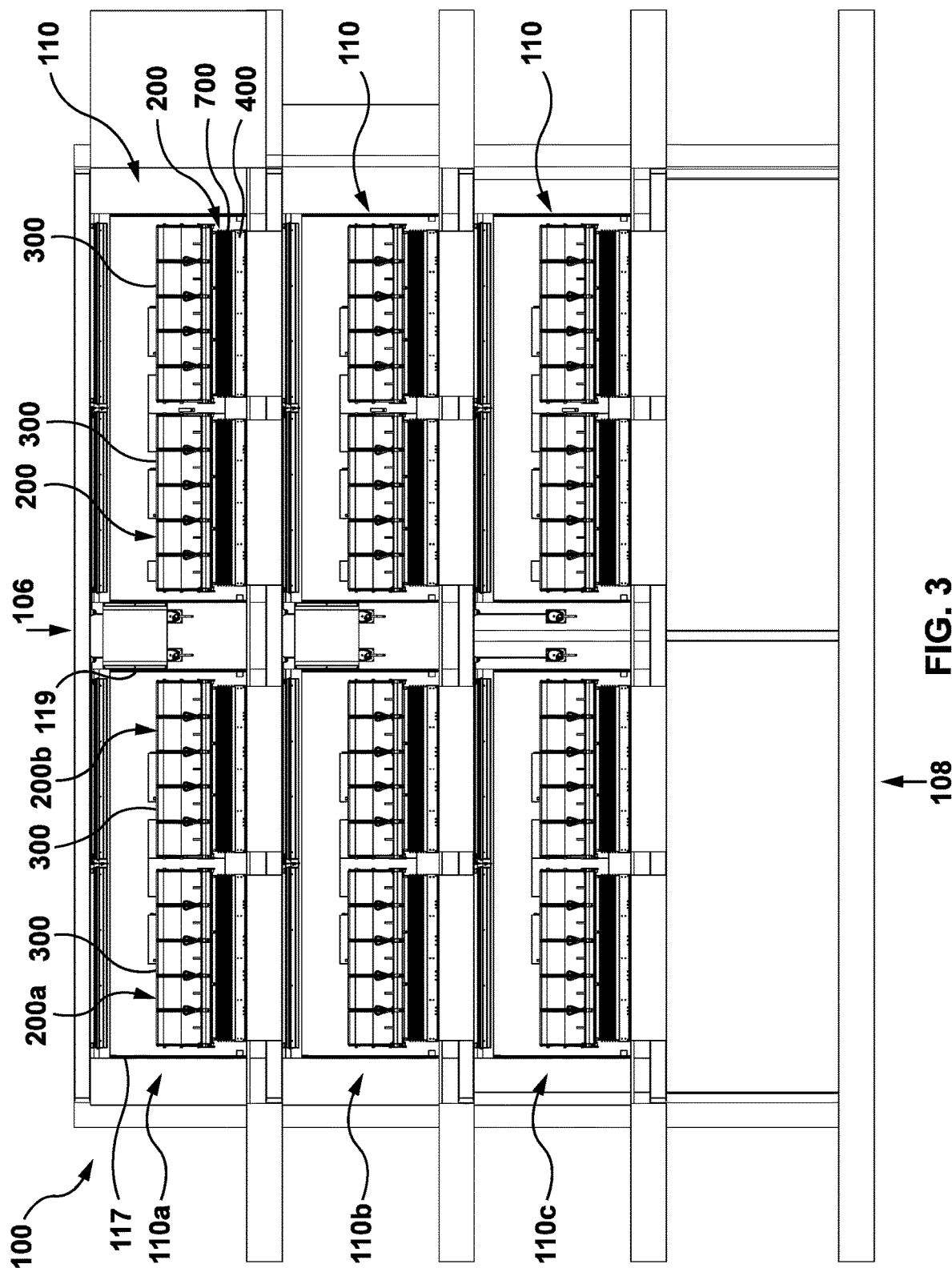
FIG. 3 is a front view of the example seating installation of FIG. 2.

The drawings included herewith are for illustrating various examples of systems, methods, and apparatuses of the teaching of the present specification and are not intended to limit the scope of what is taught in any way.

DESCRIPTION OF VARIOUS EMBODIMENTS

Various apparatuses, systems, and methods are described below to provide an example of an embodiment of each claimed invention. No embodiment described below limits any claimed invention and any claimed invention may cover apparatuses and methods that differ from those described below. The claimed inventions are not limited to apparatuses, systems, and methods having all of the features of any one apparatuses, systems, and methods described below or to features common to multiple or all of the apparatuses, systems, or methods described below. It is possible that an apparatuses, systems, or methods described below is not an embodiment of any claimed invention. Any invention disclosed in an apparatus, system, or method described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

Modular Stacked Motion Simulator System

Referring to FIGS. 1-51, shown there is an example motion simulator system 100. Motion simulator system 100 is an example of a motion simulator system that can be deployed in a modular manner. The components of motion simulator system 100 may facilitate installation in venues of varying size, including retro-fit installations in existing venues as well as installations within purpose-built venues.

Motion simulator system 100 can include a display 120 and at least one motion assembly positioned to face the display. The motion assembly can support at least one rider accommodation 290 for a user of the motion simulator system 100. The motion assembly can be configured to provide a motion simulation experience to a user positioned in the rider accommodation 290 that is coordinated with a visual display provided by display 120.

The motion simulator system 100 may also include additional output components, such as one or more speakers to provide audio output. In some cases, motion simulator system 100 can include additional effect components to provide effects such as wind effects, misting effects, and odor effect. The components of the motion simulator system 100 can be controller to provide a coordinated/synchronized motion simulation experience to a user positioned in a rider accommodation 290.

In the example illustrated, the motion simulator system 100 can include at least one motion compartment or pod or bay 110. Each motion bay 110 can be positioned to face the display 120.

Figure 4:
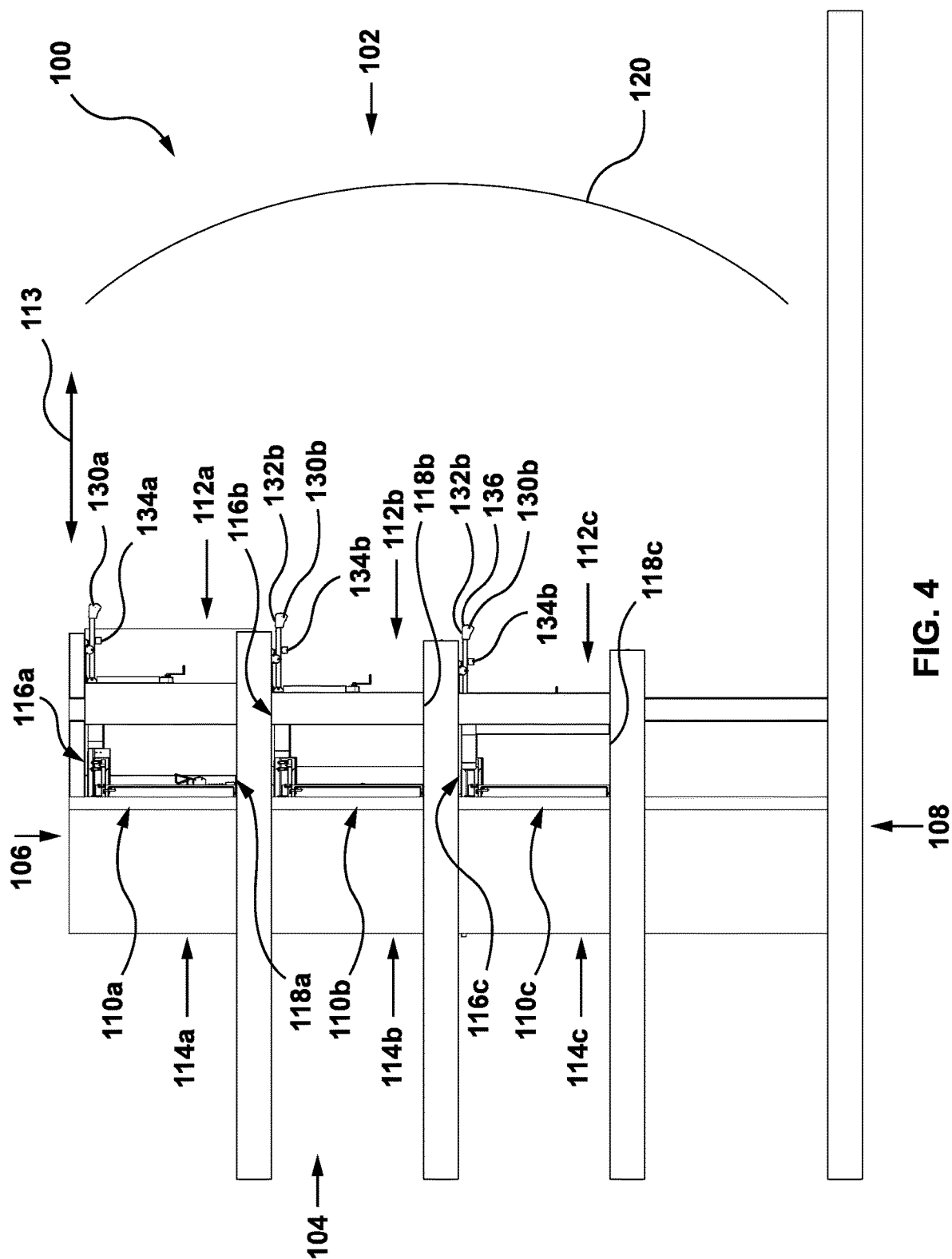
FIG. 4 is a side view of the example seating installation of FIG. 2.
Figure 5:
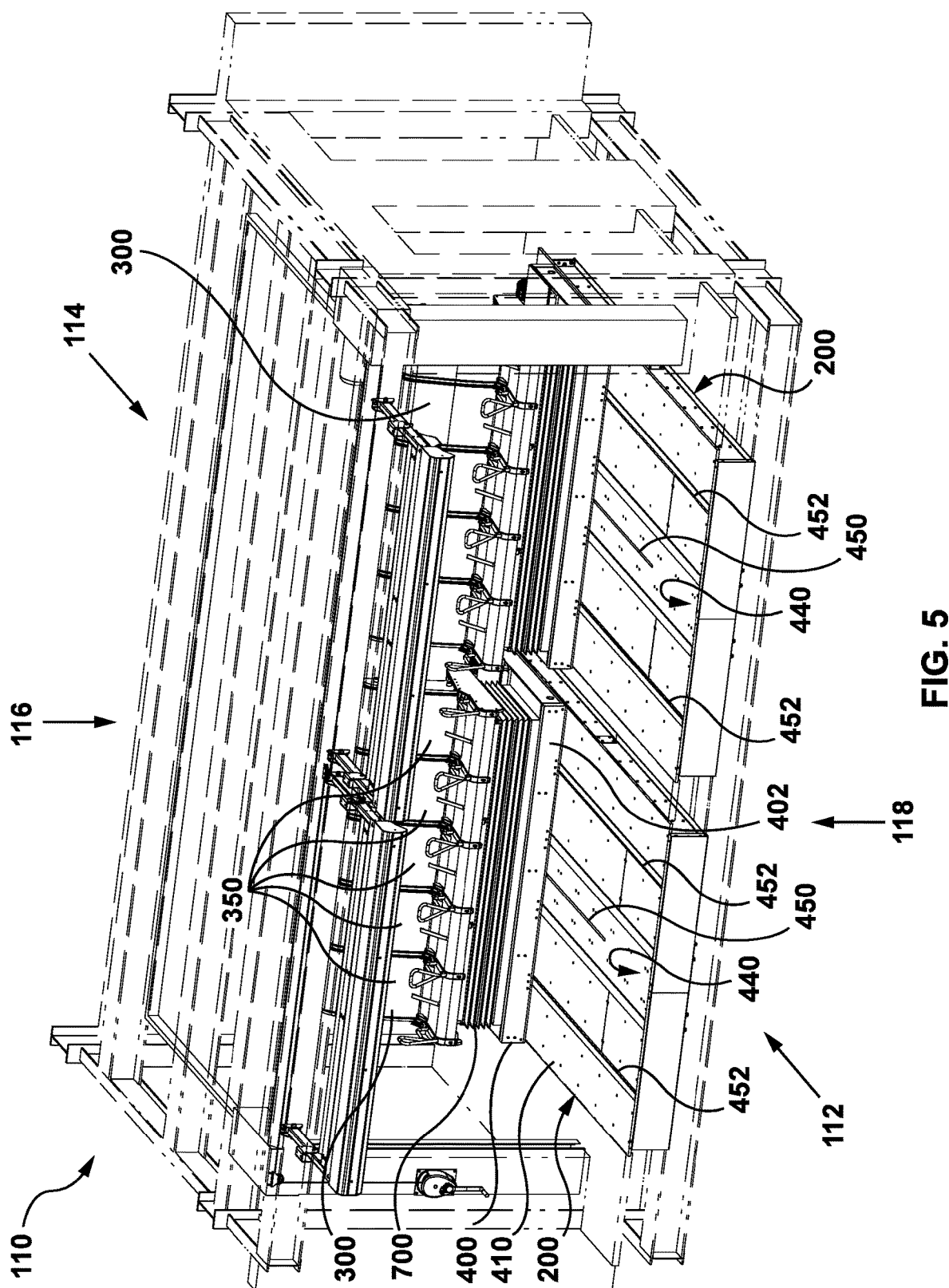
FIG. 5 is a front perspective view of an example motion platform system that may be used with the motion simulator installation of FIG. 1 in accordance with an embodiment.
Figure 6:
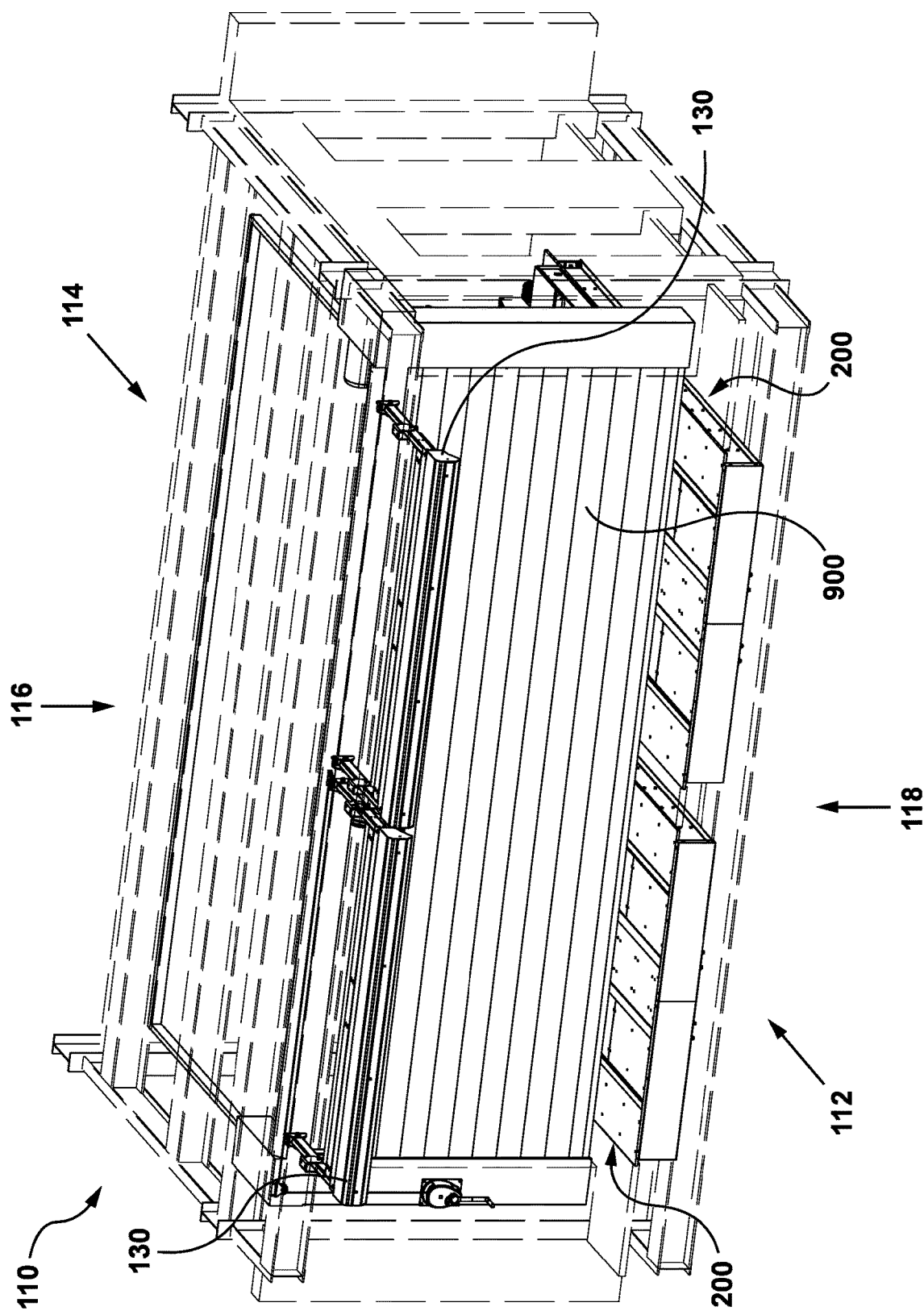
FIG. 6 is a front perspective view of the example motion platform system of FIG. 5 with a front door in a closed position in accordance with an embodiment.
Figure 7:
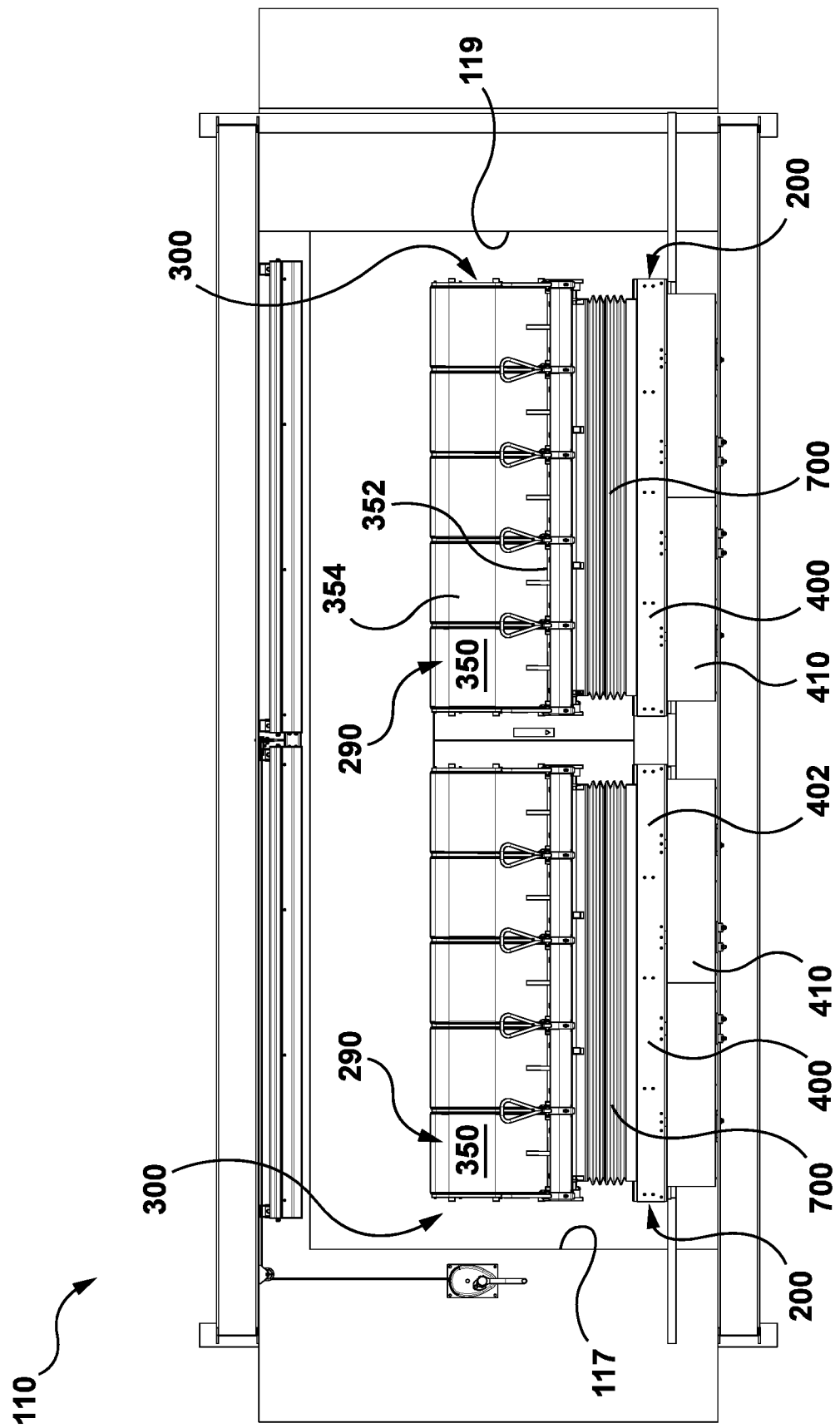
FIG. 7 is a front view of the example motion platform system of FIG. 5 with the front door in an open position in accordance with an embodiment.

As shown in FIG. 4, the motion simulator system 100 has a front end 102, rear end 104, upper or top end 106, and lower or bottom end 108. The display 120 can be positioned at the front end 102 with the one or more motion bays 110 positioned towards the rear end 104.

In the example illustrated, motion simulator system 100 can provide users with a motion simulation experience through a combination of movable rider accommodations positioned within the motion bays 110 and a coordinated display provided on display 120.

Each motion bay 110 has a front end 112, rear end 114, upper or top end 116, and lower or bottom end 118. Each motion bay 110 can be arranged with the front end 112 facing the display 120. The front end 112 of each motion bay 110 may be open or openable to allow users to view the display 120.

As shown in FIG. 1, the display 120 may be provided as a domed or rounded display screen. This may increase the field of vision displayed to a user as the seating assembly 300 moves. Alternately, display 120 may be provided as a flat display screen that may accommodate smaller venues and lower costs for the motion simulator system 100.

The motion simulator system 100 can include an output display system operable to provide a high-definition visual display on the display screen 120. For example, the motion simulator system 100 may include a projection system that operates to project a display onto a screen provided by display 120. The projection system may include one or more projectors.

For example, multiple high lumens 4K digital projectors may be used to project a visual display onto a domed screen provided by the display 120. The projectors may be calibrated to provide a consistent, high-quality image on the display 120. For instance, an auto calibration system may be used to coordinate and align the output from each projector.

The motion simulator system can also include an audio output system. The audio output system may be configured based on the particular geometry of the motion simulator system 100 and the arrangement of motion bays 110. The audio output system can include a plurality of speakers arranged around the motion simulator system to provide surround sound to riders positioned in the rider accommodations 290.

In general, motion simulator system 100 can include one or more motion platform apparatus 200 facing the display 120. Each motion platform apparatus 200 can include at least one rider accommodation 290.

The rider accommodations 290 can be movably mounted when positioned facing the display 120. A movable mounting unit may be used to movably mount the rider accommodations 290. The movable mounting unit can be configured to allow the rider accommodations 290 to move with multiple degrees of freedom when in a ride position. This may provide users with a motion simulation experience that can be synchronized with images displayed on the display 120.

For example, the rider accommodations 290 may be supported from below using a mounting unit that includes a multi-degree of freedom motion system 700. Alternately, the rider accommodations 290 may be supported from the rear and/or above, e.g. using a mounting unit that includes a rear or overhead suspension support system.

As shown, the motion simulator system 100 can include a plurality of motion platform apparatuses 200, including motion platform apparatuses 200a-200d. Each motion platform apparatus 200 can include at least one rider accommodation 290. Each rider accommodation 290 is configured to accommodate a user or rider of the motion platform. The motion platform apparatus 200 can be configured to support one or more users during a motion simulator experience.

As illustrated, each motion platform apparatus 200 includes a seating assembly 300. The seating assembly 300 can provide rider accommodations 290 in the form of one or more seats 350. Each seat 350 can include a seat base 352 upon which a rider can be seated when using the motion simulator system 100. Alternately, rider accommodations 290 that accommodate riders in an upright position and/or supported by a harness or other support may be used.

The seating assemblies 300 can be positioned in an in-use position (see e.g. FIG. 24) facing the display 120. Users seated in the seating assemblies 300 can then view the display 120. The in-use position may define a ride position for the motion simulator system 100. The ride position for each seating assembly 300 can be defined so that the display 120 is visible from each rider accommodation 290 within the motion simulator system.

As shown in the example of FIGS. 1-4, the motion simulator system 100 can include a plurality of motion bays 110a-110e. The display 120 can be positioned forward of the front end 112 of each motion bay 110a-110f. Each motion bay 110a-110f can in turn include one or more motion platform apparatus 200.

In the example illustrated, each motion bay 110a-110f includes two motion platform apparatuses 200. Alternately, each motion bay 110 may include greater or fewer motion platform apparatuses 200. Alternately or in addition, the motion bays 110 may not all contain the same number of motion platform apparatuses 200.

For example, different motion bays 110 may contain different numbers of motion platform apparatuses 200 within the same motion simulator system 100. This may allow the motion simulator system 100 to maximize seating capacity of any given venue within which motion simulator system 100 is located. This may also allow a venue to contain multiple motion simulator systems of differing size. The size of display 120 may also vary based on the venue size and/or the number of motion assemblies positioned facing the display 120.

As illustrated, the motion bays 110 can be shaped to permit a modular assembly of the motion simulator system 100. The motion bays 110 within the motion simulator system 100 can be arranged based on the size of the venue and/or the shape and size of the display 120 to maximize rider capacity while providing a consistent rider experience in viewing display 120.

Each motion bay 110 can include a generally rectangular outer perimeter. This may facilitate vertical and/or horizontal stacking of motion bays 110. Accordingly, particular configuration of the motion simulator system 110 may be defined based on the particular installation demands of a given motion simulator system.

In the example illustrated, the motion simulator system 100 includes six motion bays 110. Each motion bay 110 includes a pair of motion platform apparatuses 200 and each motion platform apparatus 200 supports a seating assembly 300 that includes five seats 350. The example motion simulator system 100 thus provides a total capacity of sixty riders facing the display 120 for a motion simulation experience.

The example motion simulator system 100 illustrated includes a stacked arrangement (a vertical stack) of motion bays 110a-110c and 110d-110f. In the example illustrated, motion simulator system 100 includes three vertical levels of motion bays with each vertical level including a pair of horizontally adjacent motion bays. A top level includes adjacent motion bays 110a and 110d, an intermediate level includes adjacent motion bays 110b and 110e, and a lower level includes adjacent motion bays 110c and 110f.

The example motion simulator system 100 illustrated also includes a plurality of horizontal or lateral stacks of motion bays 110a and 110d, 110b and 110e, and 110c and 110f. As shown, the motions bays 110 positioned within each horizontal stack are positioned laterally adjacent to one another.

As shown, motion bay 110b is positioned underneath motion bay 110a and motion bay 110c is positioned underneath motion bay 110b. Similarly, motion bay 110f is positioned underneath motion bay 110e, which in turn is positioned under motion bay 110d. The vertical stacks 110a-110c and 110d-110f can positioned laterally adjacent to one another, facing the same display 120, as shown in FIG. 1.

In the example illustrated, a first motion bay 110b extends between a bay front end 112b and a bay rear end 114b in a forward-rearward direction 113. Motion bay 110b encloses a pair of motion platform apparatuses 200c and 200d.

Similarly, a second motion bay 110a extends between a bay front end 112a and a bay rear end 114a in the forward-rearward direction 113. The motion bay 110a also encloses a pair of motion platform apparatuses 200a and 200b. The second bay front end is positioned forward 112a of the first bay front end 112b. With the domed screen 120 in motion simulator system 100, this arrangement of motion bays 110 may provide a more consistent visual experience to riders in each of the motion bays 110, as the view of the lower portion of display 120 is unobscured by riders below.

As the seating assemblies 300 are moved to the ride position, the front end 356 of each seat 350 may extend forward of the front end 112 of the corresponding motion bay 110. Users positioned beyond the front end 112 of the motion bay 110 and may drop articles and debris towards the motion bays below.

Each motion bay 110 can include an upper canopy or extension member 130 near the front end 112. The canopy 130 may prevent debris from upper motion bays falling onto riders seated in the motion bays below.

For example, canopy or extension member 130b can extend laterally across the front end 112 of the motion bay 110b below and forward of the base 410 of the motion bay 110a above. The extension member 130b can extend outwardly from the motion bay 110b forward of the second bay front end 112a. Accordingly, extension member 130b may positioned to catch debris from the motion bay 110a.

In the example illustrated, extension member 130 may include a top surface 132 configured to inhibit debris from an upper motion bay (e.g. motion bay 110a) from hitting riders in a low motion bay (e.g. motion bay 110b). For example, the top surface 132 may define a debris catchment region 136 and/or trough shaped to capture debris falling from above motions bays (see e.g. FIGS. 2 and 4). Alternately or in addition, the top surface 132 may be shaped or angled to deflect debris forward of the front end 112 of the below motion bays 110, so that falling debris avoids riders positioned below.

Optionally, the motion simulator system 100 may also include additional effect elements 134 such as fluid elements (e.g. water mist or wind) and/or odor/scent elements. The motion simulator system 100 may be configured to deliver the additional effects to riders positioned in the rider accommodation as part of the motion simulation experience.

In some examples, the additional effect elements 134 may include a fluid delivery element operable to deliver a mist or spray of water to riders positioned in the rider accommodations. The fluid delivery element may include at least one misting nozzle configured to direct a highly atomized spray of water towards the riders positioned in the rider accommodations.

For example, a motion bay 110 can include a fluid delivery element for each seat 350 positioned within that motion bay 110. Alternately or in addition, a combined fluid delivery system may be positioned to spray water on each seating assembly 300 or on all of the motion platform apparatuses 200 positioned within a motion bay 110.

The fluid delivery element can include a valve that can be operated to control the delivery of water to the riders. The operation of the fluid delivery element can be coordinate with the motion simulation experience (e.g. with the motion of the rider accommodations 290 and the display shown on screen 120).

Alternately or in addition, the additional effect elements 134 may include a fluid delivery element operable to deliver a flow of air towards the riders. For example, the fluid delivery element may provide a flow of air configured to simulate wind flowing towards the riders. For example, the flow of air can be directed towards the riders with airflow rates between about 100 and 300 ft./min within a defined region of the rider accommodations in which users are expected to be positioned. In some examples, the flow of air can be directed towards the riders with airflow rates between about 150 and 250 ft./min.

The fluid delivery element may include one or more fans. The fans may be operable to direct a flow of air towards the rider accommodations. The fans may include a plurality of operational speeds. The operational speed of the fans may be controlled to provide variable airflow rate to the rider accommodations.

In some examples, the fans may direct air towards an output plenum. The output plenum can include a plurality of airflow outlets. Each airflow outlet can be positioned facing one of the rider accommodations. Optionally, each airflow outlet may include adjustable vanes that can be controlled to balance airflow through the outlets.

In some examples, the additional effect elements 134 may include a scent delivery element operable to deliver one or more scents to the riders positioned in the rider accommodations. For example, motion simulator system may include a scent cabinet configured to generate one or more scents. The scent cabinet can be fluidly coupled to the motion bays 110.

The operation of a scent delivery element may be coordinated with the operation of an airflow delivery element. For example, fans may be used to distribute the scents towards the rider accommodations. This may facilitate rapid delivery and dissipation of scents within the motion bays 110.

The additional effect elements 134 may be mounted within each bay 110 to face the rider accommodations 290. For example, the effect elements 134 may be mounted to the upper end or lower end of each motion bay 110. The additional effect elements 134 may be hidden or obscured from each riders view so that effect elements 134 do not interfere with the display shown on screen 120.

For example, extension member 130 may include a feature delivery system 134. Feature delivery system 134 can be positioned to face the interior of the corresponding motion bay 110. The feature delivery system 134 can be configured to direct at least one of a fluid element and a scent element to the first motion bay 110. For example, the feature delivery system 134 can include one or more fluid delivery elements and/or scent delivery elements.

Motion simulator system 100 can also include one or more controller components. The controller components may be implemented using one or more processors, such as general-purpose microprocessors, field programmable gate arrays, application specific integrated circuits, microcontrollers, or other suitable computer processors.

The particular number and arrangement of controller within the motion simulator system 100 may vary. For example, a central controller may be configured to control the operation of the entire motion simulator system 100. Alternately or in addition, the motion simulator system 100 may include a bay controller for each motion bay 110. Alternately or in addition, the motion simulator system 100 may include a motion controller assembly for each motion platform apparatus 200.

For example, a vehicle controller may be configured to control operation of the motion platform apparatuses 200. Optionally, a single vehicle controller may be configured to control operation of all of the motion platform apparatuses 200 within system 100. Alternately, a separate vehicle controller may be provided for each motion bay 110. Alternately or in addition, a separate vehicle controller may be provided for each motion platform apparatus 200. For simplicity, operation of various controller components such as the vehicle controller will be described herein. However, it should be appreciated that various different arrangements of control components may be used to implement the control operations described herein.

In some examples, the control components may include an operator control console. The operator control console may be used by an operator of motion simulator system 100 to control the operation of the overall motion simulation experience provided by motion simulator system 100. The operator control console may provide user input controls usable to control the operation of motion simulation experience. Alternately or in addition, the operator control console may provide user input controls usable to control maintenance and configuration settings of the motion simulator system 100.

In some examples, the control components may include a plurality of operator control consoles. For example, the motion simulator system may include a central operator control console. The central operator control console may be positioned within a master control region of the venue. The central operator control console may provide user inputs usable to control the overall operation of the motion simulator system 100.

Alternately or in addition, the motion simulator system may include a plurality of bay level control consoles. The motion simulator system 100 may include one bay level control console for each vertical row of motion bays 110. For instance, motion simulator 100 may include three bay level control consoles. The bay level control consoles may provide user inputs usable to control the operation of the equipment (e.g. motion platform apparatuses 200, walls 850, doors 900, effect elements 134 etc.) provided by the motion bays 110 on the corresponding row.

Alternately or in addition, the motion simulator system may include a plurality of bay control consoles. The motion simulator system 100 may include one bay control console for each motion bay 110. The bay control consoles may be positioned within a control unit 150 positioned within each motion bay 110 (see e.g. FIG. 41). For instance, motion simulator 100 may include six bay control consoles. The bay control consoles may provide user inputs usable to control the operation of the equipment (e.g. motion platform apparatuses 200, walls 850, doors 900, effect elements 134 etc.) provided by the corresponding motion bay 110.

Each motion bay 110 can be configured as an essentially self-contained rider motion system. Each motion bay 110 can include control elements usable to control the operation of the rider assemblies positioned therein (e.g. motion platform 400, seating assembly 300, seat support assembly 700) as well as other operational elements associated with the motion bay 110 (e.g. additional effect elements 134, movable bay wall 850, openable front door 900 etc.). The operation of each motion bay 110 can also be coordinated with the visual display shown on screen 120—e.g. through the bay control elements and/or a central controller. Furthermore, the operation of the motion bays 110 can be synchronized with operation of the other motion bays 110 to provide a consistent and coordinated motion simulation experience.

In some examples, the motion bays 110 may be configured to operate independently from one another. That is, in some examples operation of any given motion bay 110 does not depend on the operation of any other motion bays. The operation of the motion bays 110 may be controlled independently, but in a coordinated manner, in order to provide a consistent motion simulation experience across the different motion bays 110.

For example, the motion simulator system 100 may be configured to continue operation even with one or more motion bays 110 inoperable. When one of the motion bays 110 ceases operation (e.g. due to maintenance or failure), the remaining motion bays 110 can continue operating within the motion simulator system 100. This may increase the operational uptime of the motion simulator system 100. This may also facilitate maintenance of the motion bays 110, as maintenance to individual bays may be performed while the other bays continue to operate.

The motion simulator system 100 may be configured to control the operations of the motions bays 110 so that only motions bays 110 in which riders are positioned are activated. This may avoid unnecessary wear on motion bays 110 that are not providing riders with a motion simulation experience. This may also allow maintenance to continue on non-operational motion bays 110 while other motion bays 110 continue operation.

In some cases, only those motion platform apparatuses 200 in which users are positioned may be actuated. For example, where a motion bay 110 includes multiple motion assemblies but riders are not positioned in one of those motion assemblies, the motion simulator system 100 may only actuate the motion assemblies having riders. This may avoid unnecessary wear on motion assemblies that are not being used by riders.

In some examples, the motion simulator system 100 can determine that at least one of the rider motion apparatuses (e.g. one of the motion platform apparatuses 200) is in an inactive state. For example, the motion simulator system 100 may determine that a rider motion apparatus is in an inactive state when that rider motion apparatus is unoccupied and/or nonoperational. The motion simulator system 100 may actuate only a subset of the rider motion apparatuses in response to determining that the at least one of the rider motion apparatuses is in the inactive state. The subset of rider motion apparatuses that are actuated can exclude the rider motion apparatuses in the inactive state. The motion simulator system 100 may then provide the motion simulation experience to the subset of rider motion apparatuses 200 without providing the motion simulation experience to the inactive rider motion apparatus 200. In some examples, the motion simulator system 100 may leave the excluded rider motion apparatuses stationary during the motion simulator experience.

For example, the motion simulator system 100 may only position the active rider motion apparatuses in the ride position. The inactive rider motion apparatuses may be retained in the load position. This may allow maintenance to be performed on non-operational rider motion apparatuses (e.g. motion platforms 400) and/or avoid unnecessary wear on the motion platforms 400 and related components of motion bay 110.

The motion simulator system 100 may also omit operation of various motion bay elements when the rider apparatuses within a given motion bay 110 are non-operational. For example, the front door 900 may not be adjusted (e.g. opened) for each motion bay 110 that does not have an active rider motion apparatus. Alternately or in addition, the movable bay wall section 854 may not be adjusted (e.g. closed) for each motion bay 110 that does not have an active rider motion apparatus.

The control elements used in motion simulator system can be configured using one or more control and/or operational programs or applications. The programs can include computer-executable instructions that can be executed by a processor to perform the operations described herein. For example, least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

Motion Platform Apparatus

The following is a description of a motion platform apparatus that may be used by itself in any motion simulator system or in any combination or sub-combination with any other feature or features disclosed including the tolerance accommodation member, the track mounting assembly, the platform positioning system, the vehicle safety device, and the movable bay wall.

In accordance with this aspect, a motion platform apparatus may be movable between a loading position and a ride position. The motion platform apparatus can include a seating assembly upon which users can be seated during a motion simulator experience. In the loading position, the seating assembly can be arranged to facilitate loading and unloading of users. In the ride position, the motion platform apparatus can support the seating assembly in a ride position that may minimize the potential for user injury during a motion simulation experience. The seating assembly can also be adjusted to a seating assembly motion position to minimize or prevent rider injury as the motion platform apparatus moves between the loading position and the ride position.

In the example illustrated (see e.g. FIGS. 5-9), motion platform apparatus 200 includes a motion platform 400 has a platform front end 402 and an opposed platform rear end 404. As illustrated, the motion platform 400 extends between the platform front end 402 and the platform rear end 404 in the forward-rearward direction 113 (see e.g. FIG. 8). The motion platform 400 also extends between opposing lateral sides 403 and 405.

Figure 8:
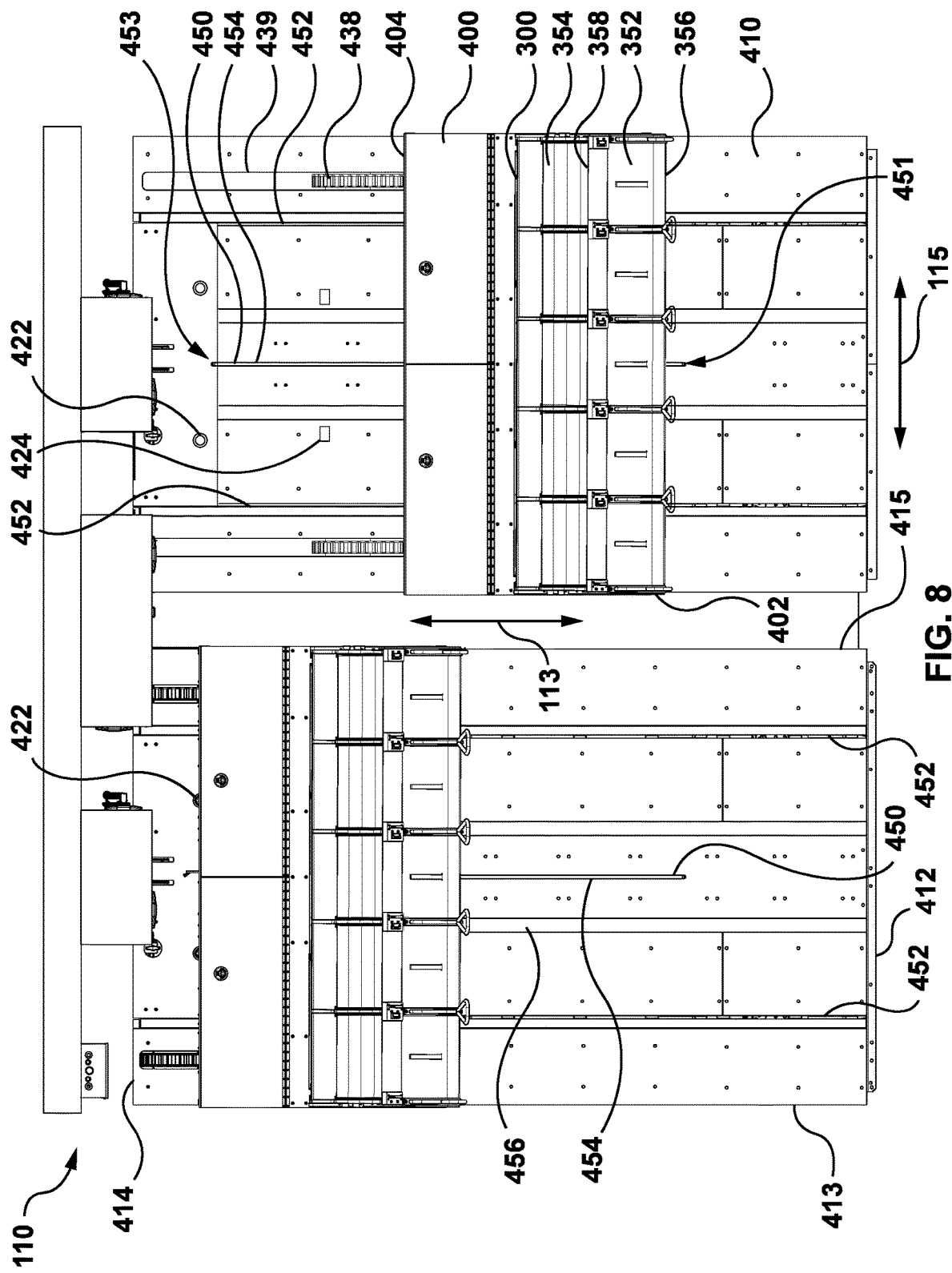
FIG. 8 is a top view of the example motion platform system of FIG. 5 in accordance with an embodiment.
Figure 9:
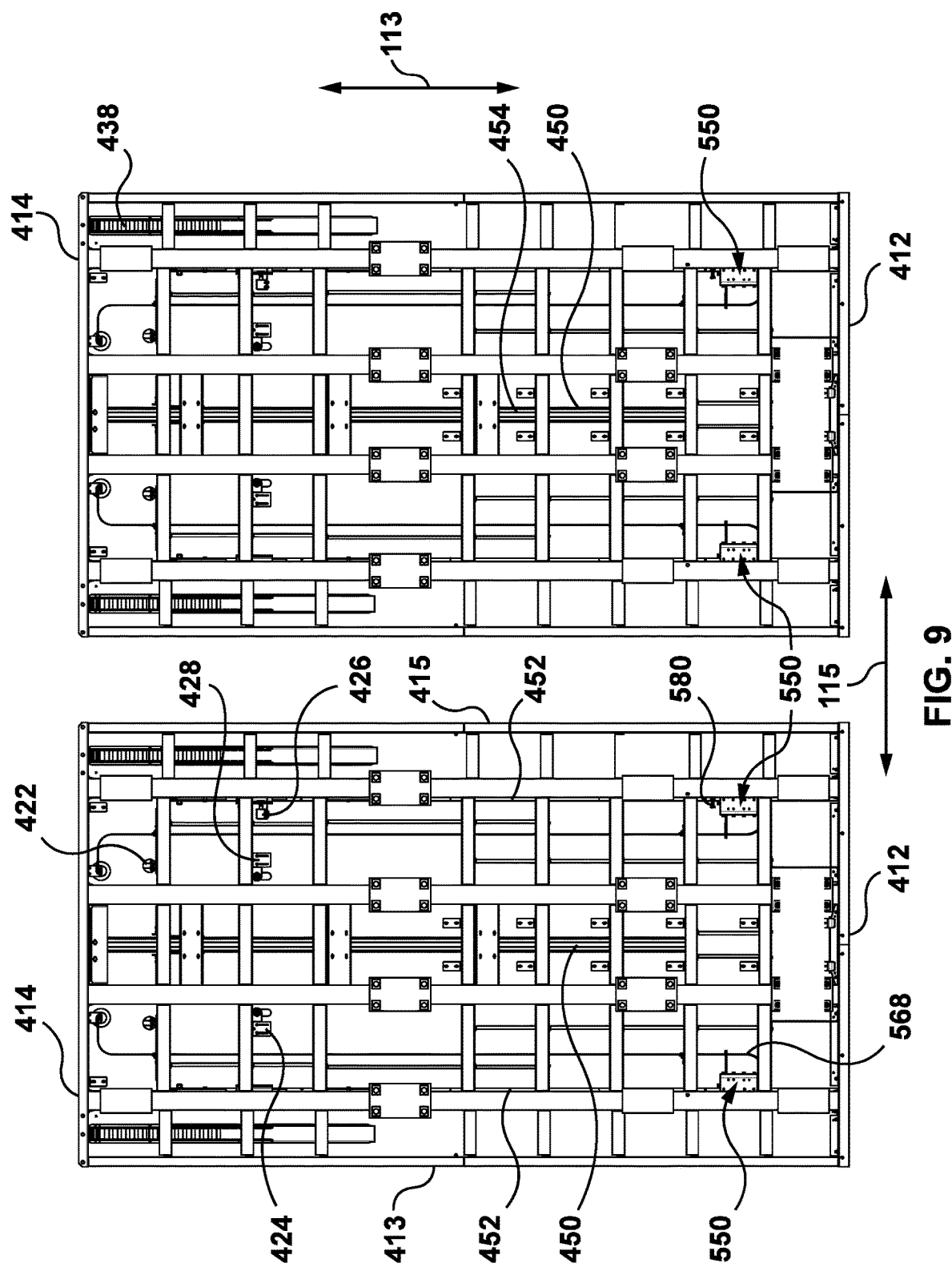
FIG. 9 is a bottom view of the example motion platform system of FIG. 5 in accordance with an embodiment.

Motion platform 400 can be mounted on a base 410. Base 410 has a front end 412 and an opposed rear end 414. As shown in FIGS. 8 and 9, the base 410 has an inner lateral side 415 and an outer lateral side 413. The base 410 also extends between the opposing lateral sides 413 and 415.

In some examples, the base 410 may be integrated into the floor of a motion bay 110. This may avoid changes in height underfoot as rider load and unload from the motion platform 400. Alternately, the base 410 may be supported on top of the floor of the motion bay 110.

The base 410 defines an upper base surface 440. The upper base surface 440 generally extends from the front end 412 to the rear end 414 in a forward-rearward direction 113. The upper base surface 440 also generally extends between the opposing lateral sides 413 and 415 in a lateral direction 115 (see e.g. FIG. 8).

The base 410 can define a track 450. As shown in the example illustrated, the track 450 extends in the forward-rearward direction 113. The track 450 extends between a track front end 451 and a track rear end 453 (see e.g. FIG. 8).

The motion platform 400 can be movably mounted to the base 410 along the track 450. The motion platform 400 can move along the track in the forward-rearward direction 113. The track 450 can define a platform motion path that extends generally between the track front end 451 and track rear end 453.

The base 410 can define a support frame for the motion platform 400 (see e.g. FIG. 9). The support frame can be configured to support motion platform 400 and enable the motion platform 400 to move along the track.

The base 410 can include a drive member 420. The drive member 420 can drive the motion platform 400 along the track. For example, the drive member 420 may be provided by a linear belt actuator that is driven using a servomotor. The linear belt actuator can be connected to the motion platform 400.

Figure 11:
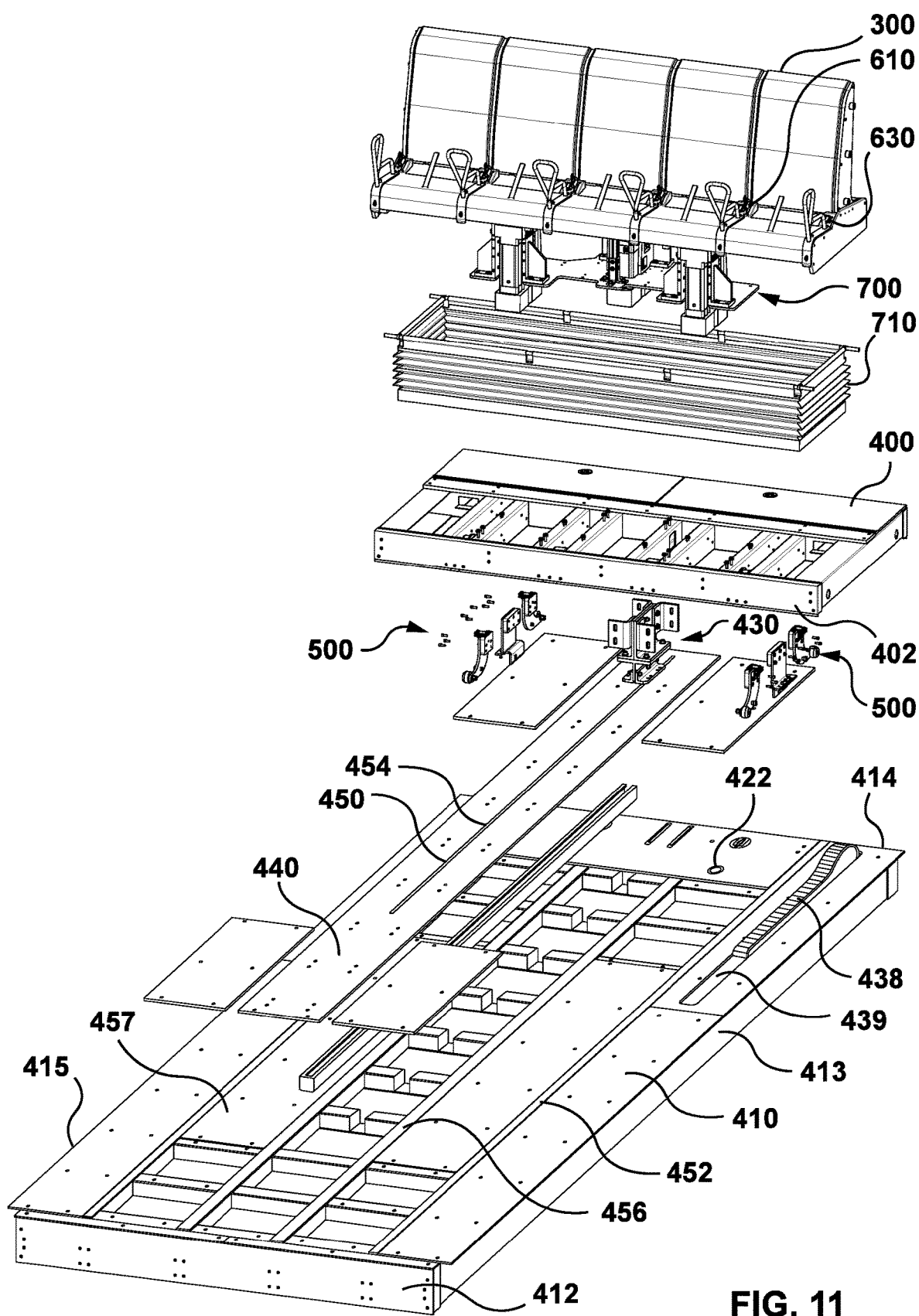
FIG. 11 is an exploded view of the example motion platform apparatus of FIG. 10.

The support frame can also define a plurality of track sections 452, 454, and 456 that define the track 450 (see e.g. FIGS. 8 and 11). The motion platform 400 can be mounted to travel along the track sections 452, 454, and 456. Some of the track sections 452 and 454 may define openings in the base surface 440.

Optionally, the support frame can be connected within the motion bay 110 with floor panels 457 (see e.g. FIG. 11). The floor panels 457 may be integrated with the base surface 440 to provide a substantially uninterrupted walking surface within the motion bay 110. The track sections 452, 454, and 456 can be integrated with the floor panels 457 so that the track 450 is flush with the base surface 440. This may prevent riders from tripping over the track support rails 456 and/or open track sections 452/454.

The width of the open track sections 452/454 can be defined to minimize the possibility of user's tripping. For example, the width of the open track sections 452/454 may be limited to about ½ inch, ¾ inch or 1 inch.

One or more track mounting assemblies, such as assemblies 430 and 500, may be used to mount the motion platform 400 to the track 450 (see e.g. FIG. 11). In some cases, the track mounting assemblies can mount the motion platform 400 directly to the track 450, e.g. using wheels or rollers movable along the track 450. For example, track connector assemblies, such as track connector assemblies 500 described herein below, may be used to mount the motion platform to the track 450.

Alternately or in addition, the track mounting assemblies can mount the motion platform 450 to support components provided by the base 410, such as a drive member 420. The support components may, in turn, be configured to operate in conjunction with the track 450 e.g. by driving motion platform 400 along the track 450. For example, tolerance accommodation member(s) 430 may provide a track mounting assembly to mount the motion platform 400 to the drive member 420.

Alternately or in addition, the track mounting assemblies can include additional wheels/rollers 540 configured to be mounted to track support rails 456. The rollers 540 may provide additional support for motion platform 400 as it travels along the track 450. For example, the rollers 540 may be manufactured using nylon and/or polyurethane caster wheels.

The motion platform 400 can support a seating assembly 300 that includes one or more user seats 350. In the example illustrated, each seating assembly 300 includes five seats 350, although different numbers of seats may be provided by a seating assembly 300.

Each seat 350 may provide a user accommodation 290 for a user of the motion platform apparatus 200. Each seat 350 can include have a seat base 352 upon which users can be seated during operation of motion platform apparatus 200. Each seat base 352 can extend between a seat front end 356 and a seat rear end 358 in the forward-rearward direction 113. The seats 350 may also include a seat back 354 to provide further support to riders of the motion platform apparatus 200. The seat base 352 and/or seat backs 354 can include a mesh covering to provide a comfortable seating surface for the riders.

Figure 10:
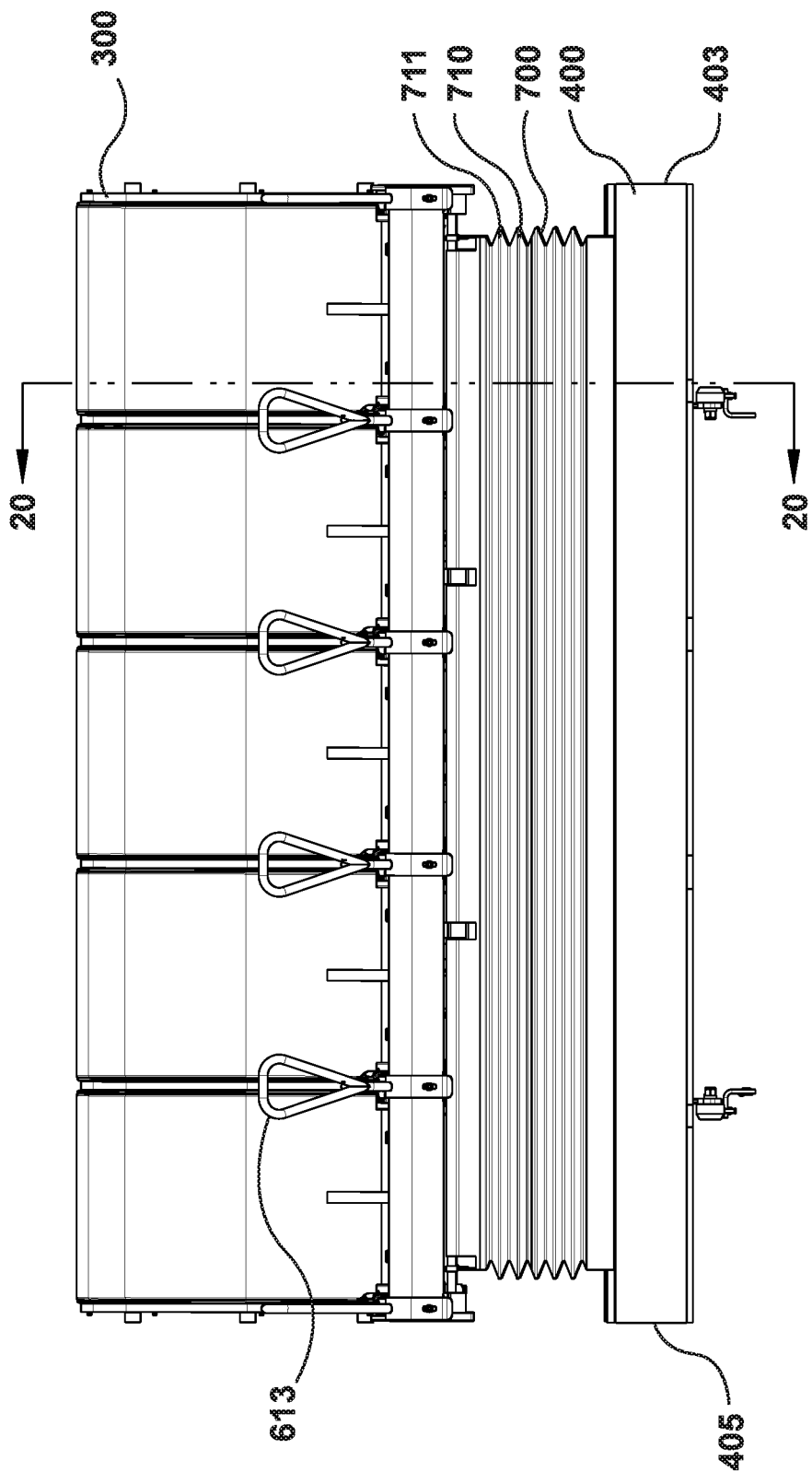
FIG. 10 is a front view of an example motion platform apparatus in accordance with an embodiment.
Figure 20:
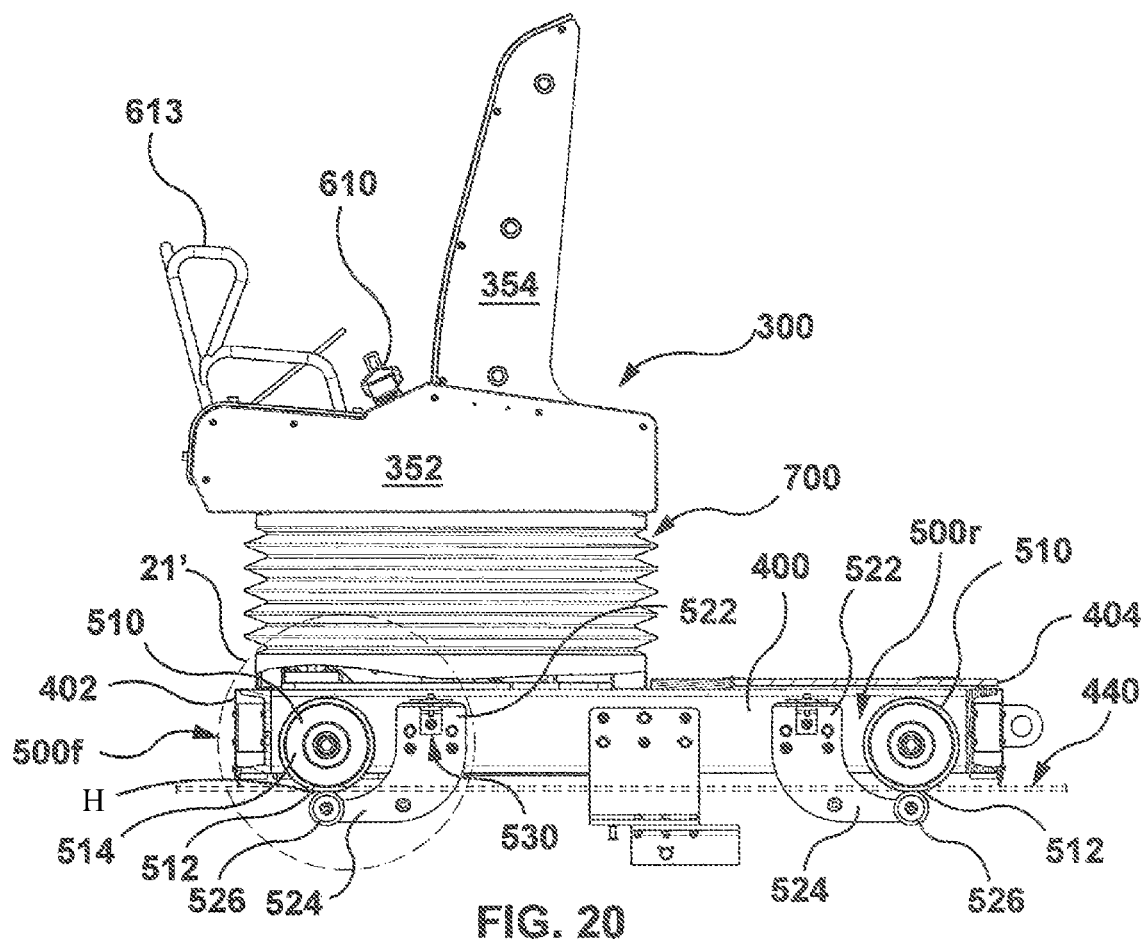
FIG. 20 is side sectional view of the example motion platform apparatus of FIG. 10 along line 20-20 in FIG. 10 in accordance with an embodiment.

In the example illustrated, each seat 350 can include a vehicle safety device such as a seatbelt 610 (see e.g. FIGS. 10 and 20). The vehicle safety device can be configured to retain a rider in the rider accommodation during motion of the platform 400 and/or seating assembly 350.

Each seat 350 can also include handles 613. Users can grip handles 613 for comfort and support during motion of the platform 400 and/or seating assembly 350.

In the example illustrated, the seating assembly 300 does not include footrests. Omitting footrests may provide users with a more immersive motion simulation experience. This may also avoid users hitting their feet or legs against the footrests during the motion simulation experience.

Alternately, footrests may be provided. This may provide users with a feeling of greater security in the seating assembly 300. This may also help prevent users from dragging their feet while the motion platform 400 is moved between the load and in-use positions.

In the example illustrated, the seating assembly 300 is mounted to the motion platform 400 underneath the seat base 352. This may simplify manufacturing and installation of the motion platform apparatus 200.

Alternately, the seating assembly 300 may be mounted to a motion platform using a rear or overhead seat support assembly. The seat support assembly can be configured to support and move the seats 350 during the motion simulation experience.

As shown, the front end 356 of each seat base 352 can be positioned forward of the platform front end 402. As a result, the platform 400 may not underlie a user's feet while they are seated within the seats 350.

Figure 12:
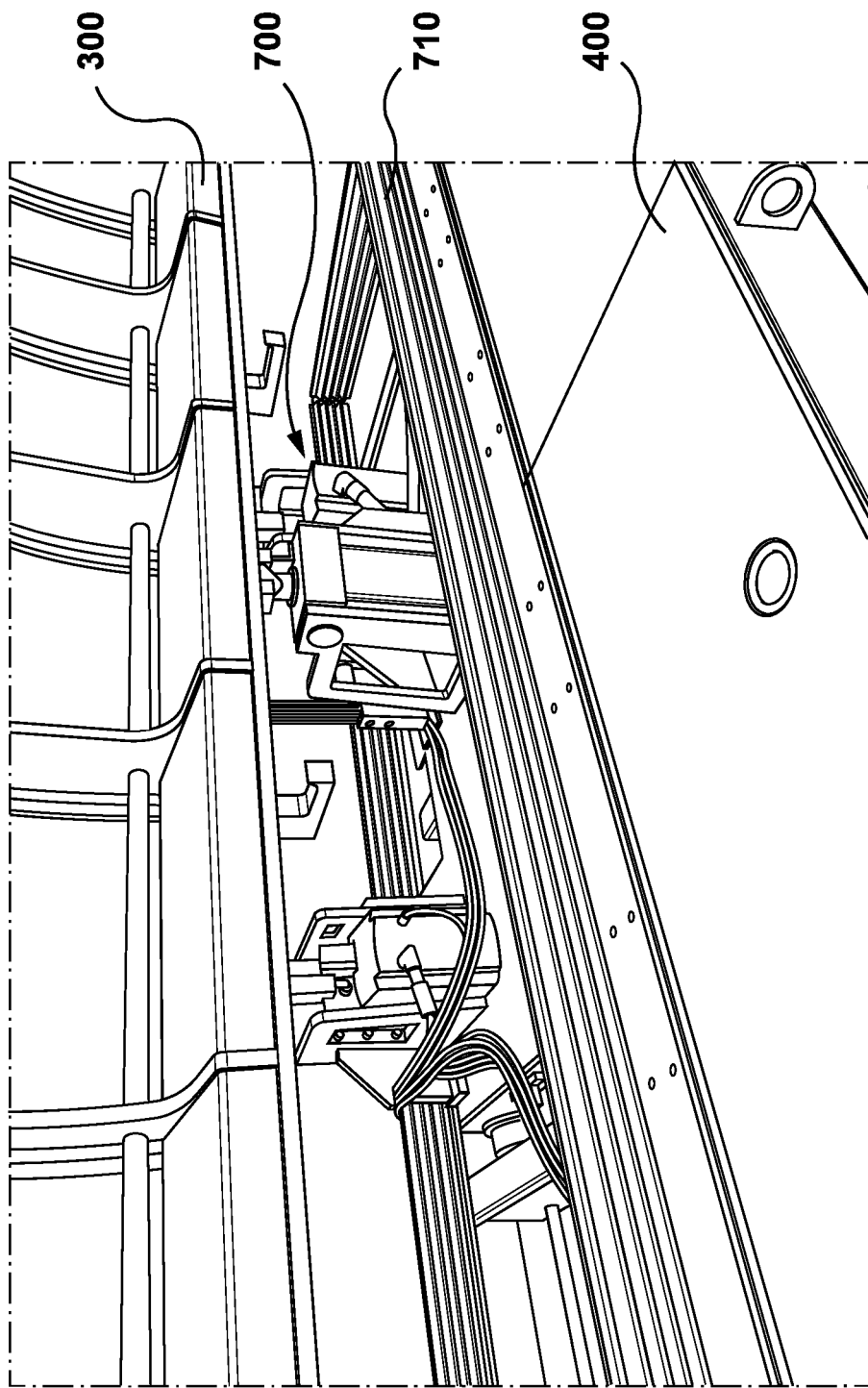
FIG. 12 is a perspective view of an example mounting unit for a seating assembly that may be used with the motion platform apparatus of FIG. 10.
Figure 13:
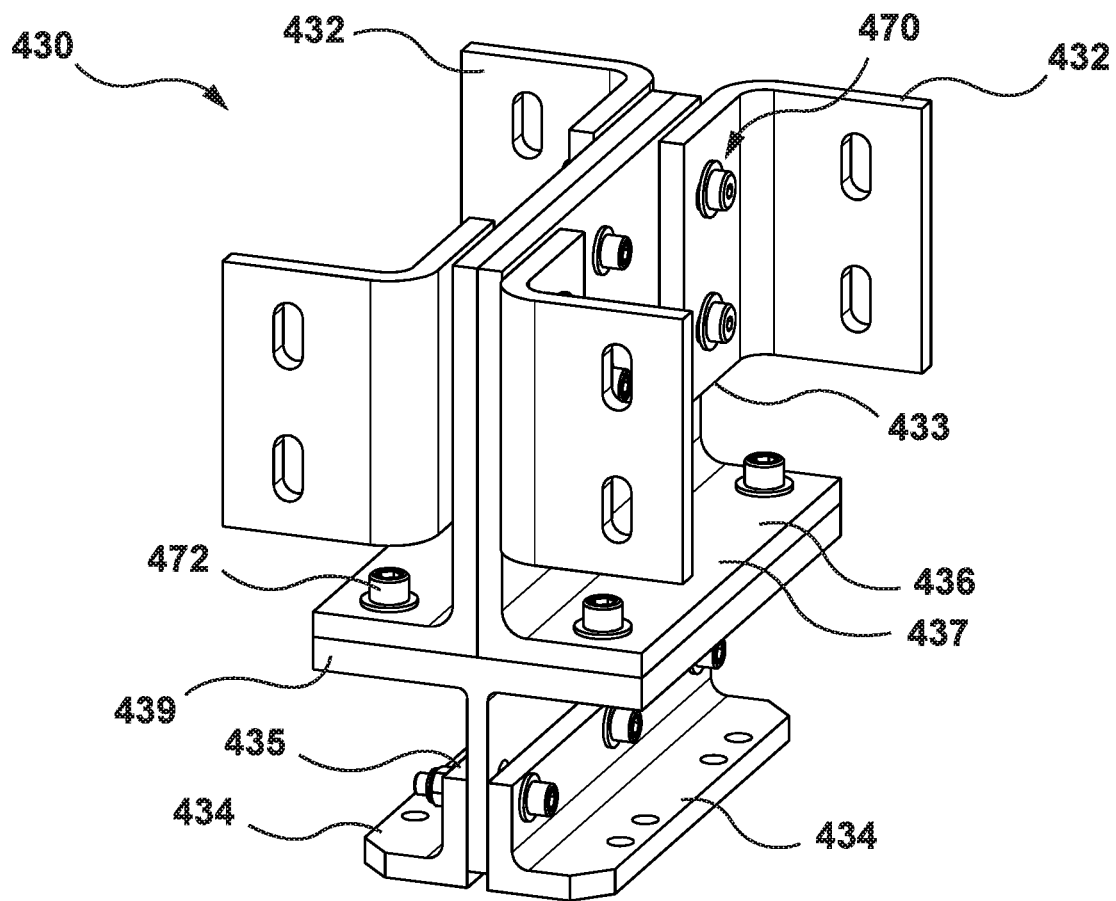
FIG. 13 is a perspective view of an example tolerance accommodation member in accordance with an embodiment.
Figure 14:
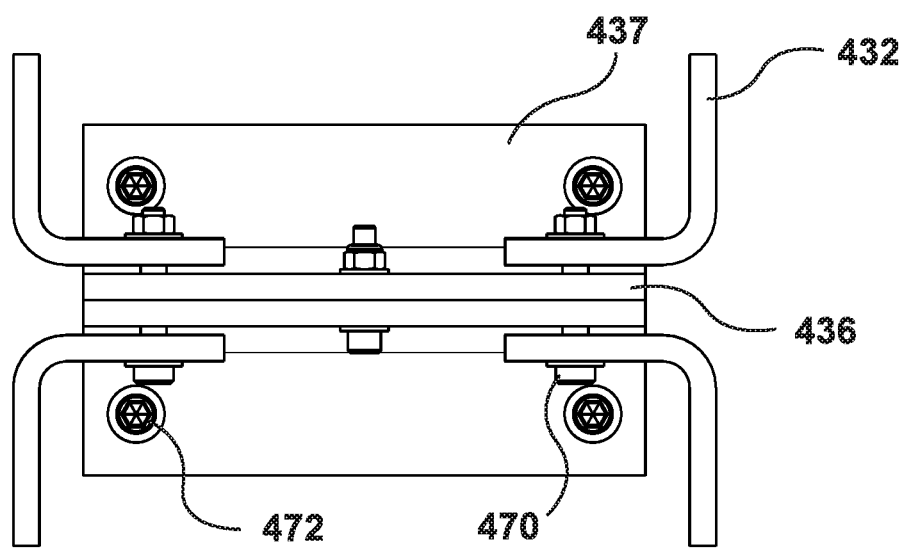
FIG. 14 is a top view of the example tolerance accommodation member of FIG. 13.
Figure 15:
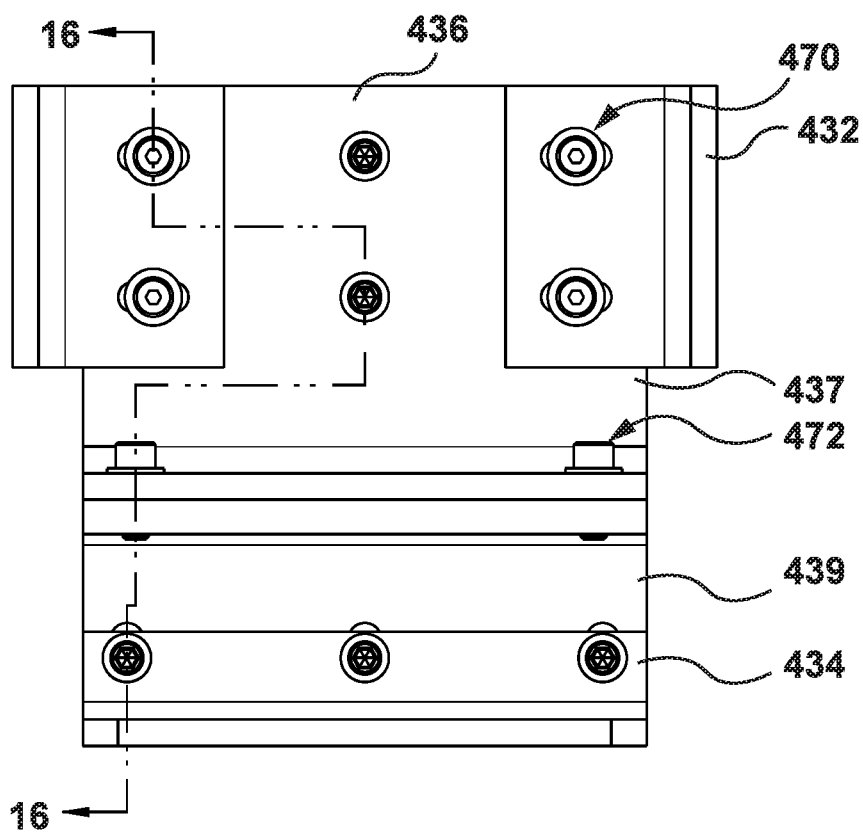
FIG. 15 is side view of the example tolerance accommodation member of FIG. 13.

As shown, the seating assembly 300 is mounted to the motion platform 400 by a seat support assembly 700 (see e.g. FIG. 12). As shown, the seat support assembly 700 can support the seat assembly 300 from below the seat base 352. This may facilitate installation and manufacturing of the motion platform apparatus 200.

Using a support assembly 700 that supports the seating assemblies 300 from below may help reduce the overall size of the motion platform apparatus 200. This may facilitate installation of the motion simulator system within venues of limited scope, as well as facilitate modular assembly of multiple motion platform apparatuses 200 into a combined motion simulation system.

The seat support assembly 700 may be configured to provide motion for the seating assembly 300 while the seating assembly 300 is positioned in an in-use position. The motion provided by the seat support assembly 700 may be coordinated/synchronized with visual effects provided by display 120. The motion and visual effects may also be coordinated with additional effects, such as odor effects, wind effects, or water effects.

The seat support assembly 700 may be configured to move the seating assembly 300 with at least three degrees of freedom. For example, the seat support assembly 700 may be configured to provide a heave motion, a pitch motion, and a roll motion for the seating assembly. The seat support assembly 700 can be configured to perform a motion profile or motion sequence that is coordinated with the images displayed on screen 120.

In providing a motion simulation experience, the motion simulator system 100 may position a set of seating assemblies 300 in the ride position. The motion simulator system 100 can then provide a visual display on the display screen 120. The ride position of the seating assemblies 300 can be defined so that the visual display is visible from each and every rider accommodation positioned in the ride position. The motion simulator system 100 can then control the motion of the rider accommodations 290 (e.g. by controlling seat support assembly 700) during the visual display to move the rider accommodations in a defined motion sequence coordinated with the visual display provided on the display screen 120.

The seat support assembly 700 may be configured to provide a defined range of motion for each degree of freedom. The seat support assembly 700 may be configured to provide a heave motion with a range of about +/−25 mm, +/−50 mm, or +/−75 mm in some examples. The seat support assembly 700 may be configured to provide a pitch motion with a range of about +/−5 degrees, +/−10 degrees, +/−15 degrees or +/−20 degrees in some examples. The seat support assembly 700 may be configured to provide a roll motion with a range of about +/−2.5 degrees, +/−5 degrees, +/−7.5 degrees or +/−10 degrees in some examples.

The seat support assembly 700 may be configured to provide a defined speed or force of motion for each degree of freedom. The seat support assembly 700 may be configured to provide a heave motion with a maximum force of about 0.25 g, 0.5 g, or 0.75 g in some examples. The seat support assembly 700 may be configured to provide a pitch motion with a maximum acceleration of about 100 degrees/$s^2$, 200 degrees/$s^2$, or 300 degrees/$s^2$ in some examples. The seat support assembly 700 may be configured to provide a roll acceleration with a maximum acceleration of about 100 degrees/$s^2$, 200 degrees/$s^2$, or 300 degrees/$s^2$ in some examples.

The seat support assembly 700 can be enclosed within a support housing 710. In the example illustrated, the support housing 710 included corrugated bellows 711. This may allow the housing 710 to move along with the motion provided by seat support assembly 700.

Seat support assembly 700 may be mounted to motion platform 400 proximate to the front end 402 of the motion platform 400. This may ensure that seating assembly 300 can be positioned proximate the front end 402.

Figure 24:
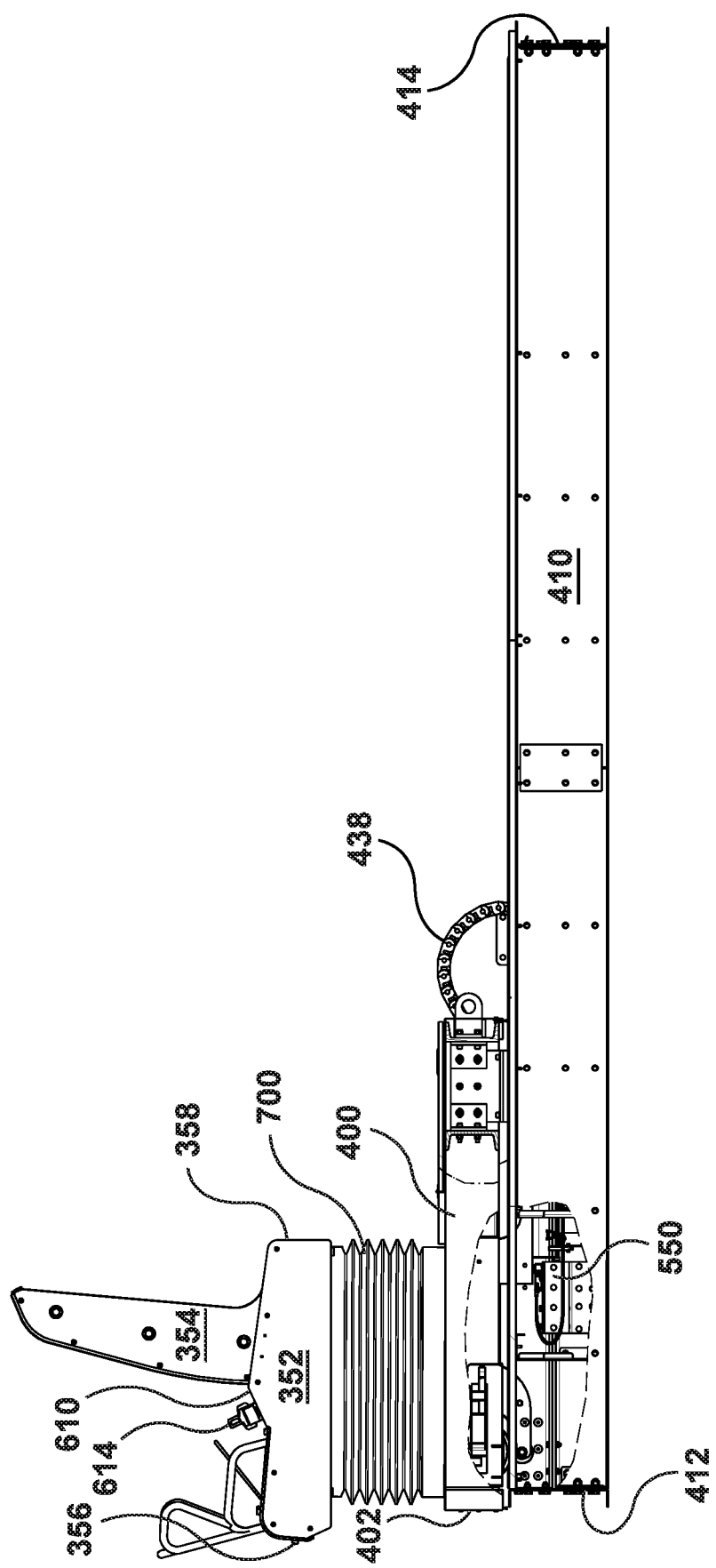
FIG. 24 is side sectional view of the example motion platform apparatus of FIG. 10 along line 20-20 in FIG. 10 showing the seating assembly in a ride position in accordance with an embodiment.
Figure 25:
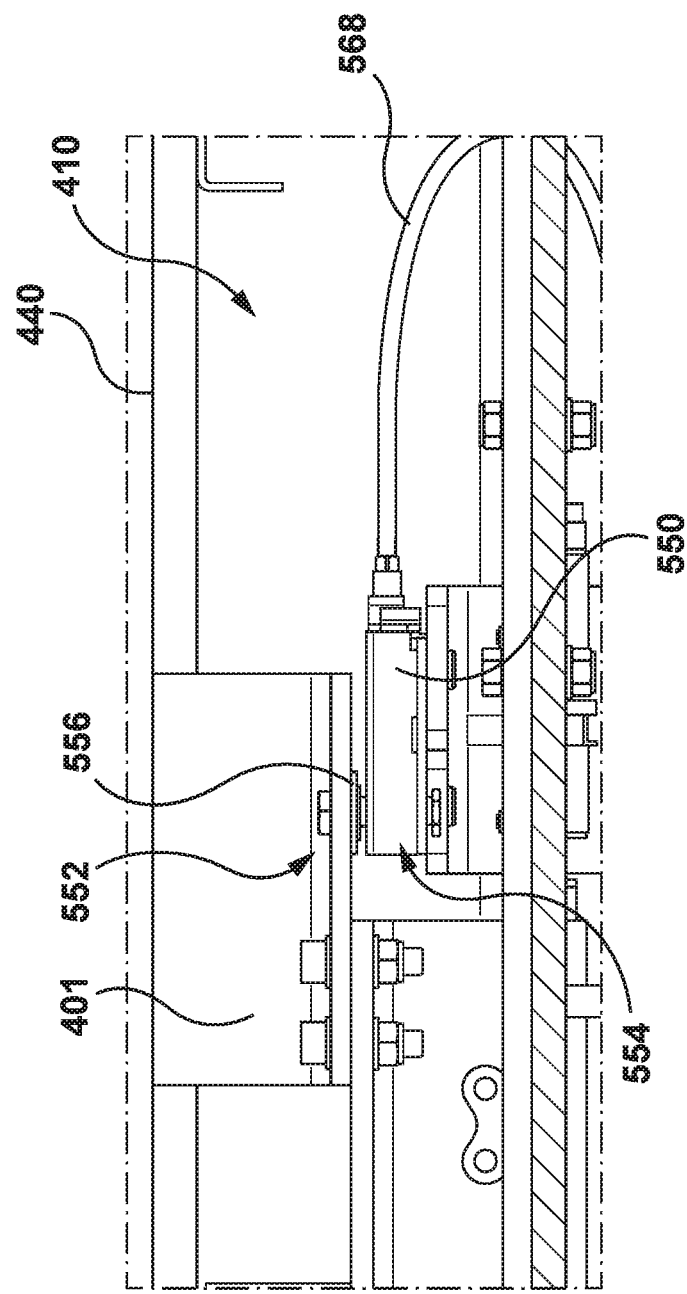
FIG. 25 is a side sectional view of an example lock unit that may be used with the example motion platform apparatus of FIG. 10 in accordance with an embodiment.

The motion platform 400 may be moved along the track 450 between a loading position (see e.g. FIG. 5) and an in-use or ride position (see e.g. FIG. 24). The loading position of the motion platform 400 can be rearward of the ride position. Users may embark and disembark from the front of the seating assembly 300.

The drive member 420 can be configured to drive the motion platform 400 along track 450 between the load position and the in-use position. The distance separating the load position and the in-use position may vary depending on the installation. For example, the distance between the load position and the in-use position may be about 5 feet, 6 feet, 7 feet, 8 feet, 9 feet, 10 feet, 11 feet, or 12 feet.

The speed of the drive member 420 can be controlled to provide a desired travel time between the load and ride positions. For example, drive member 420 can be controlled to provide a travel time of about 4 seconds, 5 seconds, 6 seconds, 7 seconds, 8 seconds, 9 seconds, or 10 seconds. In some examples, the travel time may be adjusted depending on the particular motion simulation experience (e.g. increasing travel time to build up rider anticipation).

The drive member 420 can also be controlled to gradually accelerate and decelerate the motion platform 400 as it travels between the load position and the ride position. For instance, the drive member 420 can be controlled to limit the acceleration of the motion platform 400. This may ensure that riders have a smooth transition between the load and ride positions. For example, the drive member 420 can be controlled to ensure that the force of acceleration of the motion platform 400 does not exceed 0.1 g, 0.2 g or 0.3 g.

The motion platform apparatus 200 can include a platform position sensor that monitors a position of the drive member 420. The position of drive member 420 (e.g. the position of the linear actuator) may be monitored to determine the current position of the platform 400.

The motion platform 400 can be coupled to control components of the motion simulator system 100 using wired and/or wireless connections. For example, cabling 438 may be provided to provide electrical and control connectivity between the motion platform 400 and various power and control elements of the motion simulator system 100. As shown for example in FIGS. 8, 9, 11, 22, and 24, the cabling 438 may be provided in an extendible harness. The harness may allow the cabling 438 to extend forward as the motion platform is moved to the ride position (see e.g. FIG. 24) and to retract as the motion platform 400 returns to the load position (see e.g. FIGS. 8 and 11). The base 410 may include a recess 438 within which the cabling 438 can be receded when the motion platform 400 returns to the load position. This may ensure that cabling 438 is not exposed when riders are loading onto or unloading from the motion platform 400.

The motion simulator system 100 can be configured to position he motion platform 400 in the ride position prior to enabling the seat support assembly 700 to provide the motion for the motion simulation experience. Alternately or in addition, in some examples the seat support assembly 700 may be configured adjust the position (e.g. height/pitch) of the seats 350 while the motion platform 400 is in the load position. This may help facilitate loading/unloading of the seats 350.

In the example of motion platform apparatus 200, the base 410 can be fixed in position. That is, the base 410 and upper base surface 440 may not move within a motion bay 110. Users may walk along the upper base surface 440 when the motion platform 400 is in the load position in order to reach the seating assembly provided on motion platform 400. Having the base 410 upon which users walk be fixed in position may help maintain a more consistent upper base surface 440, by avoiding changes in surface textures that may occur when the surface moves. This may reduce the possibility of users tripping as they load or unload.

Optionally, motion platform 400 can also include brushes or sweeps positioned to contact the upper base surface 400. The brushes may be used to move debris from the upper base surface 440 as the motion platform 400 travels along the track 450. This may help prevent debris from interfering with the track mounting assemblies. For example, the brushes may be positioned at one or both of the front end 402 and rear end 404 of the motion platform 400.

When the motion platform 400 (and seating assembly 300) is positioned in the in-use position, each seat front end 356 can be positioned forward of the front end 412 of the base 410 as shown in FIG. 24. For example, the front end 356 of each seat 350 may be cantilevered forward of the platform front end 402 by a pre-defined distance. Optionally, the platform front end 402 may also be positioned forward of the base front end 412. This may ensure that no surface is present under a user's feet when the motion platform 400 is in the ride position.

In the example illustrated the seating assembly 300 provided on motion platform 400 includes only a single row of seats 350. This ensures that the feet of every user of the motion platform apparatus 200 are dangling when in the ride position. This provides each user with a consistent and consistently safe motion simulation experience.

As explained above, each motion platform apparatus 200 may be enclosed within a motion bay 110. Each motion bay 110 can include an open bay front end 112 facing a display screen 120 positioned forward of the bay front end 112. When the seating assembly 300 is positioned in the in-use position, each seat front end 356 may be positioned forward of the bay front end 112.

As the seating assemblies 300 may position users forward of the front end 112 of each motion bay 110 in the ride position, debris from above motion bays 110 may fall towards lower motion bays. The extension member 130 provided by each motion bay 110 may include a top surface 132 configured to inhibit debris from an upper motion bay (e.g. motion bay 110a) from hitting riders in a lower motion bay (e.g. motion bay 110b).

As the motion platform 400 moves between the load position and the ride position, the upper base surface 440 may be positioned below the users' feet. As a result, a user's feet may drag along the floor or be caught in the track sections 452 and 454 while the motion platform 400 is in motion. Accordingly, the motion platform apparatus 200 may be configured to position the seating assembly in a motion state to minimize the possibility of users dragging their feet as the motion platform 400 adjusts between the load position and the ride position.

Figure 37:
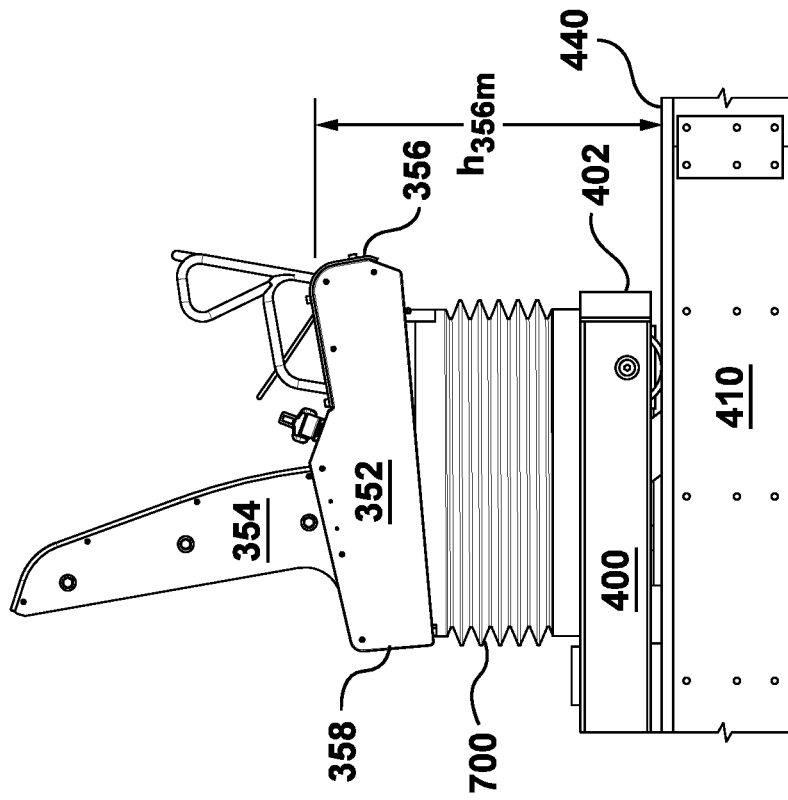
FIG. 37 is a side view of the example motion platform apparatus of FIG. 10 with the seating assembly in a motion state in accordance with an embodiment.
Figure 36:
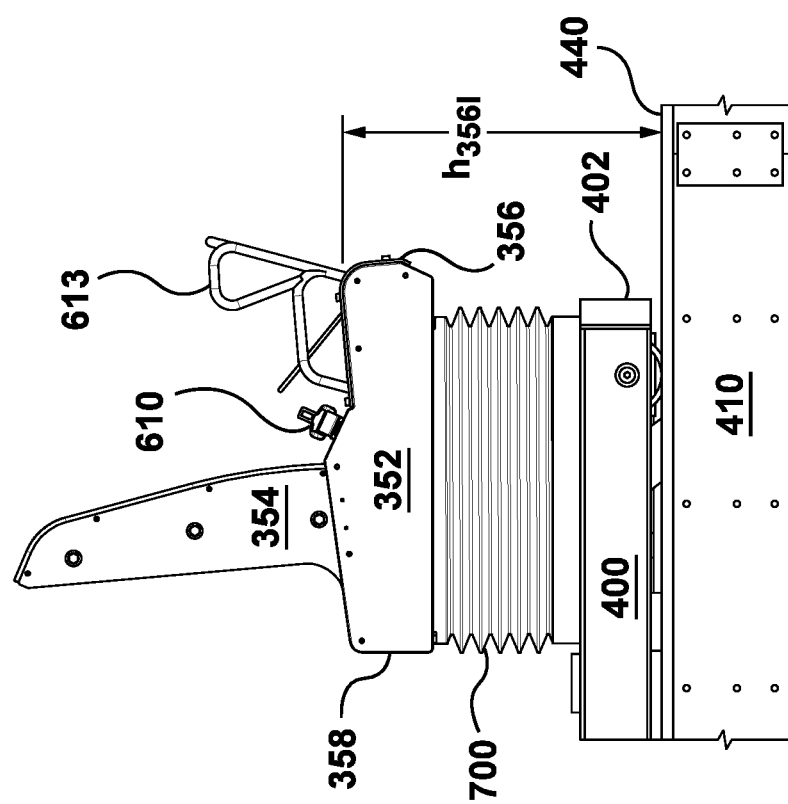
FIG. 36 is a side view of the example motion platform apparatus of FIG. 10 with a seating assembly in a load state in accordance with an embodiment.
Figure 38:
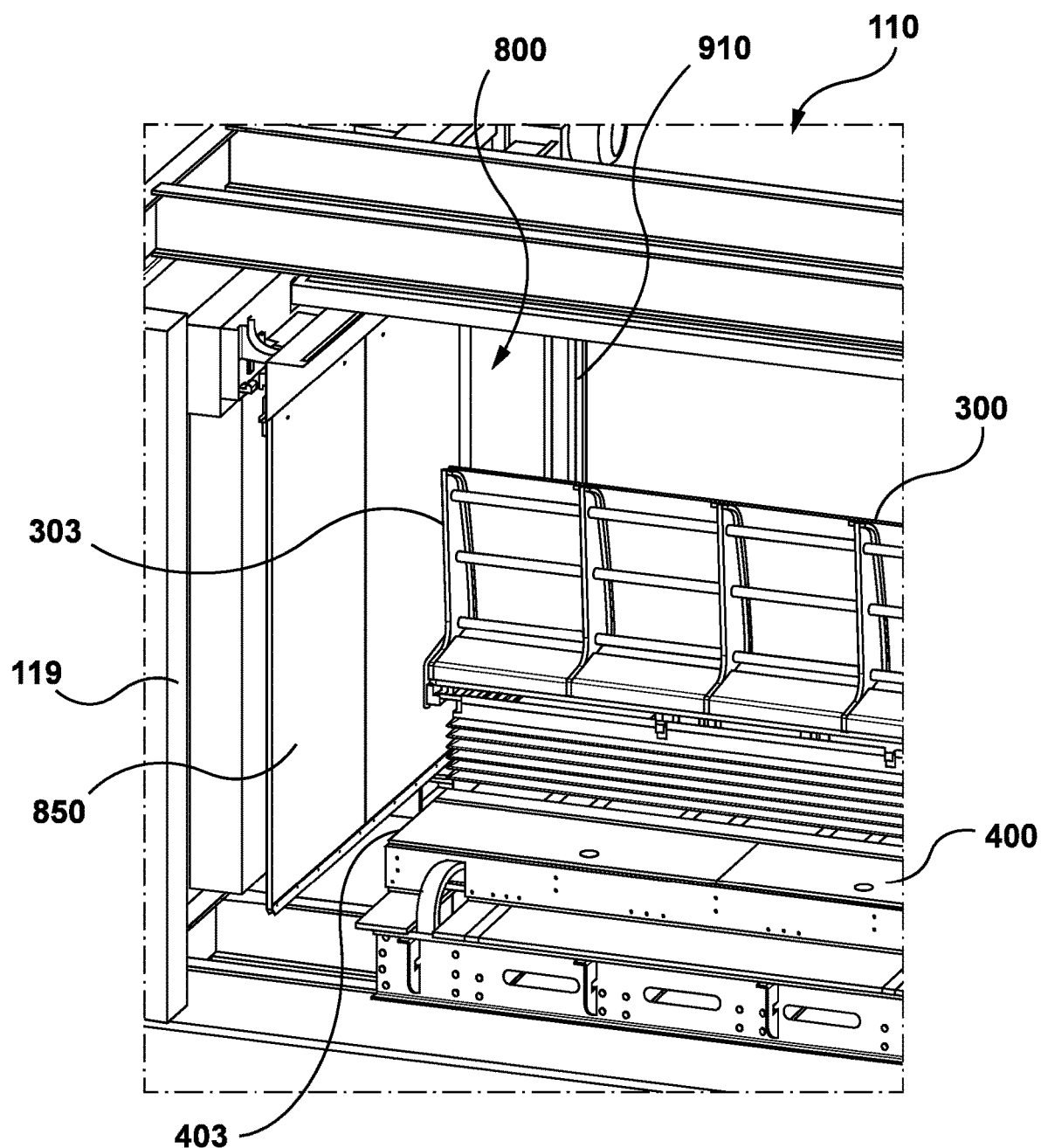
FIG. 38 is a rear perspective view of a seating assembly and bay wall that may be used with the example motion platform system of FIG. 5 in accordance with an embodiment.

The seating assembly 300 may be adjustable between a load state (see e.g. FIG. 36) and a motion state (see e.g. FIG. 37). The motion platform apparatus 200 may be configured to maintain the seating assembly 300 in the motion state while the motion platform 400 moves along the track 450 between the load position and the in-use position. The motion state may be configured to minimize dragging of users' feet while the motion platform 400 is in motion.

Optionally, the seating assembly 300 can include seat position sensors. The seat position sensors may be configured to determine when the seating assembly 300 is positioned in the load state and the motion state. The seat position sensors may be communicatively coupled to control components of the motion simulator system 100. The control components may use the feedback from the seat position sensors to assist in controlling motion of the motion platform 400.

In the motion state, the front end 356 of each seat base 352 may be raised so that each user's feet are further from the upper base surface. For example, when the seating assembly 300 is in the load state, the seat front end 356 may be positioned at a first height $h_{356l}$ relative to the motion platform 400 (see e.g. FIG. 36). When the seating assembly 300 is in the motion state, the seat front end 356 may be positioned at a second height $h_{356m}$ relative to the motion platform 400 (see e.g. FIG. 37). The second height $h_{356m}$ can be selected to be greater than the first height $h_{356l}$. Thus, as the motion platform 400 moves along the track 450, the seat front end 356 can be positioned at the greater second height $h_{356m}$ relative to the motion platform 400.

For example, in the load state, the user seats 350 may be positioned in a first orientation, while in the motion state each user seat 350 is positioned in a second orientation different from the first orientation. Each user seat 350 may be tilted rearwardly in the second orientation relative to the first orientation as in the example illustrated. In the second orientation, the front end 356 of each seat base 352 may be positioned higher than the rear end 358. By tilting each user seat 350 rearwardly, the seat front 356 of each seat base 352 may be raised. This may also encourage riders to maintain their legs at an angled position so their feet are further from the upper base surface 440.

In some cases, the base 352 of each seat 350 may be raised in the motion state as compared to the load state. The seat front end 356 of each seat base 352 can thus be removed to a greater distance from the upper base surface 440 while in the motion state. For example, seat support assembly 700 may include hydraulic or pneumatic actuators operable to raise the height of each seat base 352 while in the motion state.

The first height $h_{356l}$ may be selected to permit a wide range of users to access the seats 350. For example, the first height $h_{356l}$ may be defined in a range between about 16 inches to 24 inches. In some cases, the first height $h_{356l}$ may be defined in a range between about 18 inches to 22 inches. In some cases, the first height $h_{356l}$ may be defined to be about 18 inches, or 19 inches, or 20 inches, or 21 inches, or 22 inches.

The second height $h_{356m}$ may be selected so that the majority of users accessing the seats 350 are unlikely to drag their feet as the seating assembly 300 moves between the ride position and the load position. For example, the second height $h_{356m}$ may be defined in a range between about 24 inches to 30 inches. In some cases, the second height $h_{356m}$ may be defined in a range between about 26 inches to 29 inches. In some cases, the second height $h_{356m}$ may be defined in a range between about 27 inches to 28 inches. In some cases, the second height $h_{356m}$ may be defined to be about 25 inches, or 26 inches, or 27 inches, or 28 inches, or 29 inches, or 30 inches.

Optionally, the seating assembly 300 may remain in the motion state while the motion simulation experience is ongoing. Alternately, however, the seating assembly need not remain in the motion state during the motion simulation experience. Accordingly, the seating assembly 300 may be movable through a greater range of motion, including positions where the front end 356 is below the second height $h_{356m}$. In some cases, the seating assembly 300 may be movable to position where the front end 356 is below the first height $h_{356l}$. For instance, since the seat front ends 356 may be positioned forward of the base front end 412, the risk of user's hitting their feet on the upper base surface 440 may no longer be present during the motion simulation experience.

Tolerance Accommodation Member

The following is a description of a tolerance accommodation member that may be used by itself in any motion simulator system or in any combination or sub-combination with any other feature or features disclosed including the motion platform apparatus, the track mounting assembly, the platform positioning system, the vehicle safety device, and the movable bay wall.

In accordance with this aspect, a tolerance accommodation member is provided that can be used to couple a motion apparatus to a track. The tolerance accommodation member can be configured to couple the motion apparatus to the track while allowing for track variance and facilitating manufacturing and installation of motion platform apparatus.

The tolerance accommodation member can include a plurality of connector sections. A first connector section can be fixedly connected to the motion apparatus while a second connector section is fixedly connected to a drive member used to drive the motion apparatus along the track. The first and second connector sections can move relative to one another to accommodate variations in manufacturing and installation of the track and/or motion platform. The connector sections may also permit continued use of the track and motion platform through changes in the track and/or motion platform due to wear and/or degradation.

For simplicity, various features of the example tolerance accommodation member described herein are described in relation to the motion platform apparatus 200. However, it will be appreciated that these features can also be used in respect of other motion assemblies, such as rear-mounted or suspension-type motion assemblies.

Referring to FIGS. 11 and 13-19, a tolerance accommodation member 430 can be used to movably mount motion platform 400 to track 450. Motion platform 400 may be connected to a drive member 420 by the tolerance accommodation member 430. The drive member 420 operates to drive the motion platform 400 along the track 450. In the example illustrated, drive member 420 can move the motion platform 400 between a load position and an in-use position.

The tolerance accommodation member 430 can mount the motion platform 400 to the drive member 420 and thereby permit the drive member 420 to drive motion of the platform 400 along track 450. The tolerance accommodation member 430 can be configured to transfer drive forces from the drive member 420 to the motion platform 400 to drive the motion platform 400 along the track 450. The tolerance accommodation member 430 may be configured to reduce or prevent other load transfer between the drive member 420 and motion platform 400 apart from drive forces in the forward/rearward direction 113.

The tolerance accommodation member 430 can also be configured to accommodate a range of manufacturing tolerances in the track 450. The tolerance accommodation member 430 may thus permit a limited range of motion between the motion platform 400 and the drive member 420 in order to accommodate track variance. The tolerance accommodation member 430 may also permit the motion platform 400 to continue moving along the track 450 even in the presence of debris (e.g. coins) that may fall into the open track section 454 or onto the upper base surface 440.

The tolerance accommodation member 430 can include a plurality of connector sections or portions. A first connector portion 432 can be fixedly mountable to the motion platform 400. One or more fasteners 460 can be used to fixedly mount the connector portion 432 to the motion platform 400. For instance, bolt fasteners 460 can be used as in the example illustrated, although other fasteners (e.g. screws, rivets) may be used in alternate embodiments.

A second connector portion 434 can be fixedly mountable to the drive member 420. One or more fasteners 462 can fixedly mount the connector portion 434 to the drive member 420. For instance, bolt fasteners 462 can be used as in the example illustrated, although other fasteners (e.g. screws, rivets) may be used in alternate embodiments.

The tolerance accommodation member 430 can be configured to permit the first connector portion 432 and the second connector portion 434 to movable relative to one another. This may allow a distance between the first end 433 of the first connector portion 432 and the first end 435 of the second connector portion 434 to vary. This relative motion may accommodate a range of manufacturing tolerances in the track 450.

In the example illustrated, a third connector portion 436 extends between the first connector portion 432 and the second connector portion 434. The third connector portion 436 can be movably mounted to the first end 433 of the first connector portion 432 and separately movably mounted to a first end 435 of the second connector portion 434. The movable mounting of the third connector portion 436 can allow for the relative motion of the first connector portion 432 and the second connector portion 434.

The third connector portion 436 can be configured to extend from a location above the upper surface 440 of the base 410 to a location below the upper base surface 440. The third connector portion 436 can be mounted to the motion platform on a first side 442 of the upper base surface 440. The third connector portion 436 can be mounted to the drive member 420 on a second side 444 of the upper base surface 440.

The third connector portion 436 may extend through the track 450 to connect the motion platform 400 to the drive member 420. For example, the track 450 can include an open track section 454 (see e.g. FIGS. 11 and 18). The third connector portion 436 may extend through the open track section 454. The open track section 454 and third connector portion 436 may be shaped respectively in order to permit the open track section 454 to guide forward/rearward movement of the third connector portion 436 as the motion platform 400 moves along the track 450.

As shown in the example illustrated, a movable coupling 470 is used to connect the third connector portion 436 to the first connector portion 432. A movable coupling 472 is also used to connect the third connector portion 436 to the second connector portion 434.

In some examples, the third connector portion 436 may include multiple connector sections 437/439. The first connector section 437 and movable coupling 470 can define the movable mounting to the first connector portion 432. The second connector section 439 and movable coupling 472 can define the movable mounting to the second connector portion 434.

Figure 16:
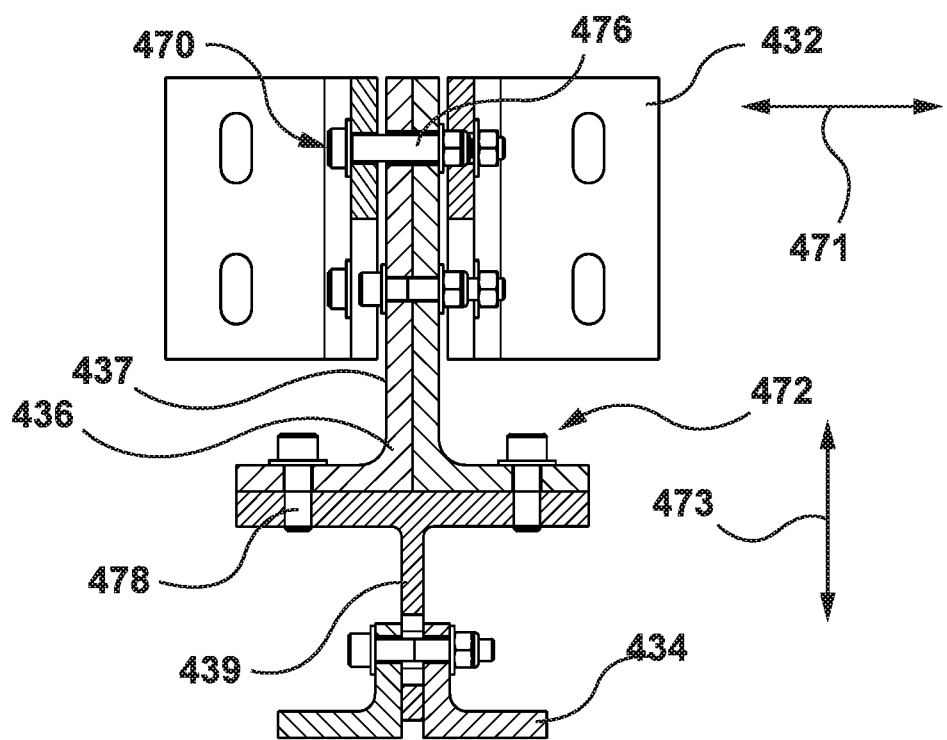
FIG. 16 is a sectional view of the example tolerance accommodation member of FIG. 13 along line 16-16 in FIG. 15.
Figure 17:
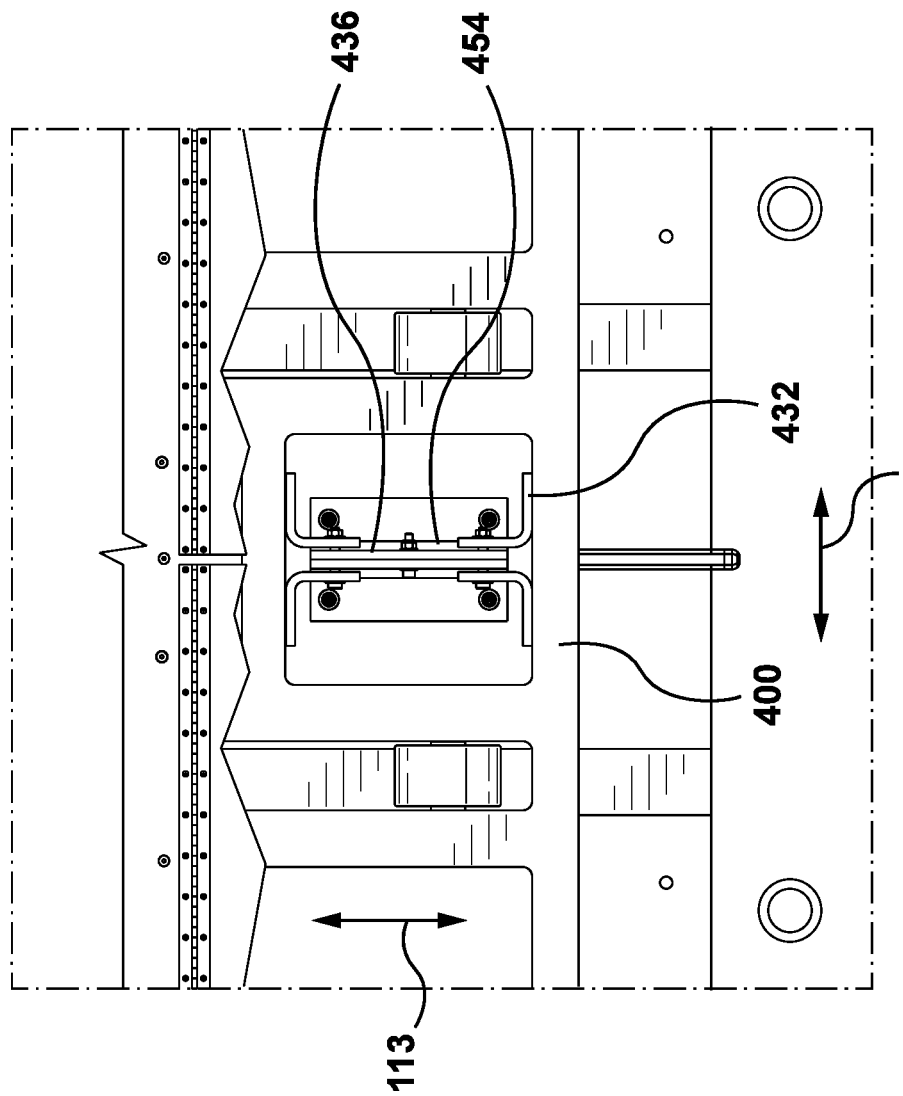
FIG. 17 is an isolated top view of the example motion platform apparatus of FIG. 10 showing the example tolerance accommodation member of FIG. 13 in an installed position accordance with an embodiment.
Figure 18:
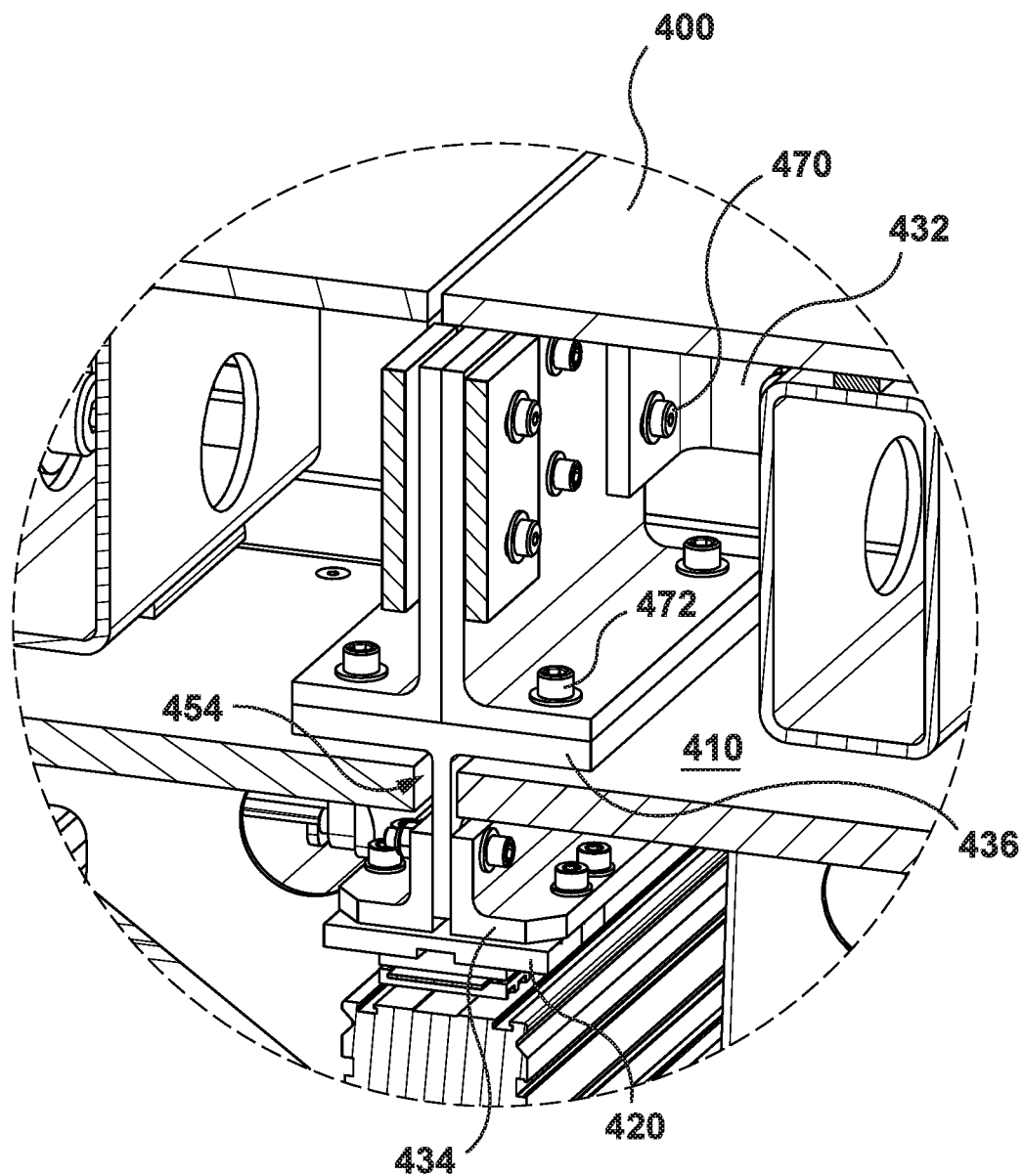
FIG. 18 is a perspective sectional view of the example motion platform apparatus of FIG. 10 showing the example tolerance accommodation member of FIG. 13 in the installed position accordance with an embodiment.

The movable coupling 470 can be configured to permit the third connector portion 436 to move relative to the first connector portion 432 in a first direction 471 (see e.g. FIGS. 16 and 17). When the first connector portion 432 is fixedly mounted to the motion platform 400, the first direction 471 can be aligned as a lateral direction perpendicular to the forward-rearward direction 113 (see e.g. FIG. 17). The movable coupling 470 may thus permit relative lateral movement between the third connector portion 436 and the first connector portion 432 (and, in turn, the motion platform 400).

The movable coupling 470 can be configured to permit a lateral translation of the third connector portion 436 relative to the first connector portion 432. The movable coupling 470 may also inhibit other relative motion between the third connector portion 436 and the first connector portion 432. This may help avoid any twisting or pitching of the motion platform 400.

For example, the movable coupling 470 may be configured to inhibit relative motion between the third connector portion 436 and the first connector portion 432 in the forward-rearward direction 113. The movable coupling 470 may also be configured to inhibit relative motion between the third connector portion 436 and the first connector portion 432 in a vertical direction 473.

In the example illustrated, the movable coupling 470 includes a pair of sliding bushings 476. The sliding bushings 476 can permit the third connector portion 436 to slide (translate) relative to the first connector portion 432 in the lateral direction 471. The bushings 476 can also inhibit or prevent relative motion between the third connector portion 436 and the first connector portion 432 in directions other than the lateral direction 471.

As shown in the example illustrated, a movable coupling 472 is used to connect the third connector portion 436 to the second connector portion 434. The movable coupling 472 can be configured to permit the third connector portion 436 to move relative to the first connector portion 434 in a second direction 473 (see e.g. FIGS. 16 and 19). The second direction 473 of motion permitted by movable coupling 472 can be perpendicular to the first direction 471 of motion permitted by movable coupling 470.

Figure 19:
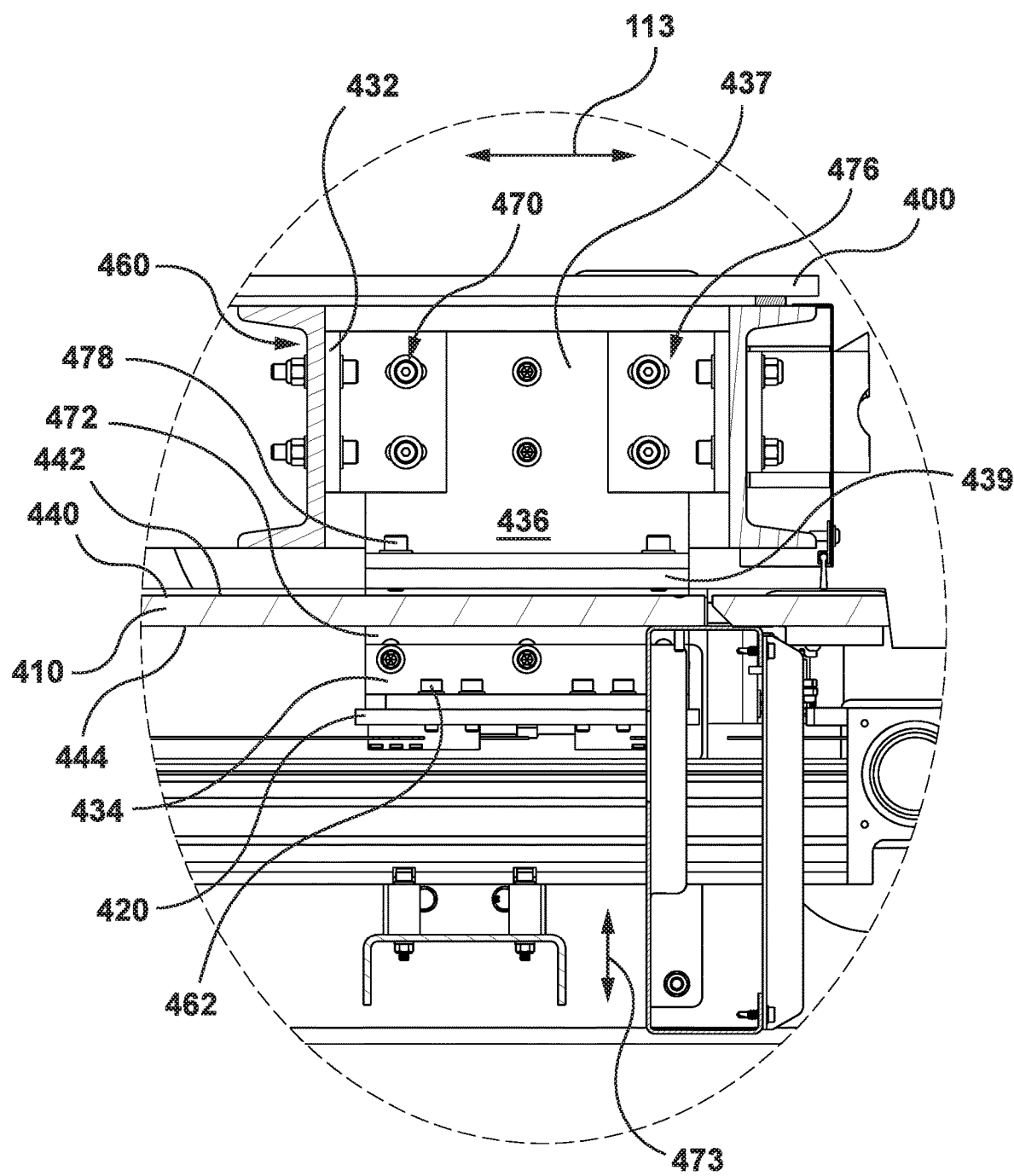
FIG. 19 is a sectional side view of the example motion platform apparatus of FIG. 10 showing the example tolerance accommodation member of FIG. 13 in the installed position accordance with an embodiment.

When the second connector portion 434 is fixedly mounted to the drive member 420, the second direction 473 can be aligned as a vertical direction perpendicular to the forward-rearward direction 113 (see e.g. FIG. 19). The movable coupling 472 may thus permit relative lateral movement between the third connector portion 436 and the second connector portion 434 (and, in turn, the drive member 420).

The movable coupling 472 can be configured to permit a vertical translation of the third connector portion 436 relative to the second connector portion 434. The movable coupling 472 may also inhibit other relative motion between the third connector portion 436 and the second connector portion 432. This may help avoid any twisting or pitching of the motion platform 400.

For example, the movable coupling 473 may be configured to inhibit relative motion between the third connector portion 436 and the second connector portion 434 in the forward-rearward direction 113. The movable coupling 472 may also be configured to inhibit relative motion between the third connector portion 436 and the second connector portion 434 in the lateral direction 471.

In the example illustrated, the movable coupling 472 includes a pair of sliding bushings 478. The sliding bushings 478 can permit the third connector portion 436 to slide (translate) relative to the second connector portion 434 in the vertical direction 473. The bushings 478 can also inhibit or prevent relative motion between the third connector portion 436 and the second connector portion 434 in directions other than the vertical direction 473.

In some examples, the tolerance accommodation member 430 may not be the sole mounting element used to mount the motion platform 400 to the track 450. The motion platform apparatus 200 may include further track mounting assemblies in addition to the tolerance accommodation member 430. For example, the motion platform apparatus 200 may also include a plurality of track connector assemblies 500 (see e.g. FIG. 11). Each track connector assembly 500 may be mounted to the motion platform 400 and movably mounted to the track 450.

In some cases, a pair of track connector assemblies may be mounted to the motion platform 400 and the track 450 as in the example illustrated. The tolerance accommodation member 430 and the track connector assemblies can be spaced apart in the lateral direction 115.

As shown, the tolerance accommodation member 430 can be positioned between the two track connector assemblies 500 in the lateral direction 115. For instance, the tolerance accommodation member 430 may be positioned centrally below the motion platform 400 with the track connector assemblies 500 positioned laterally outward towards each lateral side 405 and 407. This may help maintain the motion platform 400 in alignment along the track 450 as it moves between the loading position and the ride position.

Track Mounting Assembly

The following is a description of a track mounting assembly that may be used by itself in any motion simulator system or in any combination or sub-combination with any other feature or features disclosed including the motion platform apparatus, the tolerance accommodation member, the platform positioning system, the vehicle safety device, and the movable bay wall.

In accordance with this aspect, a track mounting assembly that can be used to mount a motion assembly to a track. The track mounting assembly can include a pair of track members mounted to the motion assembly. The track members engage one another about the track to maintain the motion assembly mounted to the track.

For simplicity, various features of the example track mounting assembly described herein are described in relation to the motion platform apparatus 200. However, it will be appreciated that these features can also be used in respect of other motion assemblies, such as rear-mounted or suspension-type motion assemblies.

In some examples, the motion platform 400 can be mounted to the track 450 using a mounting assembly 500 (see e.g. FIGS. 20-23 and 30-31). In the example illustrated, the motion platform 400 may be mounted to the track using a forward mounting assembly 500f proximate the front end 402 of the motion platform 400 and a rear mounting assembly 500r proximate the rear end 404.

A mounting assembly 500 can include a first track member 510 and a second track member 520. Both the first track member 510 and the second track member 520 can be connected to the motion platform 400. The first track member 510 may be fixedly mounted to the motion platform 400. The second track member 520 can also be fixedly mounted to the motion platform 400.

The mounting assembly 500 can movably mount the motion platform 400 on a track surface, such as surface 440 of the track 450. The first track member 510 and second track member 520 can cooperate to mount the motion platform 400 with the platform 400 being movable along the track 450.

The first track member 510 may be movably mountable on a first surface of the track 450. For instance, the track member 510 can be mounted on the upper track surface 440 as in the example illustrated. The first track member 510 may be movable along the track surface 440 to allow the motion platform 400 to travel along the track 450.

For example, the first track member 510 can include a rotatable mounting element such as a roller 514. The rotatable mounting element can be configured to roll along the surface of the track 450. Alternately, the first track member 510 may include a translatable mounting element configured to translate or slide along the surface of the track 450.

The first track member 510 can include a coupling section 512 that extends through the surface of the track 450 when first track member 410 is mounted to the track 450. For instance, the coupling section 512 may extend below the upper track surface 440 as in the example shown. The coupling section 512 can be configured to engage the second track member 520 in order to secure the motion platform 400 to the track 450.

For example, the rotatable or translatable coupling element may include a flanged section that extends below the track surface 440. In the example illustrated, roller 514 is provided by a flanged wheel 516.

The flanged wheel 515 can include a wheel section 515. The wheel section 515 can to roll along the surface of the track 450 when the first track member 510 is mounted to the track 450. The wheel section 515 can be connected to the motion platform 400 by rotatable connector 519. The rotatable connector 519 can permit rotational motion of the roller 514. The rotatable connector 519 may also be configured to prevent or inhibit other motion (e.g. lateral, vertical, and forward/rearward) of the roller 514 relative to the motion platform 400.

The flanged wheel 515 can also include a flange section 517. The flange section 517 can extend radially outwardly from the perimeter of the wheel section 515. The flange 517, or at least a portion thereof, can extend through the track 450. In the example illustrated, the flanged section 517 extends downward through the track 450 (through open section 452) when the wheel section 515 is mounted to the track 450 on the upper base surface 440. The flange section 517 may define the coupling section of the first track member 510.

The second track member 520 may be configured as a captive arm member. The second track member 520 can include a first arm portion 522 that is connectable to the motion platform 400. The first arm portion 522 can be connected to the motion platform 400 in a fixed position.

The second track member 520 can also include a second arm portion 524. The second arm portion 524 can be arranged to extend below the upper track surface 440 when the second track member 520 is installed. The second track member 520 can be positioned to extend the second arm portion 524 to an engagement height H (see FIG. 20) where the second arm portion 524 can engage the coupling section 512 (which may also be referred to as a coupling member).

The second arm portion 524 and coupling section 512 can engage one another at the engagement height. For example, the second arm portion 524 and coupling section 512 may be matingly engageable. The engagement between the second arm portion 524 and coupling section 512 can secure the motion platform 400 to track 450. The second arm portion 524 can be configured to maintain engagement with the coupling section 512 as the first track member 510 moves along the track 450. The first track member 510 and second track member 520 may thus cooperate to maintain the motion platform 400 on the track 450.

In the example illustrated, the second arm portion 520 includes a wheel 526. As the first track member 510 moves along the track 450, the wheel 526 may roll along the underside of the track 450. The wheel 526 may maintain engagement with the coupling section 512 as it rolls.

The wheel 526 can be shaped to engage the coupling section 512 of the first track member 510. For example, the wheel 526 may include a groove shaped to engage the flanged section 517. The wheel 526 may include outer wheel sections with a groove or recess therebetween shaped to receive and engage flanged section 517. The wheel 526 and flanged section 517 may maintain their engagement as both wheel 526 and roller 514 roll along the track 450.

The height at which the coupling section 512 engages the second arm portion 524 may vary due to minor differences in components of the motion platform apparatus 200 (e.g. motion platform 400, track 450, etc.) that arise during manufacturing and/or installation. Accordingly, the second track member 520 may be secured to the motion platform 400 using an adjustable connector assembly 530. The adjustable connector assembly 530 can be used to adjust the engagement height at which the second arm portion 524 engages the coupling section 512.

The adjustable connector assembly 530 can be adjusted during installation to engage the second arm portion 524 with the coupling section 512. The connector assembly 530 can then retain the second arm portion 524 in a fixed position relative to the motion platform 400. The adjustable connector assembly 530 may also permit subsequent re-adjustment of the engagement height, e.g. to account for changes due to use and/or wear of the motion platform apparatus 200.

Figure 31:
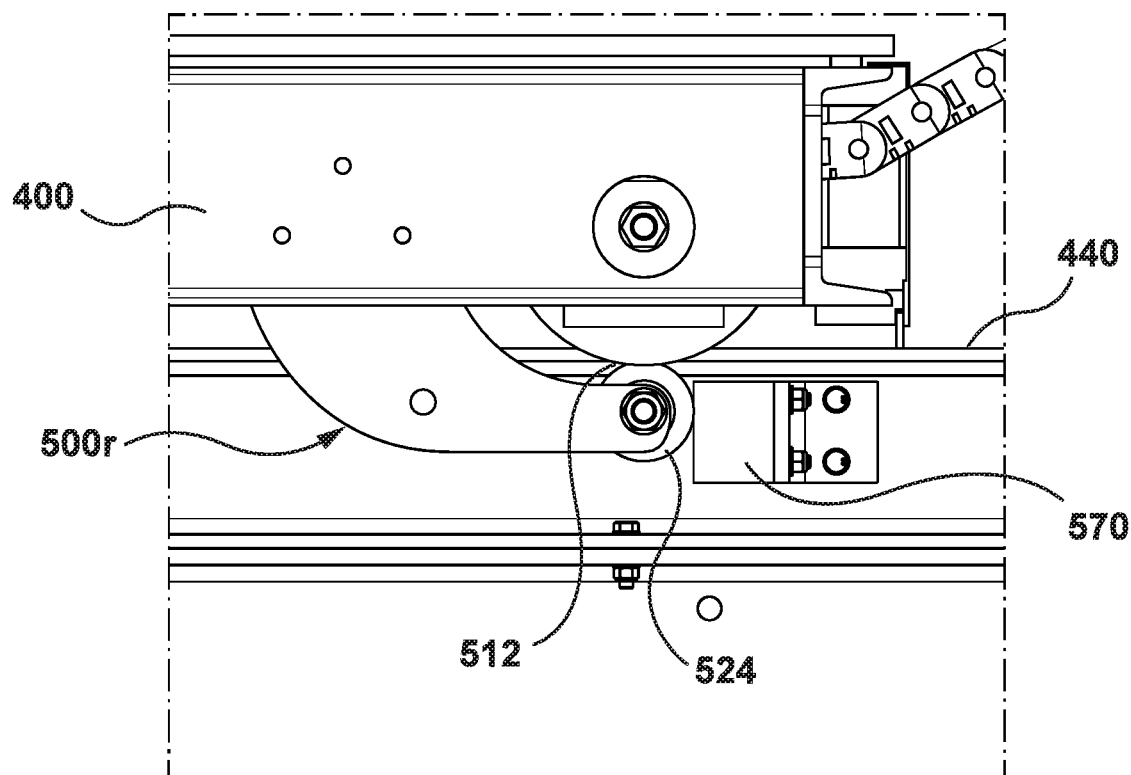
FIG. 31 is a side view of the example positioning member of FIG. 30.
Figure 32:
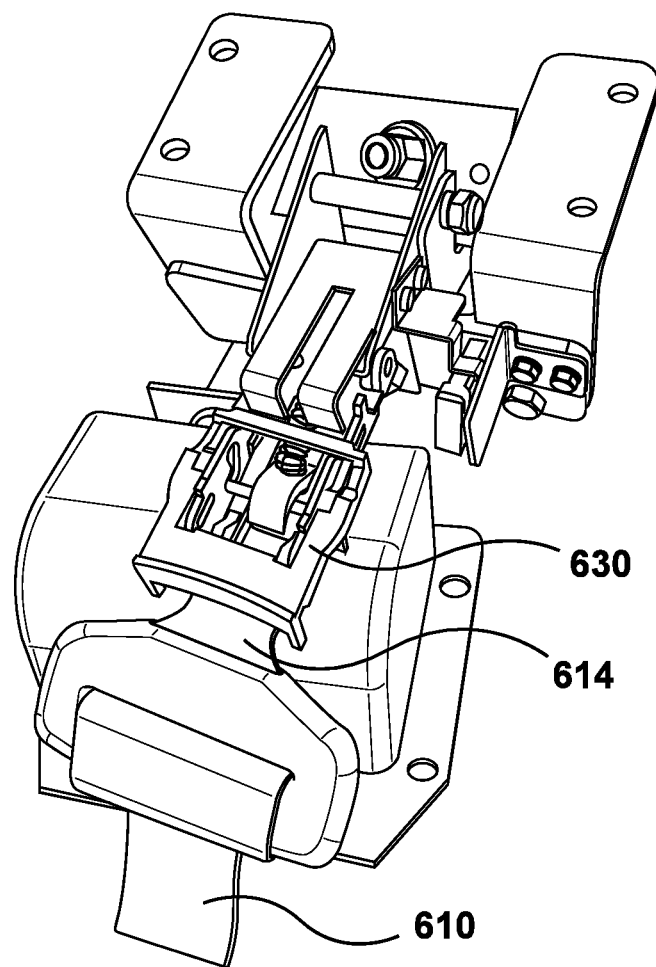
FIG. 32 is a perspective view of a seatbelt receiver assembly that may be used with the motion platform apparatus of FIG. 10 with the seatbelt in an engaged position in accordance with an embodiment.

As shown in FIG. 31, the first arm portion 510 is connected to the motion platform 400 by an adjustable connector assembly 530. The adjustable connector assembly 530 is usable to adjust the engagement height of the second arm portion 524.

For example, the adjustable connector assembly 530 can include a pivot connector 532. The pivot connector 532 may pivotably connect the first arm portion 522 to the motion platform 400. The first arm portion 522 can pivot about the pivot connector 532 to adjust the engagement height of the second arm portion 524.

Figure 21:
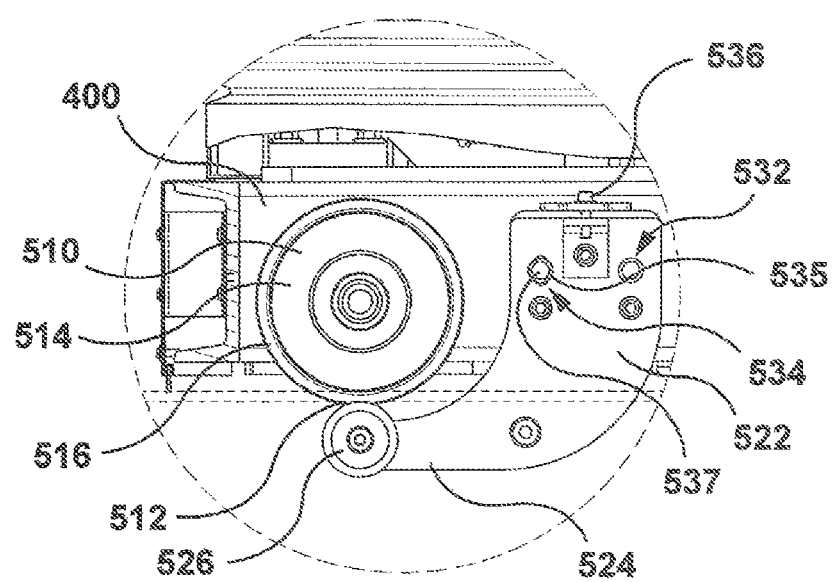
FIG. 21 is an isolation view of region 21' in FIG. 20 showing an example mounting assembly in accordance with an embodiment.
Figure 22:
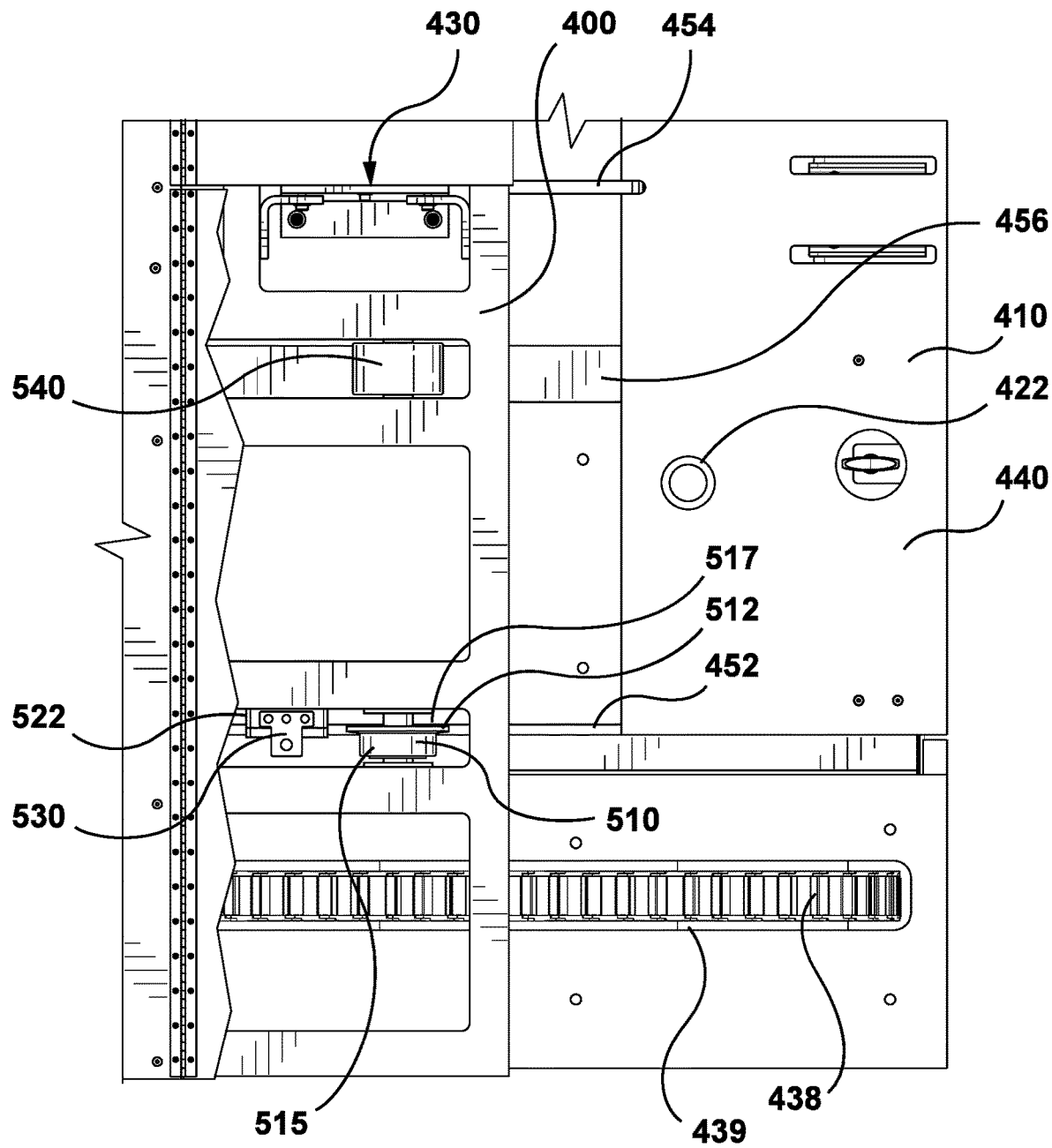
FIG. 22 is an isolated top view of the example motion platform apparatus of FIG. 10 in accordance with an embodiment.
Figure 23:
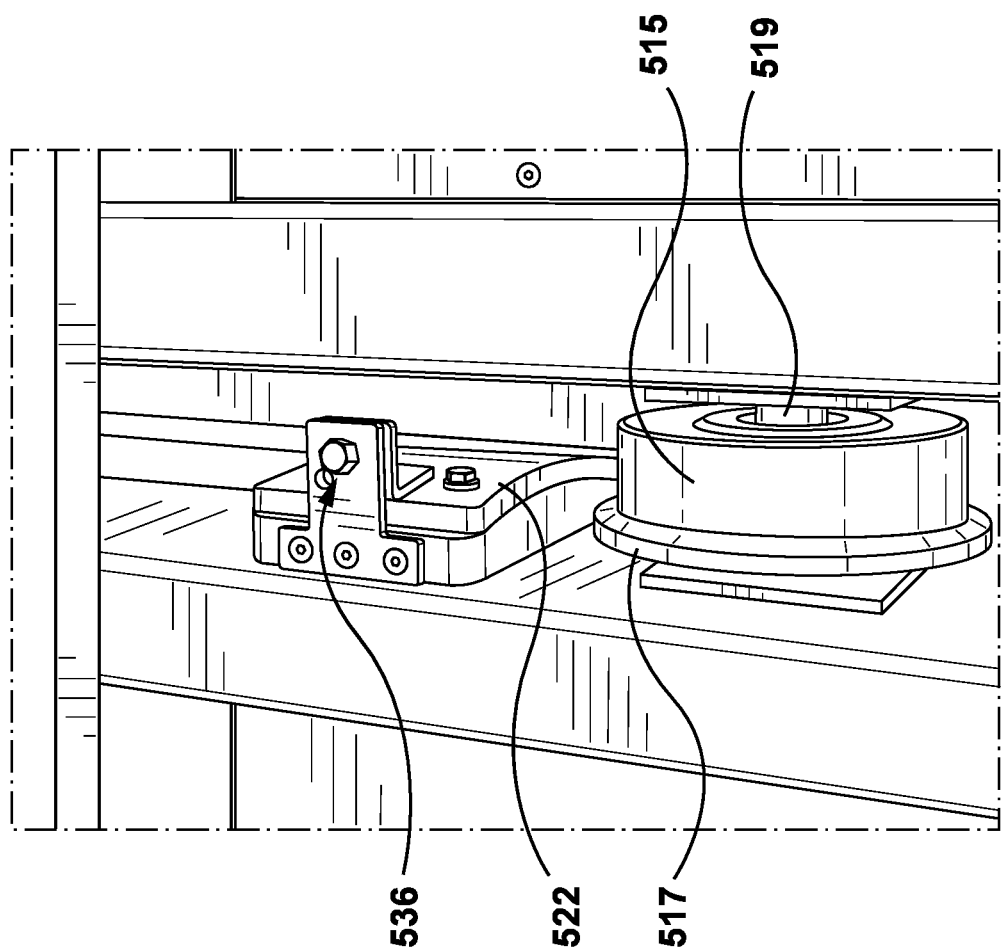
FIG. 23 is an isolated perspective top view of the example motion platform apparatus of FIG. 10 showing an example mounting assembly in accordance with an embodiment.

The adjustable connector assembly 530 may also include an adjustment limiting member 534. The adjustment limiting member 534 may define an adjustment range for the first arm portion 510. The adjustment range may in effect limit the range of the engagement height. For example, the adjustment limiting member 534 may be a pivot limiting member as shown in FIG. 21. The pivot limiting member can define a pivot range and the first arm portion 522 can be prevented from pivoting outside of the pivot range. In the example illustrated, the adjustment limiting member 534 may be defined by a fastener 537 that is receivable within a slot 525. The slot 535 may define the range of motion within which the corresponding fastener 537 is permitted to move.

The adjustable connector assembly 530 also includes an adjustment member 536. The adjustment member 536 is usable to adjust the position of the connector assembly 530. In the example illustrates, the adjustment member 536 is provided as an adjustment screw. The screw can be adjusted (e.g. tightened or loosened) to adjust the connection between the second arm portion 520 and the motion platform 400. This, in turn, causes the arm 520 to pivot about pivot connection 532, and thereby adjust the engagement height.

The adjustment member 536 can also be secured in position. This may define the engagement height for the second arm portion 524 at a fixed location. For instance, the adjustment screw may be fixed at a defined height to maintain the engagement height at a fixed position.

Platform Positioning System

The following is a description of a positioning system that may be used by itself in any motion simulator system or in any combination or sub-combination with any other feature or features disclosed including the motion platform apparatus, the tolerance accommodation member, the track mounting assembly, the vehicle safety device and the movable bay wall.

In accordance with this aspect, a positioning system can include a first lock unit that secures a ride accommodation assembly in a ride position and a second separate lock unit that secures the ride accommodation assembly in a loading position. The load position lock may include a drive member lock that prevents the assembly drive member from moving when the load position lock is activated. The ride position lock may include a mechanical lock that secures the ride accommodation assembly in place. This may allow the drive member to be deactivated while the assembly is in the ride position, which may prevent load transfer to the drive member during a motion simulation experience.

The positioning system can also include additional positioning members. The positioning members can be arranged to ensure that the ride accommodation assembly is maintained within a define motion path. The positioning members can prevent the ride accommodation assembly from travelling beyond the desired ride and/or loading positions.

The positioning system can also include assembly monitoring sensors. The monitoring sensors can be arranged to detect the position of the ride accommodation assembly. The monitoring sensors can be used to determine whether the ride accommodation assembly is positioned in the loading position, ride position, or another position. The monitoring sensors may be used by a vehicle controller to ensure that the ride accommodation assembly is in the correct position prior to performing certain actions such as activating a motion simulation experience, or deactivating user seatbelts.

For simplicity, various features of the example positioning system described herein are described in relation to the motion platform apparatus 200. However, it will be appreciated that these features can also be used in respect of other motion assemblies, such as rear-mounted or suspension-type motion assemblies.

A motion platform apparatus can include a ride accommodation assembly that is movably mounted to a track. The ride accommodation assembly can move along the track between a loading position and an in-use or ride position. In the loading position, users can embark and disembark from the ride accommodation assembly. In the in-use position, the ride accommodation assembly can be moved in accordance with a motion simulation experience.

As illustrated, motion platform apparatus 200 can include a ride accommodation assembly in the form of a seating assembly 300. The seating assembly 300 can be movably mounted to track 450. As shown, the seating assembly 300 is movably mounted to track 450 by a motion platform 400. The motion platform 400 can move along the track 450 between a load position and an in-use position. In the example illustrated, the load position is rearward of the in-use position.

In operation, the motion platform apparatus 200 can be moved between the loading position and the in-use position. When the motion platform apparatus 200 is undergoing passenger loading or unloading, the motion platform 400 can be secured in the loading position. When the motion platform apparatus 200 is providing a motion simulation experience, the motion platform 400 can be secured in the motion position.

The motion platform apparatus 200 can include a platform positioning system usable to maintain the motion platform 400 in the loading position and/or the in-use position. The platform positioning system can include one or more locks usable to secure the motion platform 400 in the loading position and/or the in-use position. The platform positioning system can also include motion limiting members usable to prevent the motion platform 400 from travelling along the track 450 beyond the in-use position or loading position.

The motion platform apparatus 200 can include a first lock unit operable to secure the motion platform 400 in the load position. The first lock unit can be adjusted between an engaged or locked position and a disengaged or unlocked position. When the motion platform 400 is in the load position and the first lock unit is engaged, the first lock unit can secure the motion platform 400 in the load position. When the first lock unit is released, the motion platform 400 may be moved to the in-use position.

The motion platform apparatus 200 can also include a second lock unit 550. The second lock unit 550 can secure the motion platform 400 in the in-use position. When the motion platform 400 is in the in-use position and the second lock unit 550 is engaged, the second lock unit 550 can secure the motion platform 400 in the in-use position. When the second lock unit 550 is released, the motion platform 400 may be returned to the load position.

The second lock unit 550 may be a separate lock from the first lock unit used to secure the motion platform 400 in the load position. The second lock unit 550 may be configured to minimize load transfer from the motion platform 400 when the seating assembly undergoes a motion simulation experience.

Alternately, the first lock unit may be used to secure the motion platform 400 in both the load and in-use position. This may simplify the control and manufacturing of the locking system for motion platform apparatus 200.

Alternately or in addition, both the first lock unit and second lock unit 550 may be used to secure the motion platform 400 in the in-use position. This may provide a redundant locking system to ensure that the motion platform 400 remains in the in-use position during a motion simulation experience.

The motion platform apparatus 200 can include an actuator or drive member 420. The drive member 420 can be drivingly connected to the motion platform 400. The drive member 420 can operate to drive the motion platform 400 along the track 450 between the load position and the in-use position.

The first lock unit may be configured to manage operation of the drive member 420. The first lock unit may be configured to prevent the drive member 420 from moving along the track 450 when in the engaged position. In its locked state the first lock unit can prevent the drive member 420 from moving along the track 450. In its unlocked state, the first lock unit may no longer prevent the drive member 420 from moving along the track 450. The first lock unit may be configured as a type of motor or engine brake that can operate to prevent the drive member 420 from driving motion of the motion platform 400.

The first lock unit may be engaged when the motion platform 400 is positioned in a load position. The motion platform apparatus 200 can include a vehicle controller operable to control and monitor operations of the motion platform apparatus 200. The vehicle controller can determine that the motion platform position 400 is positioned in the load position and engage the first lock unit while users are undergoing loading or unloading. The first lock unit may prevent the drive member 420 from receiving power to drive the motion platform 400 when in the locked state. This may ensure that the motion platform 400 does not provide unwanted motion while loading.

Once loading is completed, the first lock unit may be released (e.g. adjusted to the disengaged or unlocked state). For example, the vehicle controller may transmit an unlock signal to the first lock unit. The drive member 420 may then be operated to move the motion platform 400 to the in-use position along the track 450. When the motion platform 400 reaches the in-use position, the second lock unit 550 can hold the motion platform 400 in the in-use position.

In the example illustrated, the second lock unit 550 can include a mechanical lock 552. The mechanical lock 552 can be positioned to engage the motion platform 400 when the motion platform 400 is positioned in the in-use position. The mechanical lock 552 can include corresponding engagement members connected to the motion platform 400 and to the base 410. The engagement members may lockingly engage one another to secure the motion platform 400 to the base 410.

For example, the mechanical lock 552 may include a latch 554 and a corresponding engagement arm 556. The engagement arm 556 can be received by the latch member 554 when the motion platform 400 is moved to the in-use position. The latch member 554 may secure the engagement arm 556 in position, thereby preventing the motion platform 400 from travelling along the track 450.

In the example illustrated, the latch 554 is mounted to base 410 and the engagement arm 556 extends from the motion platform 400. Alternately, the latch 554 may be mounted to the motion platform 400 with the corresponding engagement arm 556 provided by the base 410.

In the example illustrated, the mechanical lock 552 is positioned to automatically engage the motion platform 400 when the motion platform 400 is moved to the in-use position. The mechanical lock 552 may define a rotary lock unit that is configured to engage the motion platform 400 as it reaches the in-use position.

In the example illustrated, the engagement arm 556 is mounted on an extension portion 401 of the motion platform 400. The extension portion 401 extends below the upper surface 440 of the base 410 (see e.g. FIGS. 25 and 26). As the motion platform 400 moves to the in-use position, the engagement arm 556 engages with the latch 554 and causes the latch 554. The engagement arm 556 is then received within the lock recess 555 and the latch 554 returns to its extended position, securing the engagement arm 556 within the recess 555.

When the motion platform 400 is positioned in the in-use position, with the second lock unit 550 engaged, the motion platform 400 can be retained in the in-use position during a motion simulation experience. The second lock unit 550 can hold the motion platform 400 in position while the seating assembly 300 is moved in the motion simulation experience. The mechanical lock 552 may be configured to handle the dynamic loading caused by the motion of the seating assembly 300.

When the motion platform 400 reaches the in-use position, the drive member 420 may then be deactivated (e.g. power to the drive member 420 may be disconnected). This may reduce or prevent the transfer of load forces from the motion simulation experience to the drive member 420, which may help reduce wear and damage to the drive member 420.

The second lock unit 550 can be adjusted between a locked state and an unlocked state. In the locked state, the second lock unit 550 secures the motion platform 400 in the in-use position and prevents the motion platform 400 from travelling rearward along the track 450. In the unlocked state, the motion platform 400 is movable rearward along the track 450. To allow the motion platform 400 to be returned to the load position, the second lock unit 550 can be released. The motion platform 400 can then be returned to the load position, e.g. by re-activating the drive member 420 and driving motion platform 400 along the track 450.

The second lock unit 550 can be biased to the locked state. As shown, latch 554 is biased to an extended position enclosing the lock recess 555. The second lock unit 550 can be adjusted to the unlocked state in response to a release signal. For example, a remote release override switch may be connected to the second lock unit 550. The remote release override switch can be coupled to the second lock unit 550 by release cabling 568. The remote release override switch may provide a release signal to disengage the second lock unit 550. For example, the vehicle controller may control the operation of the remote release override switch to disengage the second lock unit 550.

In some examples, the motion platform apparatus may include ride position lock units positioned to engage the motion platform 400 proximate both lateral sides 403 and 405. For example, the motion platform apparatus 200 may include a pair of lock units 550 for each motion platform 400 (see e.g. FIG. 9). The lock units 550 can be positioned proximate the lateral sides 413 and 415 of the base 410.

In the example shown, the lock units 550 can be positioned proximate each of the outer track section 452. The lock units 550 may be configured to engage extensions 401 of the motion platform 400 extending through the outer track sections 452.

Arranging the ride position locks 550 to engage the outer sides 403/405 of the motion platform 400 may help stabilize the motion platform 400 during a motion simulation experience. For example, positioning ride position locks 550 that engage the motion platform 400 laterally outward from the center of the motion platform may provide greater stability when there is an unbalanced load of users of the seating assembly 300.

Alternately or in addition, a lock unit may be positioned to engage the motion platform 400 centrally. For example, a lock unit 550 may be positioned proximate the central open section 454 of the track 450.

The motion platform apparatus 200 can also include additional positioning elements that can maintain the motion platform 400 within the platform motion path. The positioning elements may be configured to ensure that motion platform 400 does not travel beyond the track front end 451 or track rear end 453.

Figure 29:
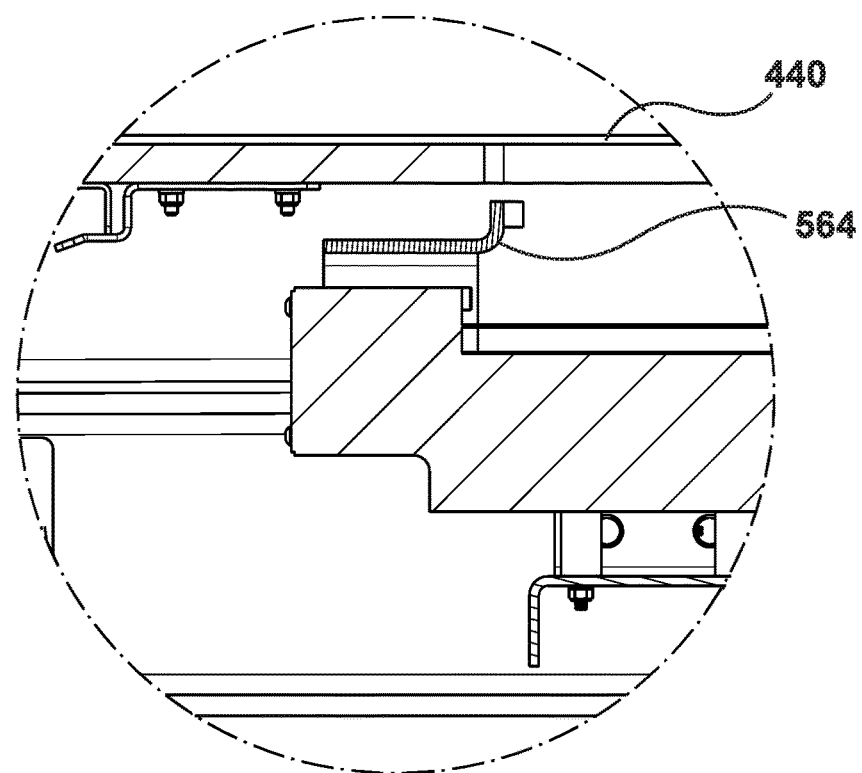
FIG. 29 is a side sectional view of an example positioning member that may be used with the example motion platform apparatus of FIG. 10 in accordance with an embodiment.

In some examples, the motion platform apparatus 200 can include a forward positioning member or stop member 564 (see e.g. FIG. 29). The stop member 564 can be positioned to engage the motion platform 400 as the motion platform is moved to the in-use position. The stop member 564 can be configured to prevent the motion platform 400 from travelling forward of the in-use position. In the example illustrated, the front stop member 564 can be positioned to engage the second arm portion 524 of a forward connector assembly.

The motion platform apparatus 200 may also include one or more damping members 566. A damping member 566 can be positioned to engage the motion platform 400 when the motion platform 400 is moved to the in-use position or the load position. The damping member 566 can be configured to slow the motion platform 400 as it reaches the respective position and prevent further motion of the motion platform. This may provide a smoother stopping action for the motion platform 400.

Figure 26:
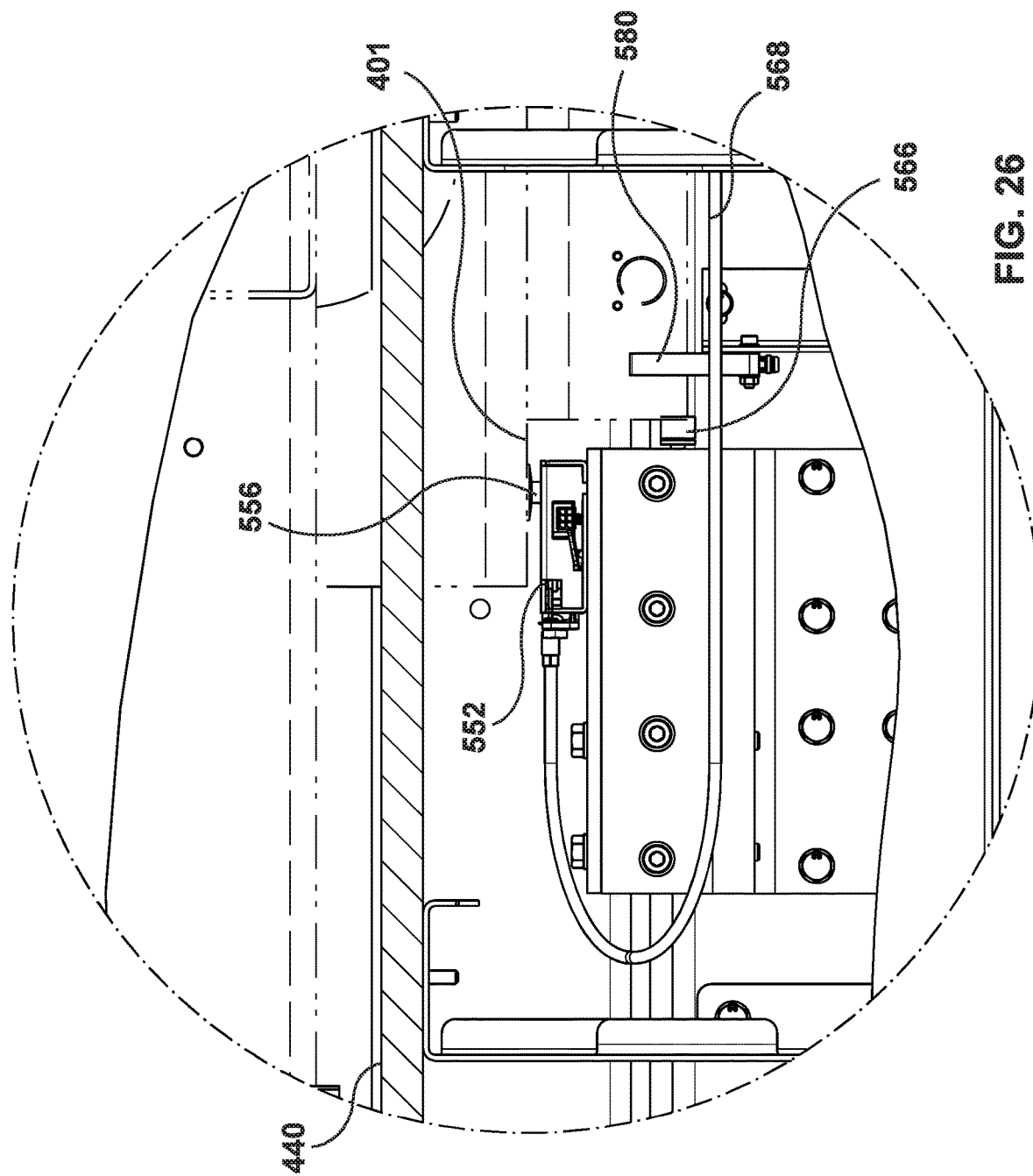
FIG. 26 is an opposite side section view of the example lock unit of FIG. 25.
Figure 28:
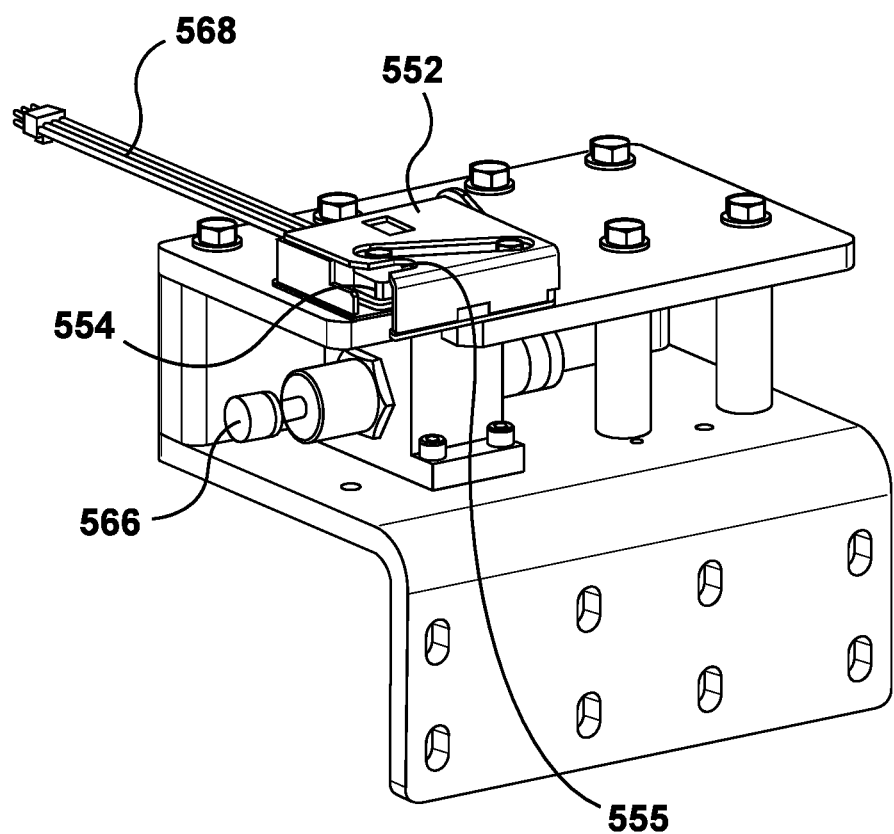
FIG. 28 is a perspective isolation view of the example lock unit of FIG. 25 and an example damping member that may be used with the example motion platform apparatus of FIG. 10 in accordance with an embodiment.

In the example illustrated, a damping member 566 is positioned proximate the load position (see e.g. FIGS. 26 and 28). The damping member 566 can engage an extension portion 401 of the motion platform 400 as the motion platform 400 nears the in-use position (see e.g. FIG. 26). This may provide a smoother stopping action for the motion platform, providing users with a more comfortable experience.

Alternately or in addition, a damping member 566 may be positioned proximate the load position. The load position damper may similarly be configured to slow the motion of the motion platform as it is moved to the load position.

Figure 30:
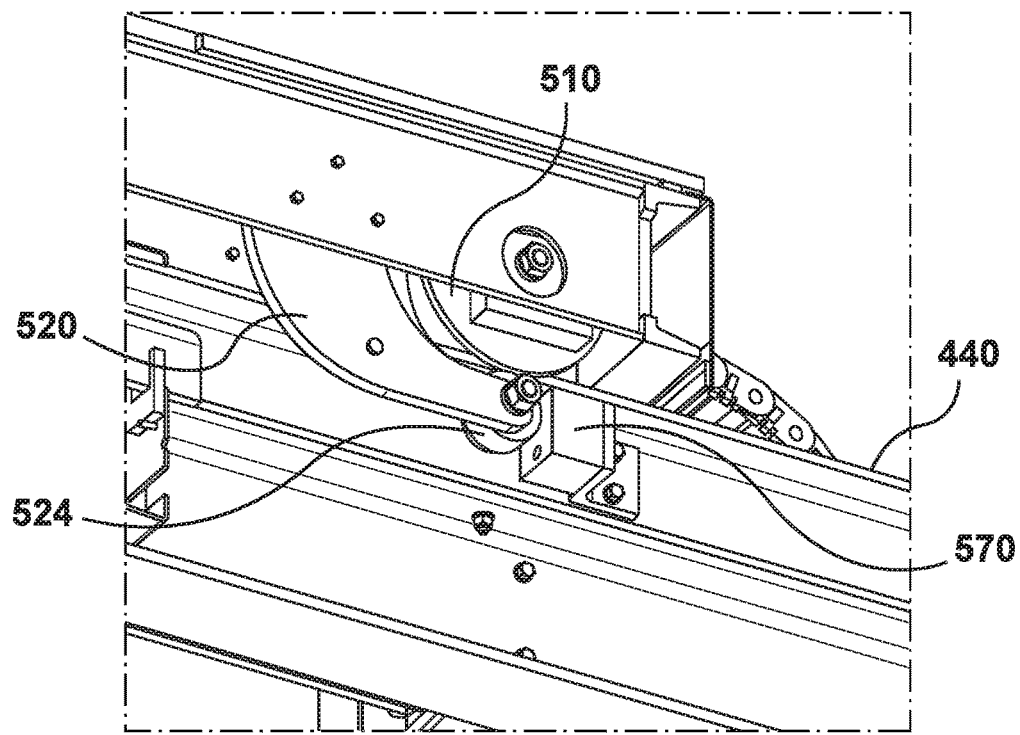
FIG. 30 is a bottom side perspective view of another example positioning member that may be used with the example motion platform apparatus of FIG. 10 in accordance with an embodiment.

In some examples, the motion platform apparatus 200 can include a rear positioning member or stop member 570 (see e.g. FIGS. 30 and 31). The stop member 570 can be positioned to engage the motion platform 400 as the motion platform is moved to the load position. The stop member 570 can be configured to prevent the motion platform 400 from travelling rearward of the load position. In the example illustrated, the rear stop member 570 can be positioned to engage the second arm portion 524 of a rear connector assembly 500r.

The motion platform apparatus 200 can also include one or more position sensors operable to detect a position of the motion platform 400. The vehicle controller may monitor the position sensors to determine when the motion platform 400 is positioned in the load position and/or the in-use position. The vehicle controller may also monitor the position sensors to detect when the motion platform 400 is in intermediate positions while travelling between the load position and in-use position. The vehicle controller can use the platform position signals to control the operation of various components of the motion platform apparatus 200, such as the drive member 420, vehicle safety device 600, movable wall 850, front door 900, display 120 etc.

Figure 27:
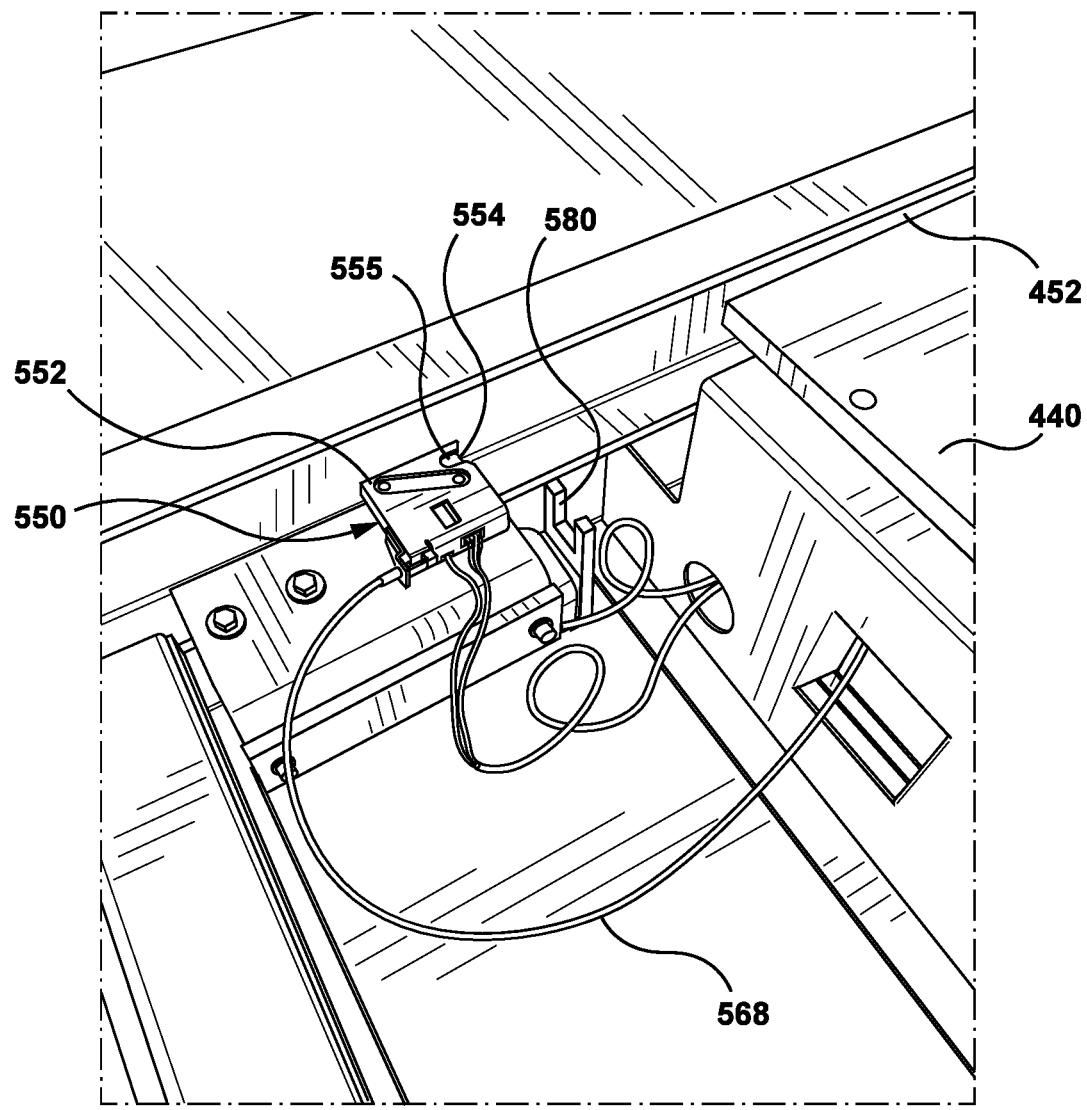
FIG. 27 is a top perspective view of the example lock unit of FIG. 25.

In some examples, the motion platform apparatus 200 can include a ride position sensor 580 (see e.g. FIGS. 9 and 26-27). In the example illustrated, the ride position sensor 580 is positioned proximate the in-use position of the motion platform 400. The ride position sensor 580 can be configured to determine whether the motion platform 400 is positioned in the in-use position. For example, the ride position sensor 580 may be an optical sensor usable to detect the presence or absence of the motion platform extension 401. Detection of the motion platform extension 401 can indicate that the motion platform 400 is positioned in the in-use position. Alternately, other types of position sensors may be used, such as magnetic sensors for example.

In some examples, the motion platform apparatus 200 can include one or more load position sensors 422 (see e.g. FIGS. 8 and 9). In the example illustrated, the load position sensors 422 are positioned proximate the load position of the motion platform 400. The load position sensors 422 can be configured to determine whether the motion platform 400 is positioned in the load position. For example, the load position sensors 422 may be an optical sensor usable to detect the presence or absence of the motion platform 400 (see e.g. FIG. 8). Detection of the motion platform 400 can indicate that the motion platform 400 is positioned in the load position. Alternately, other types of position sensors may be used, such as magnetic sensors for example.

The motion platform apparatus 200 can also include one or more intermediate position sensors 424 and 426. The intermediate position sensors 424 and 426 can be used to detect the location of the motion platform as it travels between the in-use position and the load position. Detection of the motion platform by the intermediate position sensors 424 and 426 may be used to control various components of the motion platform apparatus 200.

For example, the vehicle controller may open the front door 900 in response to detecting that the motion platform has reached the intermediate position sensors 424/426 while travelling from the load position to the in-use position. Similarly, the vehicle controller may close the front door 900 in response to detecting that the motion platform has reached the intermediate position sensors 424/426 while travelling from the in-use position to the load position. This may ensure that the front bay door 900 is closed whenever user loading is occurring.

Vehicle Safety Device

The following is a description of a vehicle safety device that may be used by itself in any motion simulator system or in any combination or sub-combination with any other feature or features disclosed including the motion platform apparatus, the tolerance accommodation member, the track mounting assembly, the platform positioning system, and the movable bay wall.

In accordance with this aspect of the disclosure, a vehicle safety device includes a seat belt that is mounted on a seat belt reel. The vehicle safety device includes a momentum lock that prevents the seat belt from being rapidly extended. The vehicle safety device also includes a momentum lock control unit that can be used to deactivate the momentum lock. This may facilitate rapid loading and unloading of the motion platform apparatus, by allowing users to extend their seat belt quickly for fastening or unfastening. The vehicle safety device also includes a momentum lock position sensor that monitors whether the momentum lock is activated. The vehicle controller can prevent operation of the motion platform apparatus while the momentum lock is deactivated, to prevent he seat belt from being freely extendible while a motion simulation experience is ongoing.

For simplicity, various features of the example vehicle safety device described herein are described in relation to the motion platform apparatus 200. However, it will be appreciated that these features can also be used in respect of other vehicles and motion assemblies, such as rear-mounted or suspension-type motion assemblies.

As shown in FIGS. 32-35, a vehicle safety device can include a seat belt 610 that is matingly engageable with a receiver 630. The seat belt can include a harness or restraint section 612 and an engagement section 614. The receiver 630 can be configured to engage with the engagement section 614 of the seat belt 610.

A user may draw the seat belt 610 across their body with the restraint section 612 positioned in front of their body. The engagement section 614 can then be inserted into the receiver 630. The engagement section 614 can matingly engage receiver 630 to secure the seat belt 610 to the receiver 630. The restraint section 612 can then secure the user within the seat 350.

The vehicle safety device may include a seat belt lock sensor. The seat belt lock sensor may be configured to detect an engaged position of the seat belt engagement section 614. For example, the receiver 630 may include an optical engagement position sensor (e.g. a proximity switch). The engagement position sensor may be used to detect the locking engagement of the engagement section 614 and the receiver 630. Alternately, other sensors such as a toggle switch may be used as the engagement sensor.

The operation of the seat belt 610 can be controlled by a retractor unit 600. The retractor unit 600 can include a seat belt reel 620. The seat belt 610 can be mounted to seat belt reel 620. The seat belt 610, and in particular restraint section 612, can be extended from and retracted by the seat belt reel 620.

The retractor 600 can include a lock unit 650. The lock unit 650 may be adjusted between a locked position (see e.g. FIG. 35) and an unlocked position (see e.g. FIG. 34). In the locked position, the lock unit 650 can inhibit the seat belt 610 from being extended from the seat belt reel 620. This may prevent the seat belt restraint section 612 from loosening rapidly in response to motion of the seating assembly 630 in order to prevent injuries that may result, e.g. whiplash or contusions caused by unrestrained motion. In the unlocked position, the seat belt 610 may be freely movable on the seat belt reel 620. This may facilitate rapid loading and unloading of users from the seating assembly 300, by allowing the users to extend the seat belt easily when seating themselves and buckling or unbuckling the engagement section 614.

Figure 35:
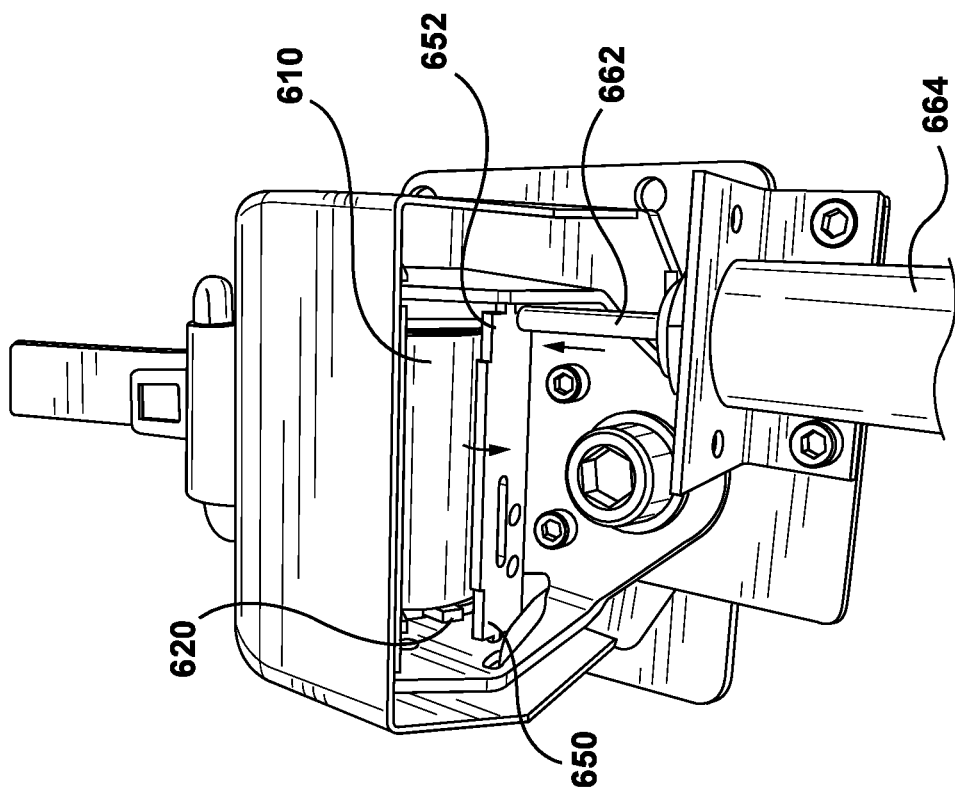
FIG. 35 is a top rear perspective view of the seatbelt realer assembly of FIG. 33 with the realer lock unit in an engaged position in accordance with an embodiment.
Figure 34:
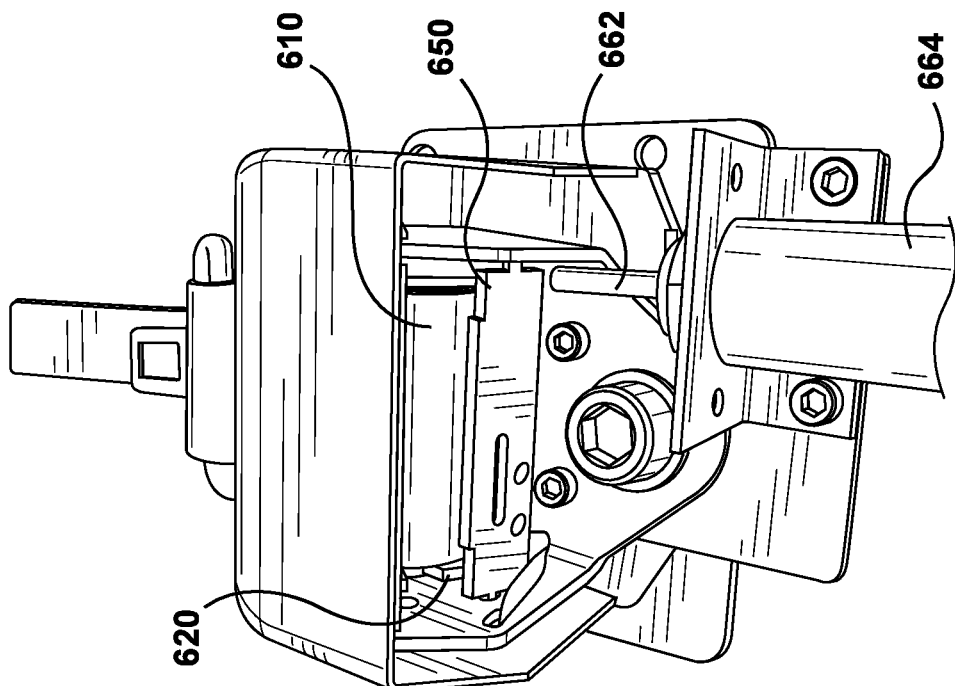
FIG. 34 is a top rear perspective view of the seatbelt realer assembly of FIG. 33 with a realer lock unit in a disengaged position in accordance with an embodiment.

The lock unit 650 can include a lock member 652. The lock member 652 can be configured to lockingly engage the seat belt 610 on the seat belt reel 620. When the lock unit 650 is adjusted to the locked position, the lock member 652 can engage the seat belt 610 and inhibit motion of the seat belt 610 from the seat belt reel 620. As shown in FIG. 35, the lock member 652 can apply force to the restraint section 612 that is mounted on reel 620 to prevent or inhibit motion of the portion of the restraint section 612 that is currently wound about the reel 620.

The retractor 600 can also include a lock control unit 660. The lock control unit 660 can operate to move the lock unit 650 between the locked position and the unlocked position. In some examples, the lock unit 650 may be biased to the locked position. The lock control unit 660 may be configured to deactivate/unlock the lock unit 650.

In the example illustrated, the lock control unit 660 includes a release member 662. The release member 662 is operable to drive the lock member 652 from the locked position to the unlocked position.

In some examples, the lock control unit 660 can include a solenoid 664. The solenoid can be configured to control the operation of the release member 662.

The lock control unit 660 can also include a lock position sensor 670. The lock position sensor 670 can be configured to monitor the position of the lock unit 660. The lock position sensor 670 can be configured to detect whether the lock unit 660 is in the locked position. For example, the lock position sensor 670 may be an optical sensor or mechanical sensor operable to detect the position of the release member 662 and/or lock member 652.

Figure 33:
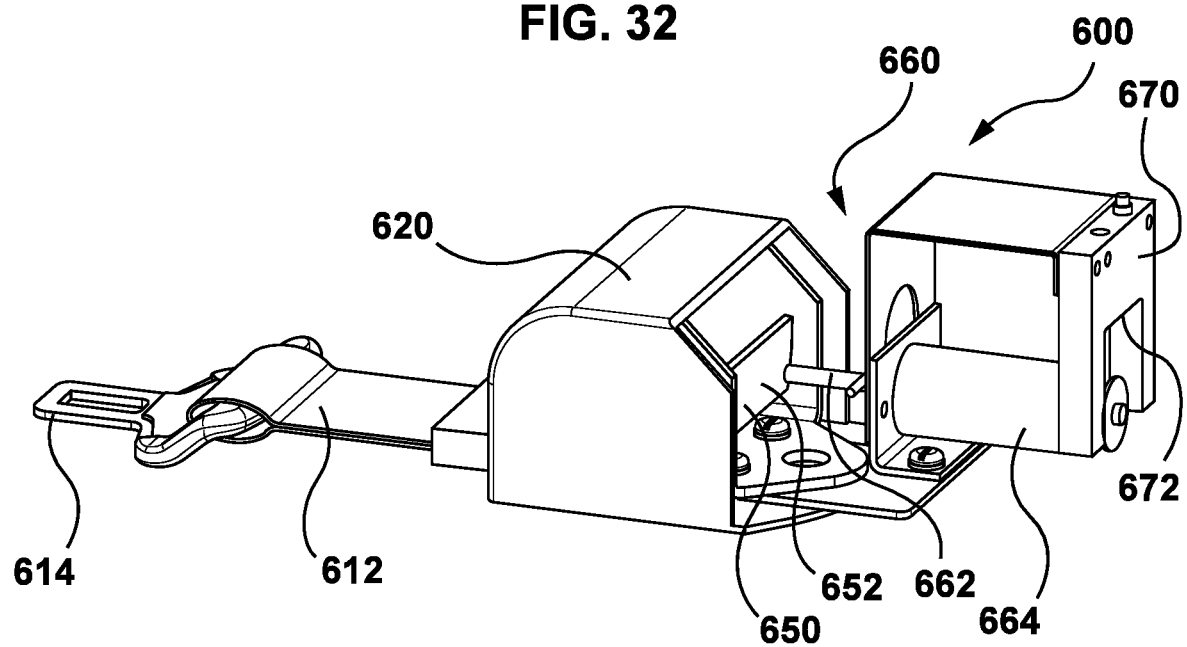
FIG. 33 is a side perspective view of a seat belt realer assembly that may be used with the seatbelt receiver assembly of FIG. 32 in accordance with an embodiment.

Alternately, the lock position sensor 670 can include a solenoid monitoring sensor 672 as in the example illustrated (see e.g. FIG. 33). The lock position sensor 670 may determine the position of the lock unit 600 based on the state of the solenoid 664, as detected by sensor 672. For example, solenoid monitor sensor 672 may be an optical sensor positioned facing solenoid 664.

The lock control unit 660 can be remotely connected to a vehicle controller, e.g. wirelessly or through a wired connection. The vehicle controller may control the operation of a vehicle, such as motion platform apparatus 200, on which the vehicle safety device is installed. The vehicle controller can be configured to transmit control signals to lock control unit 660 to control operation of the lock control unit 660.

The vehicle controller can also communicate with the lock position sensor 670. The lock position sensor 670 can be configured to transmit a lock position signal to the vehicle controller. The lock position signal can indicate whether the lock unit 660 of the corresponding safety device is in the locked position or the unlocked position. The vehicle controller can be configured to prevent operation of the vehicle in response to determining that the lock position signal indicates that the lock unit 660 is in the unlocked position. In some examples, the vehicle controller may prevent operation of the vehicle if the lock unit 660 of any vehicle safety devices provided on the seating assembly 300 are in the unlocked position.

In some examples, the vehicle controller may be configured to identify a vehicle load condition. The vehicle load condition may indicate that users are loading onto or unloading from the vehicle. For example, a vehicle load condition may be identified based on a simulation operator providing an input indicating that loading/unloading of the seating assembly 300 is underway.

The vehicle controller may then transmit a load signal to the lock control unit 660. The lock control unit 660 can be configured to adjust the lock unit 650 to the unlocked position in response to the load signal. This may facilitate more rapid loading/unloading of the vehicle.

The vehicle controller may be configured to identify a vehicle activation condition. The vehicle activation condition may indicate that the user vehicle is to be moved. For example, a vehicle activation condition may be identified based on a simulation operator providing an input indicating that loading of the seating assembly 300 is complete.

The vehicle controller may then transmit a vehicle activation signal to the lock control unit 660. The lock control unit 660 can be configured to adjust the lock unit 650 to the locked position in response to the vehicle activation signal. This may prevent undesired extension of the restraint 612 during operation of the vehicle.

The vehicle controller may be configured to monitor the lock units 650 of each safety device provided on the vehicle. For example, the lock position sensor 670 may continually monitor the position of the seat belt lock unit 650 (e.g. by monitoring a position of the lock member 652, release member 662, or solenoid 664). The lock position sensor 670 can transmit the monitored position of the seat belt lock unit to the vehicle controller. The vehicle controller can prevent the user vehicle from moving in response to the monitored position indicating that at least one of the seat belt lock units 650 is in an unlocked position.

The seating assembly 300 may also include seat occupancy sensors. The seat occupancy sensors can be configured to identify which of the seats 350 are occupied in a given motion simulation experience. For example, optic sensors and/or pressure sensors may be used to detect seat occupancy.

The vehicle controller may use the feedback from the seat occupancy sensors to ensure that the seat belt lock unit 650 for each occupied seat 350 is locked prior to operating the vehicle. This may allow the vehicle controller to activate the vehicle even if some of the seat belt lock units 650 are deactivated, so long as those seats are unoccupied.

When the vehicle controller determines that each of the seat belt lock units 650 is in the locked position, the vehicle controller may then initiate movement of the vehicle from the load position to the in-use position. The lock control unit 660 can be configured to maintain the lock unit 650 in the locked position, or otherwise to not adjust the lock units 650 to the unlocked position, while the motion platform remains in the in-use position.

The vehicle controller may subsequently determine that the user vehicle has returned to the load position. The vehicle controller may then transmit a lock deactivation signal to the lock control unit 660 in response to determining that the user vehicle is in the load position. The lock control unit 660 may then adjust the lock unit 650 to the unlocked position in response to the lock deactivation signal, allowing the seat belt 610 to move freely on the seat belt reel 620. This may promote faster unloading, as input from an operator may not be required to deactivate the lock unit 650.

Movable Bay Wall

The following is a description of a movable bay wall that may be used by itself in any motion simulator system or in any combination or sub-combination with any other feature or features disclosed including the motion platform apparatus, the tolerance accommodation member, the track mounting assembly, the platform positioning system, and the vehicle safety device.

In accordance with this aspect, a user motion apparatus is positioned within a motion bay. The motion bay includes an entranceway that provides users with access to the user motion apparatus. The motion bay can also include a movable wall section. The movable wall section can be moved to cover the entranceway before the motion apparatus is moved between a load position and a ride position. This movable wall section may provide a smooth wall adjacent to the motion assembly that may reduce or avoid pinch points near to the motion assembly. This may reduce the chance of user injury due to hair or limbs being caught as the motion assembly is moved to the ride position. This may also permit the size of the motion bay to be reduced, by allowing the motion assembly to be positioned closer to the outer bay walls.

For simplicity, various features of the example movable bay wall described herein are described in relation to the motion platform apparatus 200. However, it will be appreciated that these features can also be used in respect of other motion assemblies, such as rear-mounted or suspension-type motion assemblies.

A motion bay 100 can enclose one or more motion assemblies that are used to support rider accommodations. As shown in FIGS. 38-51, each motion bays 110 one or more motion platform apparatuses 200 each having a motion platform 400 that supports a seating assembly 300. The seating assembly 300 can include seats for one or more riders of the motion platform apparatus 200.

The motion bay 110 can extend between a bay front end 112 and a bay rear end 114 in a forward-rearward direction 114. The motion bay 110 can also extend between a first lateral bay side 117 and a second lateral bay side 119.

The motion platform 400 can be contained within the enclosure defined by the motion bay 110. The motion platform 400 also has a platform front end 402, a platform rear end 404, a first lateral platform side 403 and a second lateral platform side 405.

The motion bay 110 can include an entranceway 800. The entranceway 800 can be formed in a lateral side 119 of the motion bay 110. The entranceway 800 can be sized to permit riders to enter and exit the motion bay through the entranceway 800.

Figure 39:
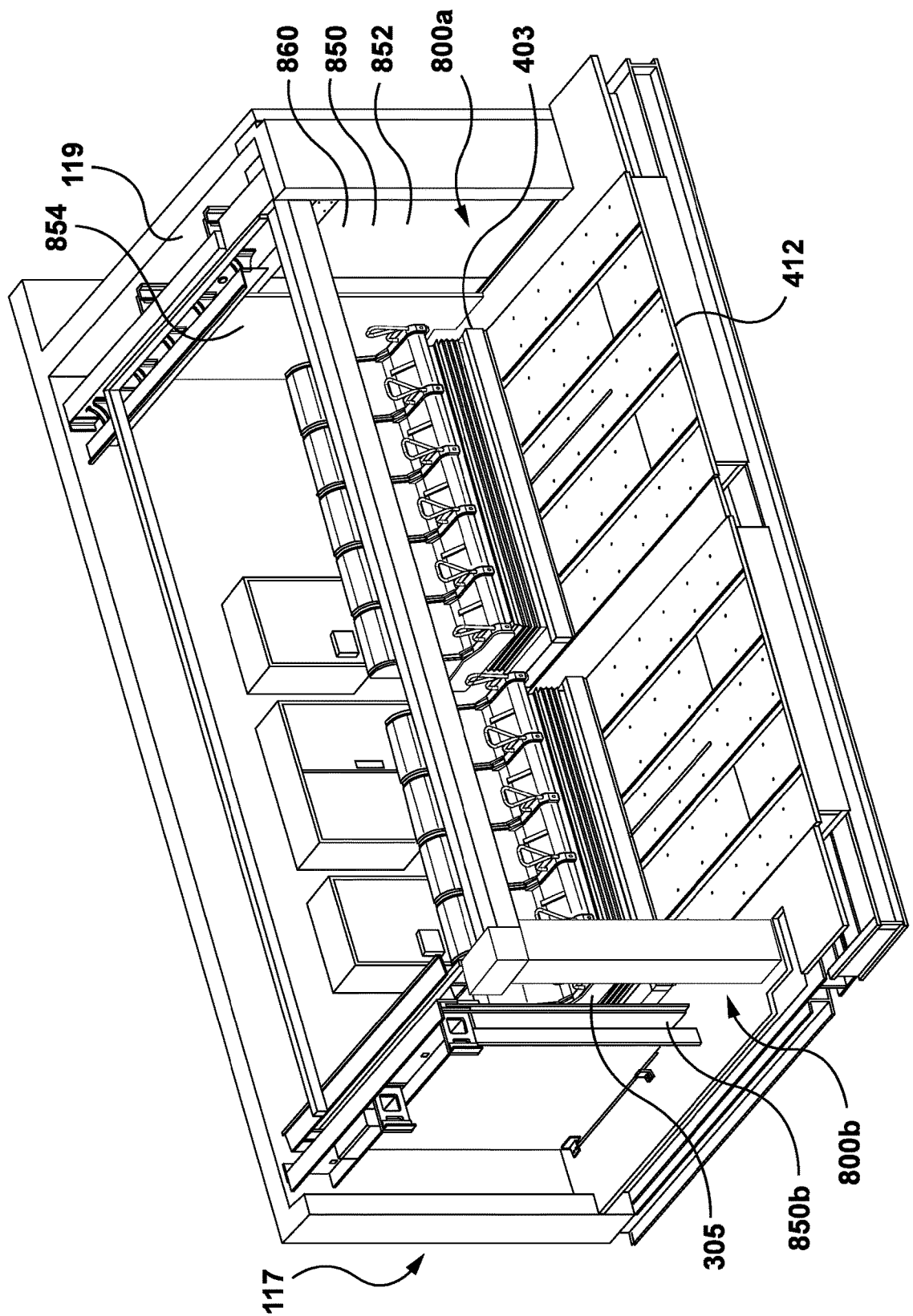
FIG. 39 is a top front perspective view of the seating assembly and bay wall of FIG. 38 with a movable bay wall in a motion position in accordance with an embodiment.
Figure 40:
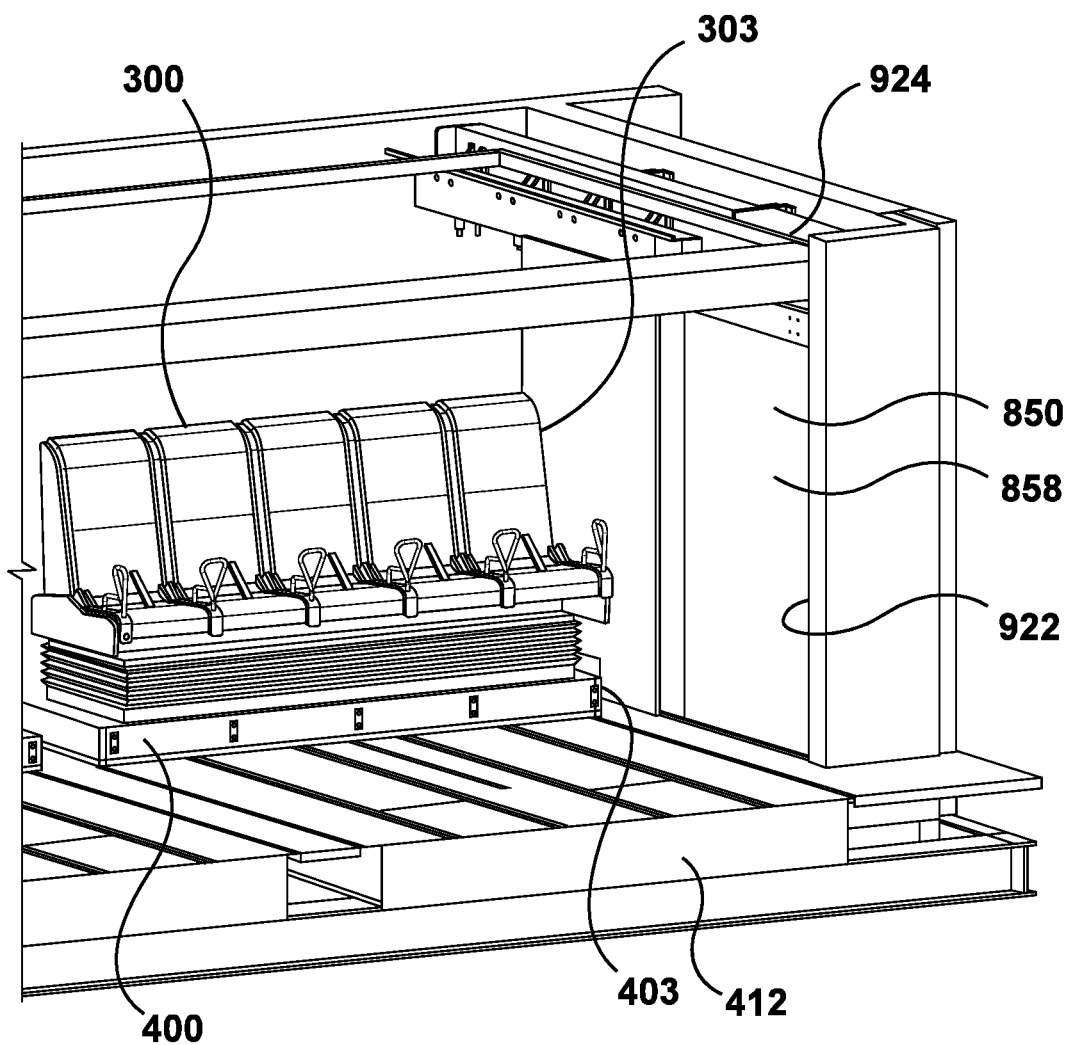
FIG. 40 is a front perspective view of the seating assembly and bay wall of FIG. 38 with the movable bay wall in the motion position.

Optionally, the motion bay 110 may include entranceways 800a and 800b formed on both lateral sides 117 and 119 (see e.g. FIG. 39). This may facilitate rapid loading and unloading of the seating assemblies 300. For example, dual entranceways 800 may facilitate loading through a first entranceway 800a and unloading through a second entranceway 800b. This may facilitate a flow of riders through multiple sessions of a motion simulation experience. Alternately or in addition, dual entranceways 800 may facilitate loading of motion bays 100 having multiple motion platform apparatuses 200.

The motion platform 400 can move along a platform motion path between an in-use position proximate the bay front end 112 and a load position rearward of the in-use position. For example, track 450 can define a platform motion path that extends generally between the track front end 451 and track rear end 453. The entranceway 800 can be positioned to be adjacent to a portion of the platform motion path. For example, the entranceway 800 may be located proximate the bay front end 412 as illustrated.

The motion bay 110 can include a bay wall 850 on the lateral bay side 119. The bay wall 850 can include a movable wall section 852 that is movably mounted on the lateral bay side 119 of motion bay 110 and a fixed wall section 854. The movable wall section 852 can be moved between a wall load position (see e.g. FIGS. 38, 41-45) and a wall motion position (see e.g. FIGS. 39, 40 and 46).

In the wall motion position, the movable wall section 852 defines a continuous wall section 858 adjacent to the first lateral platform side 403. The continuous wall section 858 can separate the motion platform 400 from the entranceway 800. The continuous wall section 858 can be provided to avoid changes in surface texture and pinch points that might otherwise exist if the entranceway is left open when the motion platform 400 is moved. For example, when the bay wall 850 is positioned in the wall motion position, the bay wall 850 may define a substantially continuous wall section extending from the load position of the seating assembly 300 to the bay front end 112. The continuous wall section may engage with the frame 910 that provides the door track.

In the wall load position, the movable wall section 852 can be positioned rearward as compared to the wall motion position. The movable wall section 852 can receded to provide access from the entranceway 800 to the motion platform 400.

In some examples, the movable wall section 852 may be movable only when the motion platform 400 is in the platform load position (e.g. proximate the rear 114 of the motion bay). The movable wall section 852 may be adjustable between the wall load position and the wall motion position when the motion platform 400 is in the load position. This may ensure that the wall section 852 may be positioned in the wall motion position prior to the motion platform 400 being moved to the in-use position.

A vehicle controller can be configured to control movement of the movable wall section 852. The vehicle controller may be configured to move the movable wall section 852 only when the motion platform 400 is in the load position. The vehicle controller may be configured to ensure that the movable wall section 852 is positioned in the extended position whenever the motion platform 400 is not in the load position. That is, the motion platform 400 may only movable between the load position and the in-use position when the bay wall 850 is positioned in the wall motion position. This may ensure that pinch points are avoided while the motion platform 400 and/or seating assembly 300 are in motion.

The movable wall section 852 may permit the motion platform 400 to be positioned close to the lateral side 119 of the motion bay 100 while still providing a safe motion arena for the motion platform 400. This may allow the overall size of the motion bay 110 to be reduced or the user capacity to be increased, which may in turn promote greater overall capacity for a motion simulation venue.

For example, the movable bay wall section 852 may be spaced apart from the first lateral platform side 403 of the motion platform 400 by a wall spacing distance $d_{852}$ (see FIG. 45) less than 18 inches when the bay wall 850 is in the wall load position. In some examples, the movable bay wall section 852 may be spaced apart from the first lateral platform side 403 of the motion platform 400 by a wall spacing distance $d_{852}$ (see FIG. 45) less than 12 inches when the bay wall 850 is in the wall load position.

In the example illustrated, movable wall section 852 may be mounted on a wall track 860. As shown, the track 860 can be provided by a wall support section 830. In the example illustrated, the wall track 860 is an overhead track provided above the movable wall section 852. A wall mounting unit 862 can be used to movably mount the wall section 852 to the track 860. As illustrated by the example of FIG. 50, the wall mounting unit 862 can include a roller 864 that can move along the track 860 between the wall load position and the wall motion position.

The motion bay may also include a wall position sensor 870. The wall position sensor 870 can be configured to monitor a position of the bay wall 850. The wall position sensor 870 may be an optical sensor or other type of sensor arranged to detect the position of the movable wall section 854.

Figure 50:
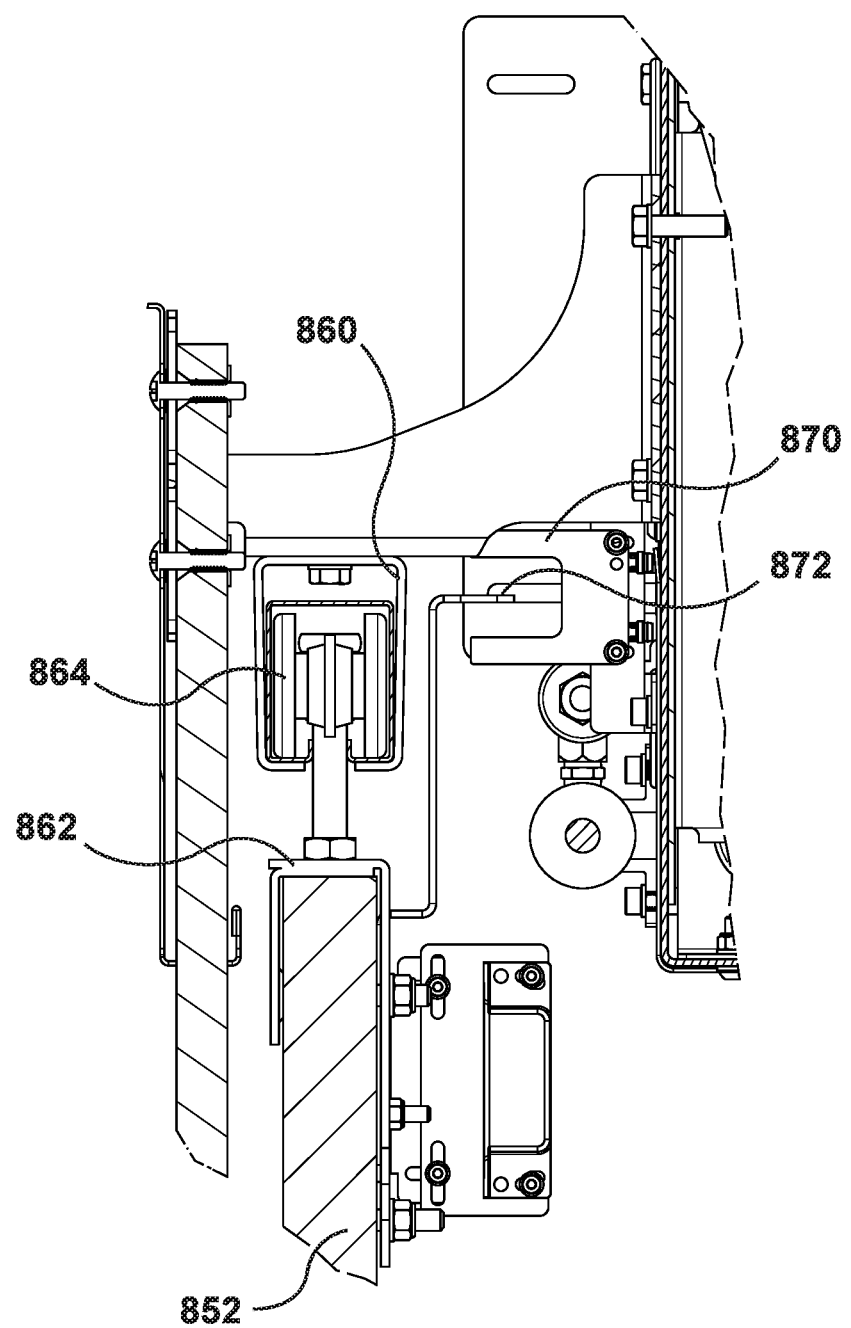
FIG. 50 is a front sectional view of the wall mounting assembly of FIG. 49.
Figure 51:
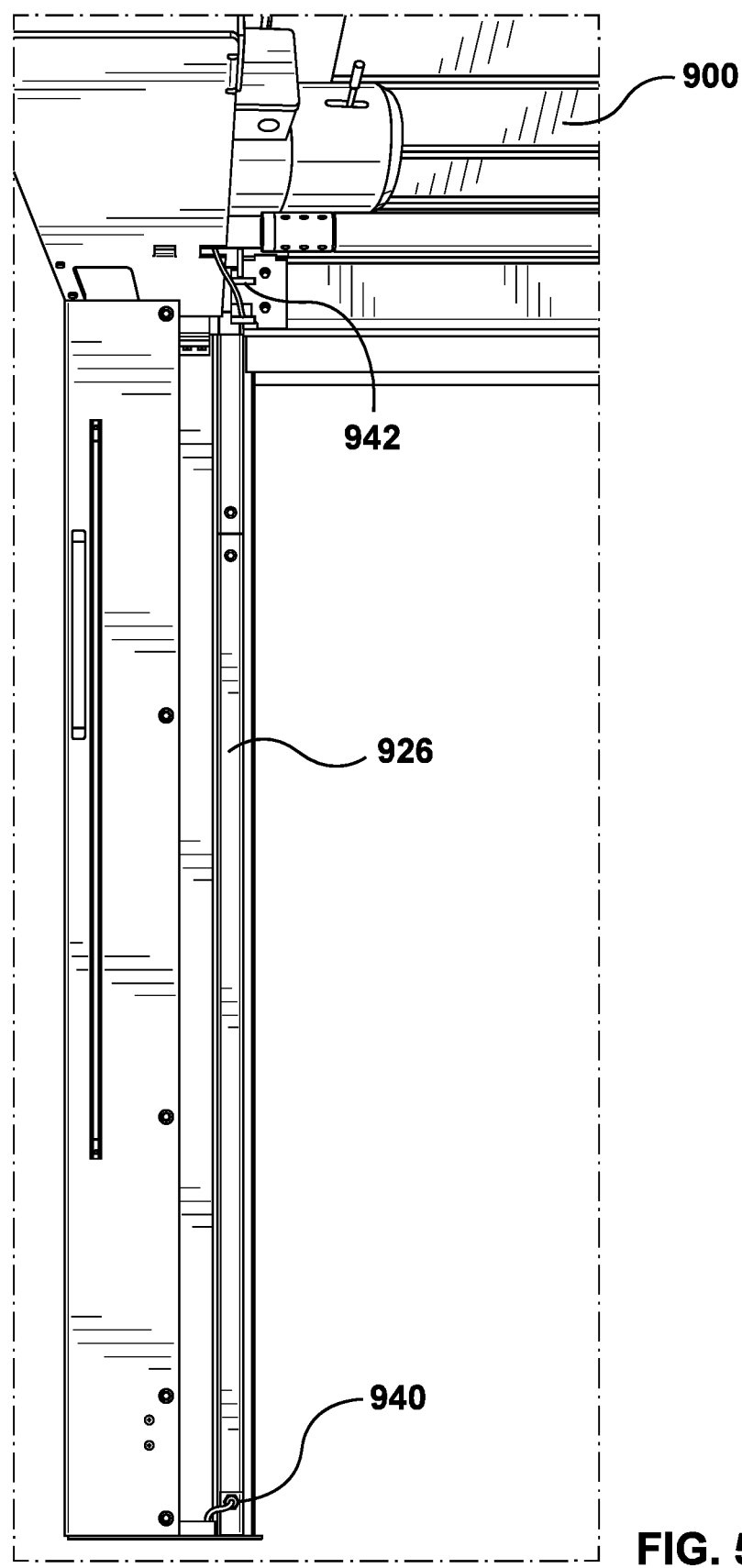
FIG. 51 is a rear perspective view of a door mounting assembly that may be used with the motion platform system of FIG. 5 in accordance with an embodiment.

As shown in FIG. 50, the wall position sensor 870 may be an optical sensor positioned to detect a sensor target 872 mounted to the movable bay wall section 852. The wall position sensor 870 can be positioned proximate to the bay front end 112 (e.g. near the wall motion position) to identify when the movable wall section 854 is in the wall motion position.

The wall position sensor 870 can transmit a wall position signal to a vehicle controller. The vehicle controller can be configured to control operation of the motion platform 400 based on the wall position signal. For example, the vehicle controller may prevent operation of the motion platform 400 unless the wall position sensor 870 detects the motion platform 400 in the wall motion position.

The motion bay 110 may also include a retractable front door 900. The front door 900 may separate the motion bay 110 from a viewing area in front of display 120. The front door 900 may be adjusted between an open position (see e.g. FIG. 5) in which the bay front end 112 is open and a closed position (see e.g. FIG. 6) in which the bay front end 112 is closed by the front door 900.

The front door 900 can be positioned in the closed position during loading and unloading of riders from the seating assembly 300. This may ensure secure loading/unloading and prevent users from falling off the front end 112 of a motion bay 110.

The front door 900 can be moved to the open position to allow the motion platform 400 and seating assembly 300 to be moved forward to the front end 112 of the motion bay 110. This may remove any elements from the sight lines of riders positioned in the seats 350, and thereby provide riders with a more immersive experience. The openable front door 900 may allow the motion bays 110 to omit any front safety railings that may otherwise obscure a user's view of the screen 120.

In the example illustrated, the front door 900 is mounted on a frame 910. The frame 910 includes a track 920 along which the front door 900 is movable. The front door 900 can move along track 920 between the open position and the closed position.

The door track 920 can include an overhead track section 924 and a front track section 926. The door 900 can transition between the overhead track section 924 and the front track section 926 as the door moves between the open position and the closed position.

The front door 900 may include variable opening/closing rates for transitioning between the open and closed positions. The front door 900 may also be configured to begin and end the opening/closing motion at reduced rates of speed, to provide a soft close effect for the riders.

Optionally, the door 900 may open and close at different rates. The door 900 may transition from the closed position to the open position at a faster rate than transitioning from the open position to the closed position. This may facilitate opening the door 900 as the motion platform 400 is already in motion from the load position to the ride position. This may provide users with a more immersive experience by emphasizing the synchronization between the motion platform 400 and door 900.

For example, the door 900 may transition from the closed position to the open position in about 2-4 seconds, and about 2-3 second in some cases. The door 900 may transition from the open position to the closed position in about 3-7 seconds, and about 4-5 second in some cases.

The bay wall 850 and the retractable front door 900 can also share a track support section 830. As illustrated, the track support section 830 can include an upper portion that includes the overhead section 926 of the door track and a lower portion that includes the wall track 860.

Figure 41:
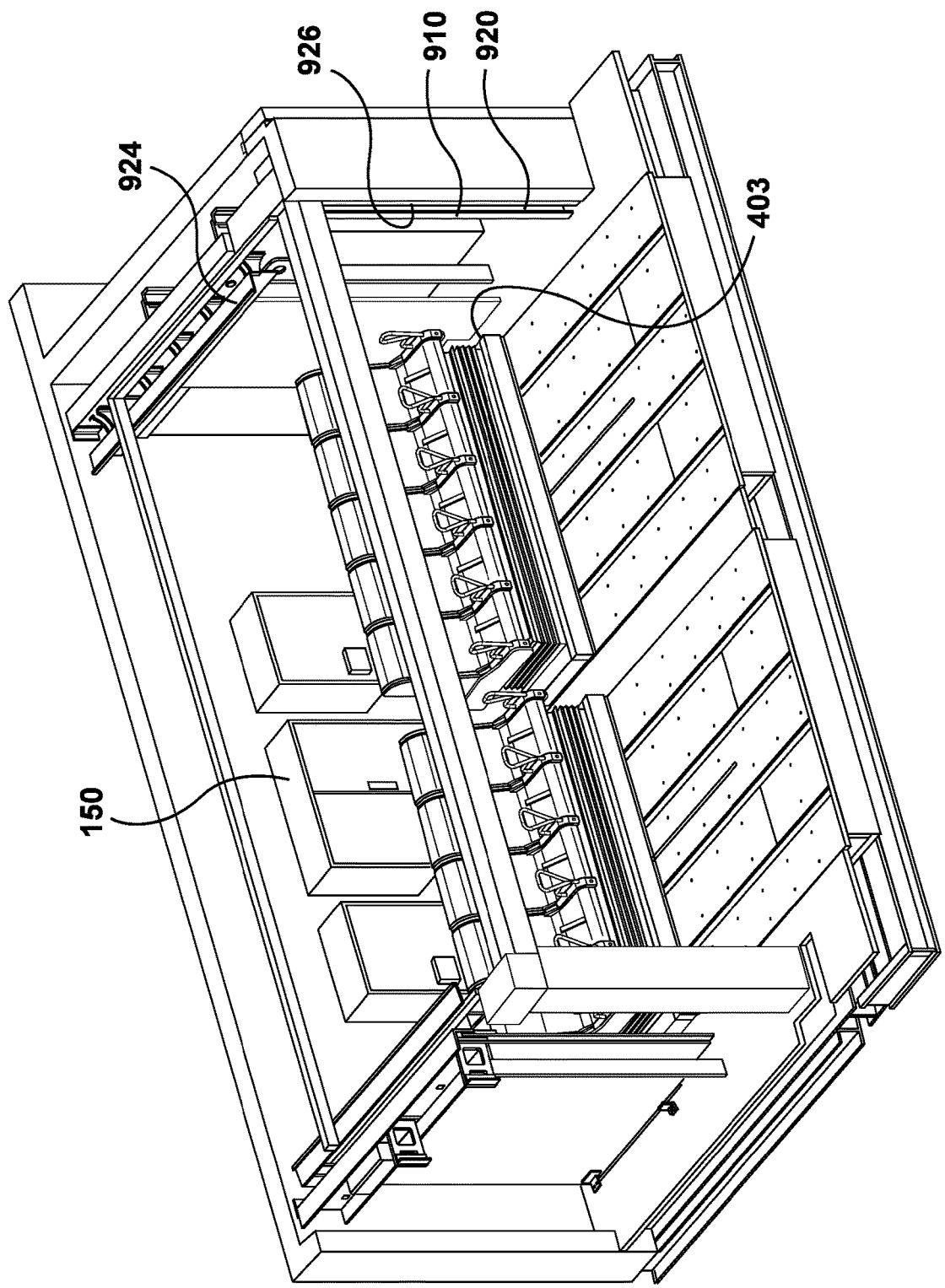
FIG. 41 is a top front perspective view of the seating assembly and bay wall of FIG. 38 with a movable bay wall in a load position in accordance with an embodiment.
Figure 42:
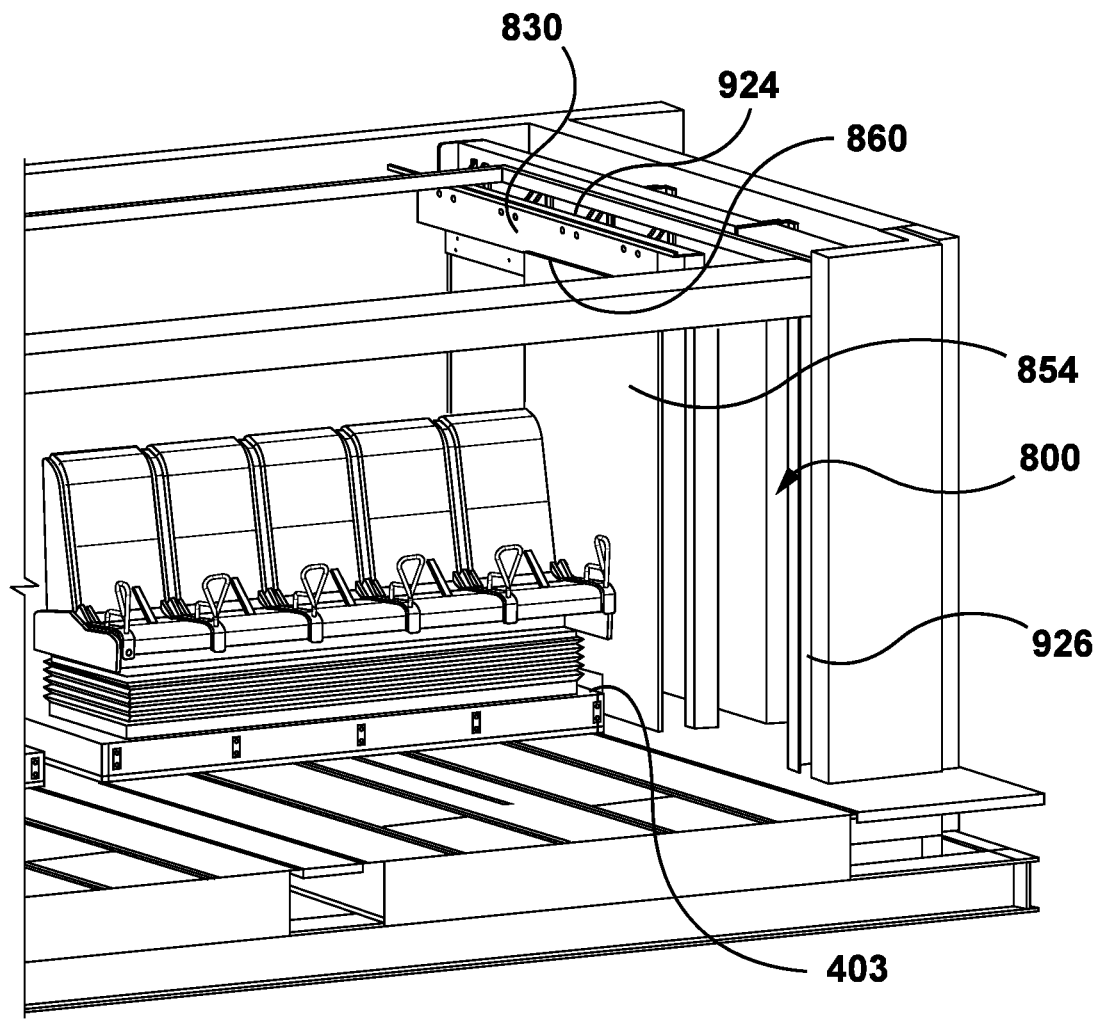
FIG. 42 is a front perspective view of the seating assembly and bay wall of FIG. 38 with the movable bay wall in the load position.
Figure 43:
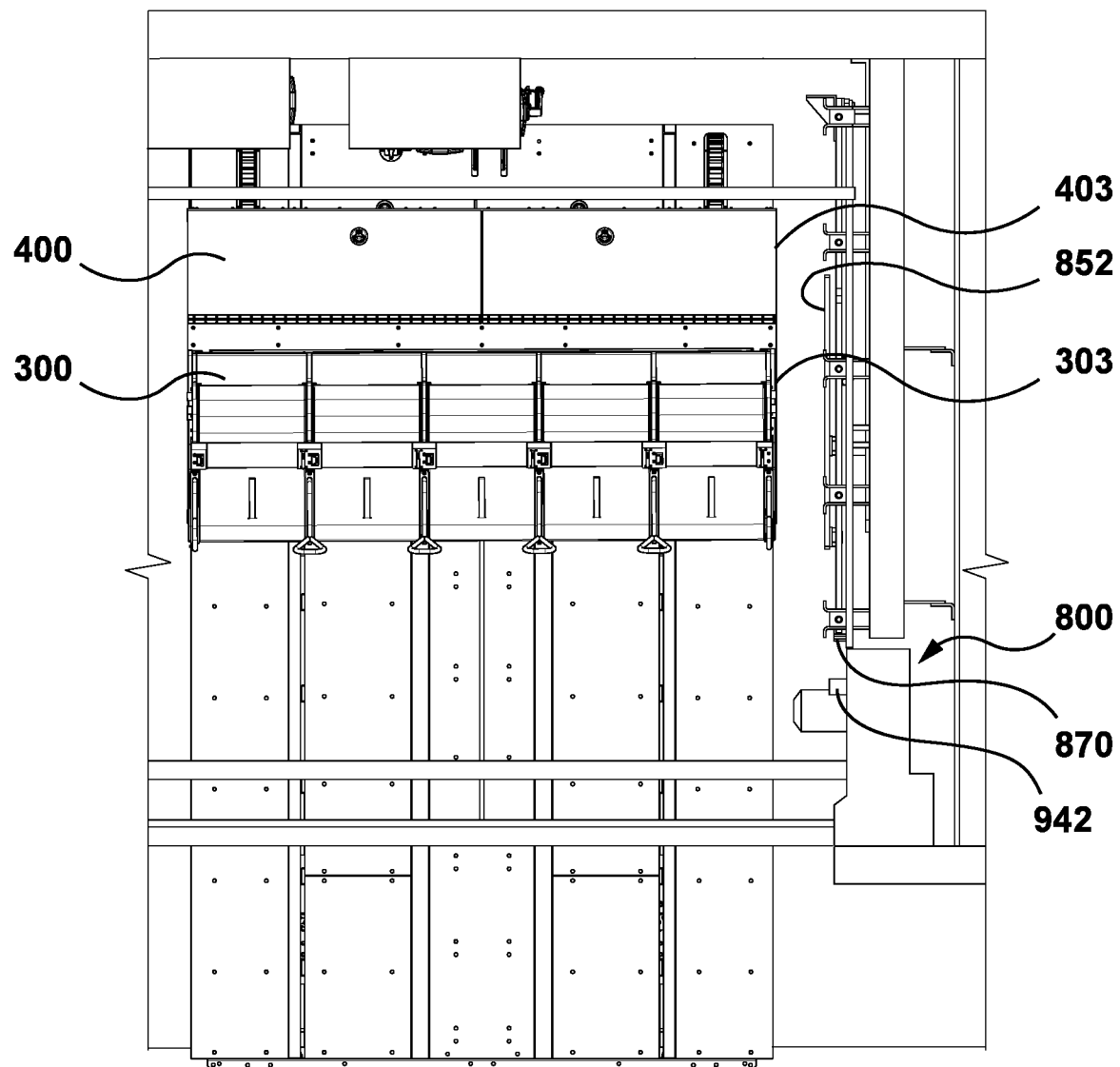
FIG. 43 is a top view of the seating assembly and bay wall of FIG. 38 with the movable bay wall in the load position.
Figure 44:
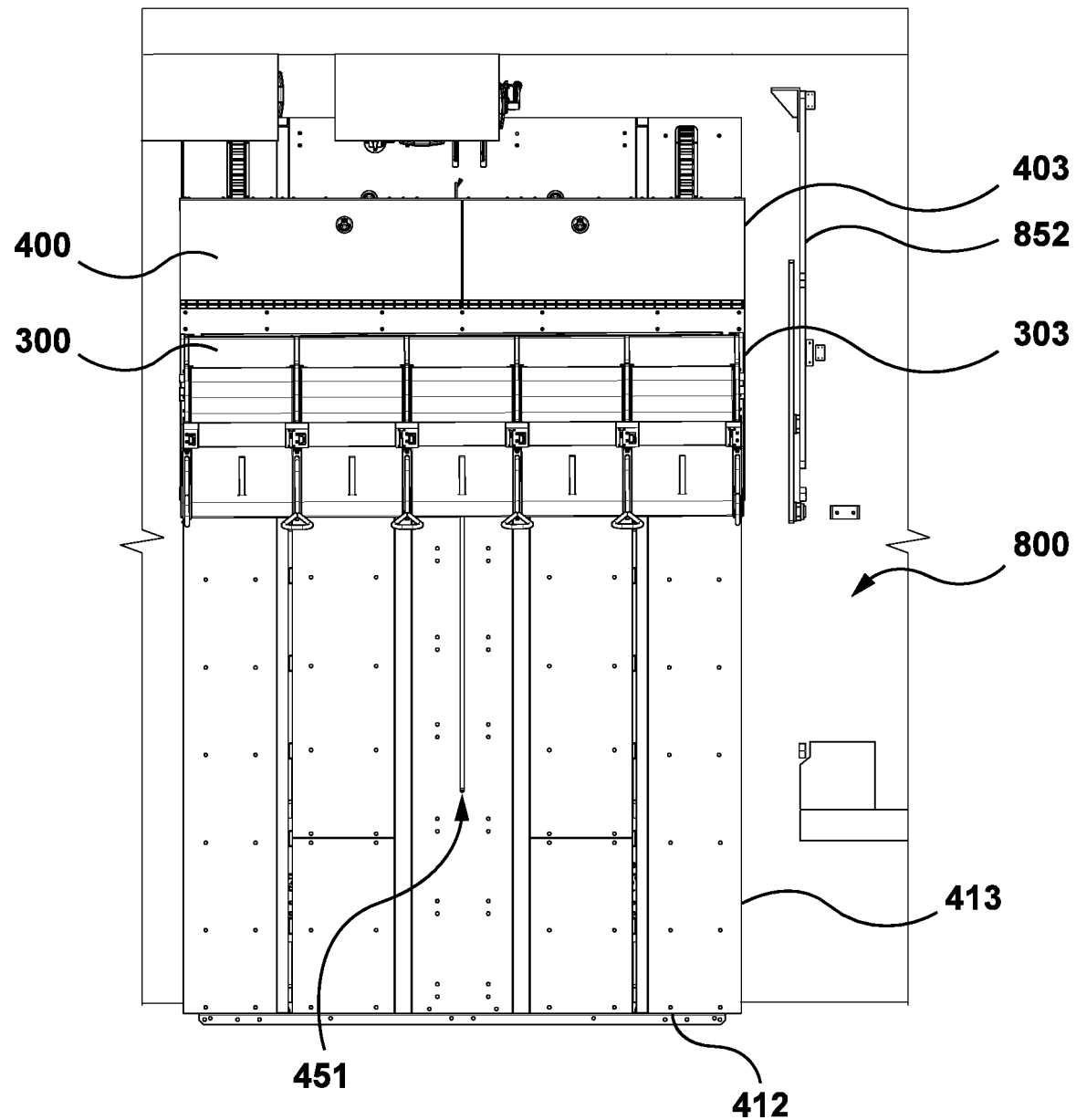
FIG. 44 is a top view of the seating assembly and bay wall of FIG. 38 with the movable bay wall in the load position and a track support assembly omitted in accordance with an embodiment.
Figure 45:
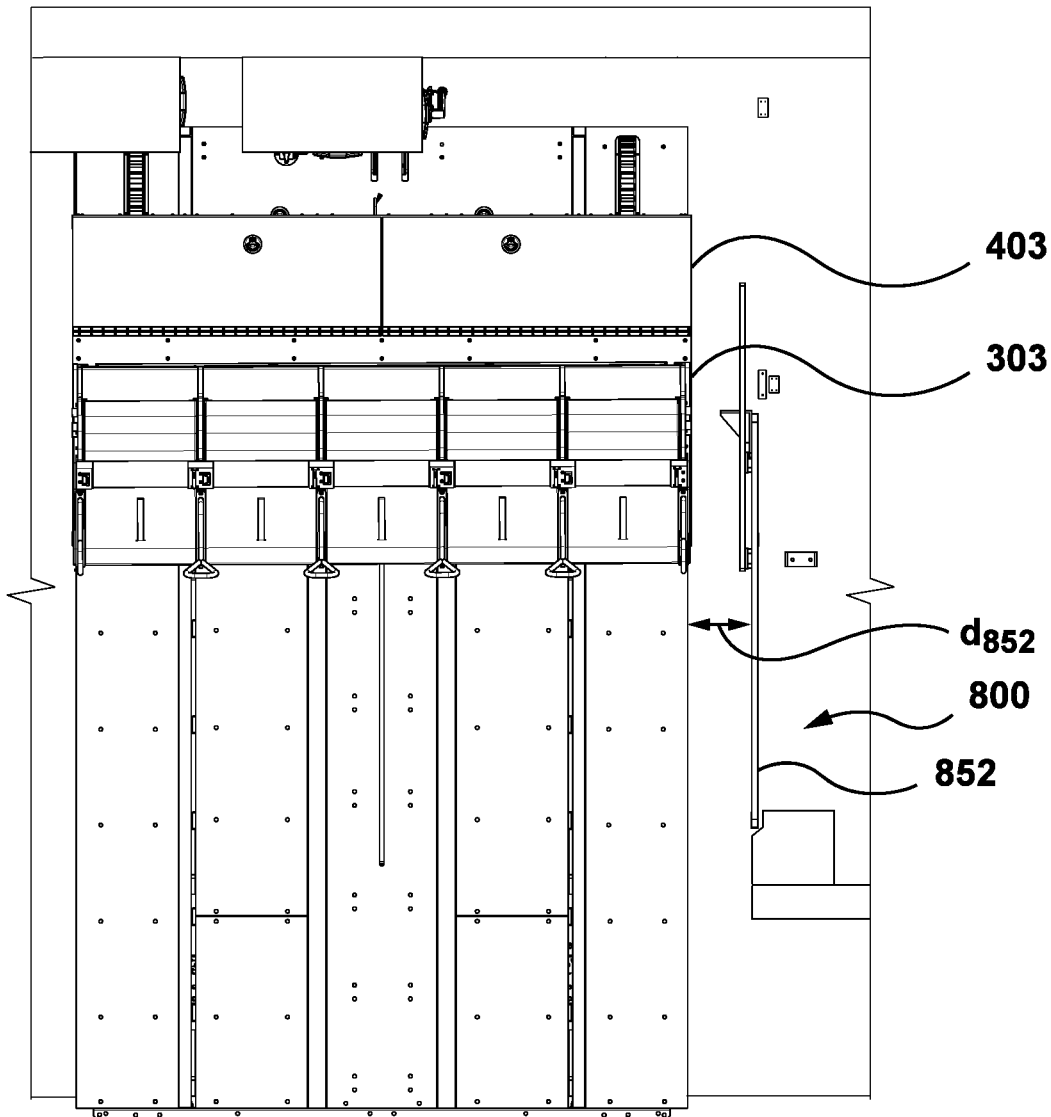
FIG. 45 is a top view of the seating assembly and bay wall of FIG. 38 with the movable bay wall in the motion position and a track support assembly omitted in accordance with an embodiment.
Figure 46:
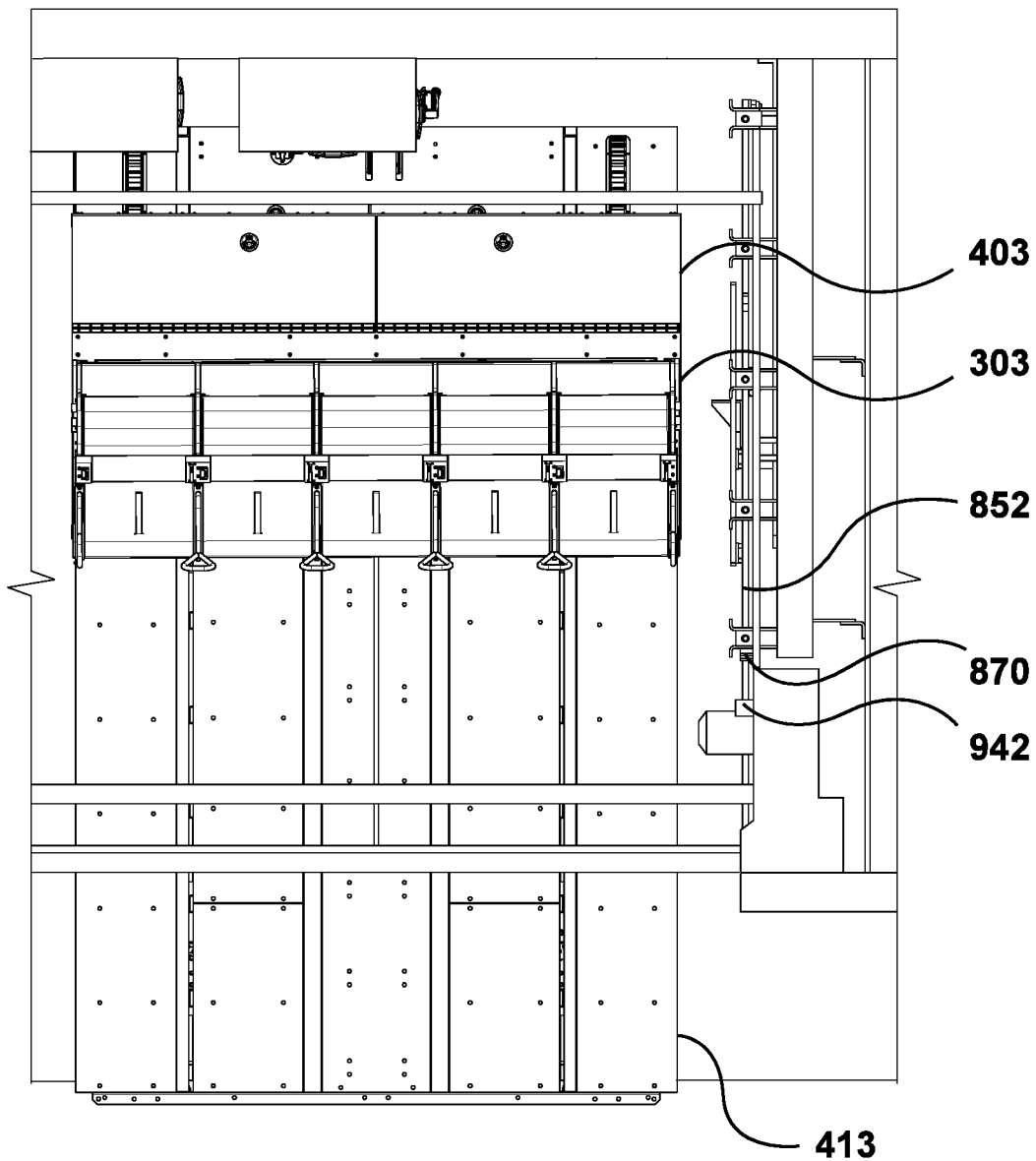
FIG. 46 is a top view of the seating assembly and bay wall of FIG. 38 with the movable bay wall in the motion position.
Figure 47:
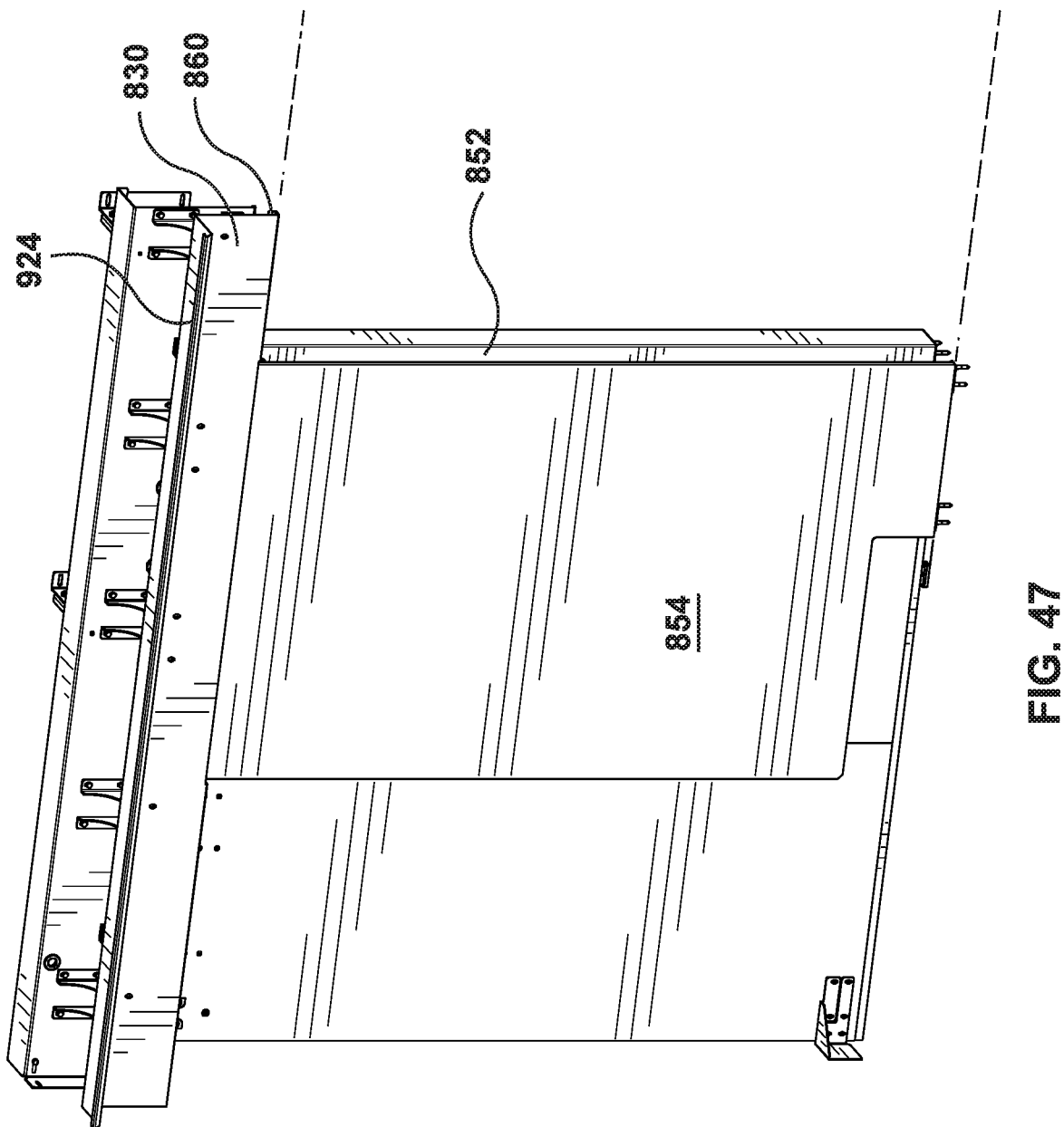
FIG. 47 is a side perspective view of the bay wall and track support assembly of FIG. 38 with the movable bay wall in the load position in accordance with an embodiment.
Figure 48:
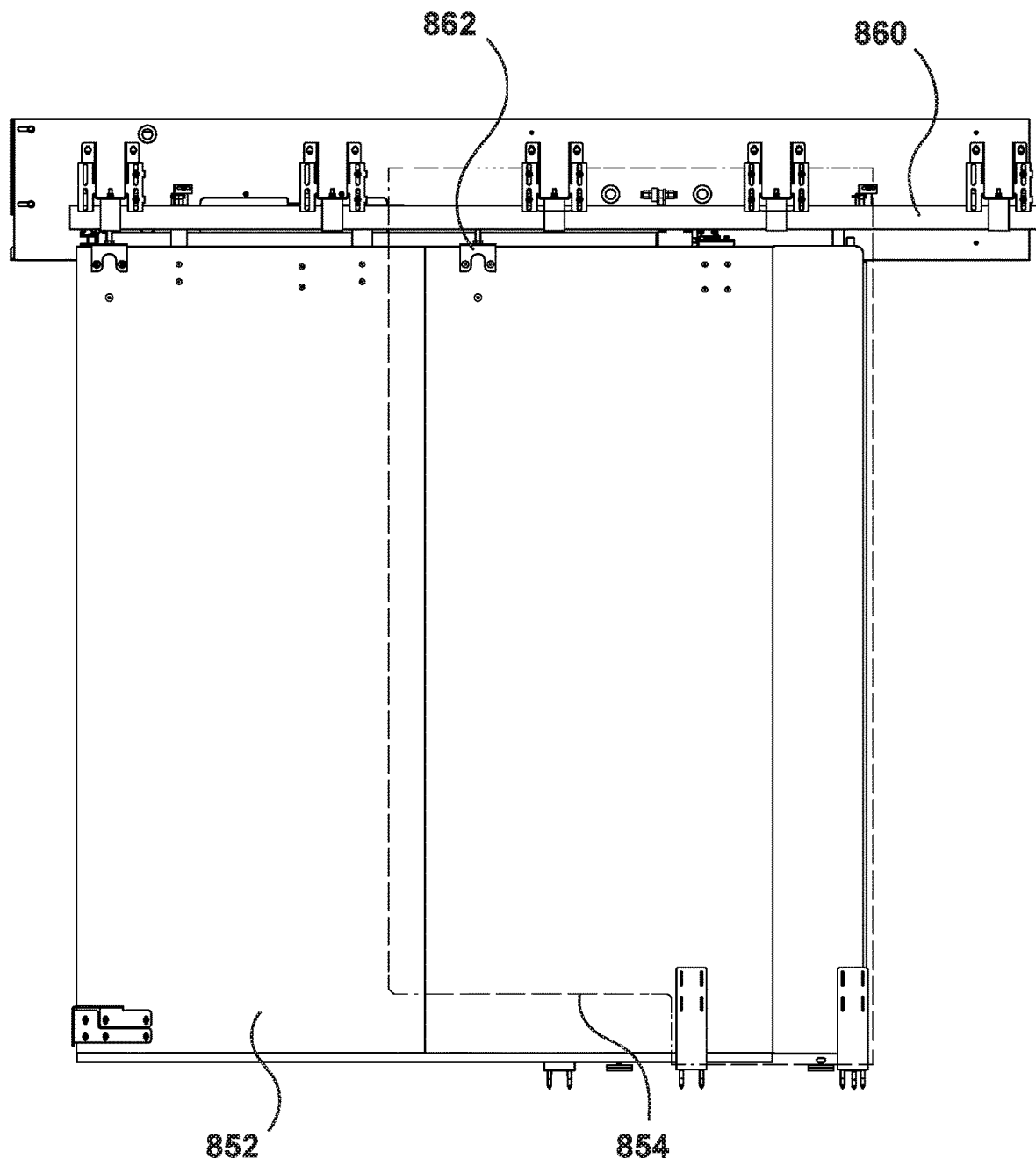
FIG. 48 is a side view of the bay wall of FIG. 38 with the movable bay wall in the load position and a fixed wall section omitted in accordance with an embodiment.
Figure 49:
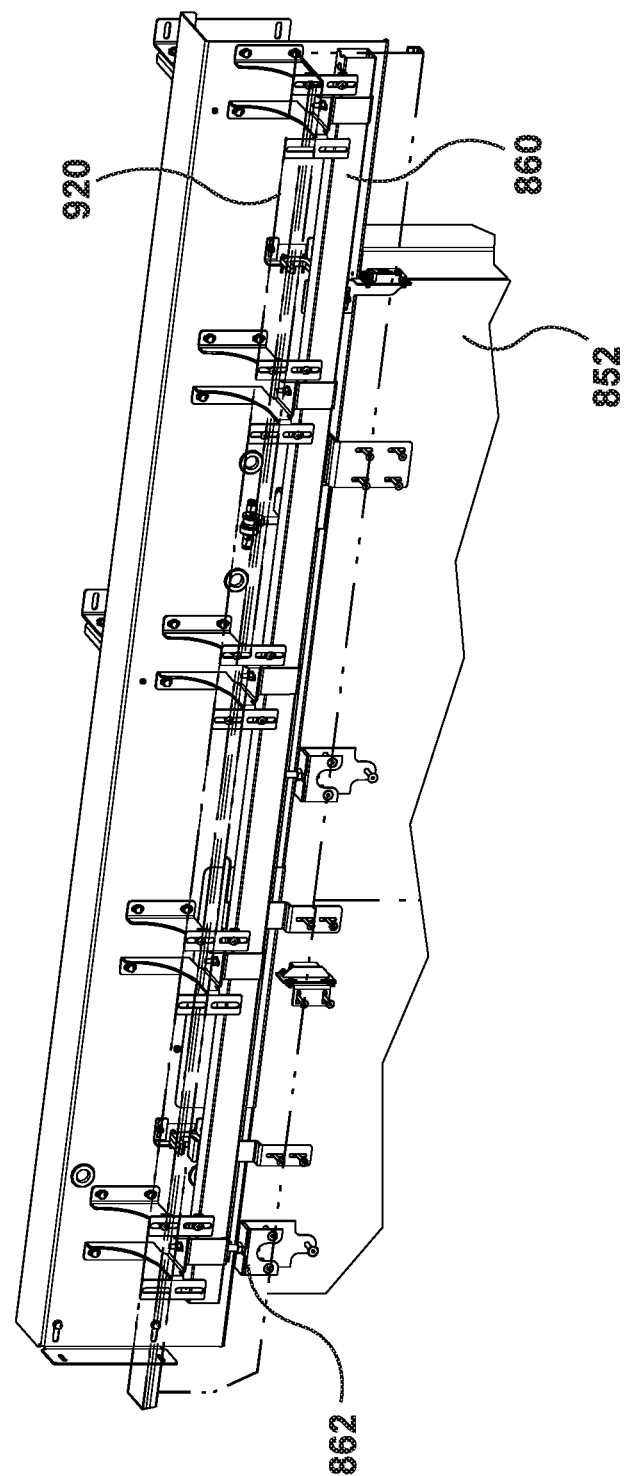
FIG. 49 is a perspective view of an example wall mounting assembly that may be used with the bay wall of FIG. 48 in accordance with an embodiment.

The frame 910 can include a track guard section 922 (see e.g. FIG. 41). The track guard section 922 can enclose the front track section 926 and prevent the bay wall section 854 from contacting the front track section 926 when the front door 900 is mounted on the front track section 926. When the bay wall section 854 is moved to the closed position, the bay wall section 854 may engage the front door track section 926.

The vehicle controller may also include a door control unit. The door control unit may be configured to control the operation of the front door 900. For example, the door control unit may control the operation of the front door 900 based on the position of the motion platform 400.

The door control unit can also communicate with the wall position sensor 870. The door control unit may be configured to prevent the front door 900 from opening when the bay wall 850 is in the wall load position. This may ensure that users cannot fall from the bay front end 112 during loading/unloading.

The motion bay 110 can also include one or more front door position sensor. The door position sensor(s) can be configured to monitor a position of the front door. The door position sensor(s) may operate to determine when the front door 900 is in the open or closed position. For example, the motion bay 110 can include a door closed sensor 940 and a door open sensor 942.

The vehicle controller may also include a wall control unit in communication with the front door position sensor 940. The wall control unit may be configured to prevent the bay wall 850 from moving towards the wall load position unless the front door 900 is in the closed position.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A motion simulation system comprising:
(a) a display screen;
(b) a plurality of rider motion apparatuses, wherein each rider motion apparatus is configured to support at least one rider accommodation, and each rider motion apparatus is positionable in a ride position with the at least one rider accommodation facing the display screen;
(c) a plurality of motion bays, wherein each motion bay extends between a bay front end that is closer to the display screen than a bay rear end of that bay in a forward-rearward direction, and the bay front end of each motion bay is positioned facing the display, wherein each motion bay encloses a bay set of rider motion apparatuses that includes at least one of the rider motion apparatuses from the plurality of rider motion apparatuses; and
(d) a controller coupled to the display and to the motion bays, wherein the controller is configured to provide a motion simulation experience by:
positioning a set of rider motion apparatuses in the ride position, wherein the set of rider motion apparatuses includes at least some of the rider motion apparatuses from the plurality of rider motion apparatuses;
providing a visual display on the display screen, wherein the visual display is visible from each and every rider accommodation when the rider motion apparatus corresponding to that rider accommodation is positioned in the ride position; and
controlling motion of the rider accommodations during the visual display to move the rider accommodations supported by the set of rider motion apparatuses in a defined motion sequence, wherein the defined motion sequence is coordinated with the visual display provided on the display screen;
wherein
when at least one of the rider motion apparatuses is in an inactive state, a subset of the rider motion apparatuses is provided which comprises all of the rider motion apparatuses except the at least one of the rider motion apparatuses in the inactive state, the controller is configured to determine that the at least one of the rider motion apparatuses is in the inactive state and the controller is configured to actuate the subset of the rider motion apparatuses.

2. The motion simulation system of claim 1, wherein the controller is configured to determine that a particular rider motion apparatus is in the inactive state when the particular rider motion apparatus is at least one of nonoperational and unoccupied.

3. The motion simulator system of claim 1, wherein:
(a) each rider motion apparatus is adjustable between a load position and the ride position, wherein in the load position the rider motion apparatus is fully enclosed within the corresponding motion bay, and in the ride position a front end of the rider motion apparatus extends outward from the bay front end; and
(b) the controller is configured to position only the subset of rider motion apparatuses in the ride position.

4. The motion simulator system of claim 1, wherein:
(a) each motion bay comprises an openable front door positioned at the bay front end, wherein the front door is adjustable between an open position and a closed position, wherein when the front door is in the open position the bay front end is open and the display is visible from an interior of the motion bay, and when the front door is in the closed position the bay front end is closed;
(b) at least one motion bay is in an inactive bay state in which all of the rider motion apparatuses in that motion bay are in the inactive state; and
(c) the controller is configured to adjust the front door of the motion bays corresponding to the subset of rider motion apparatuses to the open position and to retain the front door of any motion bays in the inactive bay state in the closed position.

5. The motion simulation system of claim 1, wherein the plurality of motion bays comprises a plurality of vertically stacked motions bays, wherein the plurality of vertically stacked motions bays comprises a first motion bay and a second motion bay, and the first motion bay is above the second motion bay.

6. The motion simulation system of claim 5, wherein:
(a) each motion bay extends between a first lateral bay side and a second lateral bay side in a lateral direction; and,
(b) the plurality of motion bays comprises a plurality of laterally stacked motions bays, wherein the plurality of laterally stacked motions bays comprises the first motion bay and a third motion bay, and the first lateral bay side of the first motion bay is adjacent to the second lateral bay side of the third motion bay in the lateral direction.

7. The motion simulation system of claim 5, wherein the bay front end of the first motion bay is forward of the bay front end of the second motion bay.

8. The motion simulation system of claim 5, wherein
(a) the second motion bay comprises an extension member that extends laterally across the bay front end of the second motion bay above the at least one rider motion apparatus enclosed by that motion bay; and
(b) the extension member extends outwardly from the bay front end of the second motion bay whereby the extension member is positioned to catch debris falling from the second motion bay.

9. The motion simulation system of claim 1, wherein:
(a) each motion bay extends between a first lateral bay side and a second lateral bay side in a lateral direction; and,
(b) the plurality of motion bays comprises a plurality of laterally stacked motions bays, wherein the plurality of laterally stacked motions bays comprises a first motion bay and a second motion bay, and the first lateral bay side of the first motion bay is adjacent to the second lateral bay side of the second motion bay in the lateral direction.

10. The motion simulation system of claim 1, wherein
   (a) each motion bay comprises an extension member that extends laterally across the bay front end of that motion bay above the at least one rider motion apparatus enclosed by that motion bay; and
   (b) the extension member comprises a feature delivery system positioned to face that motion bay, wherein the feature delivery system is configured to direct at least one of a fluid element and a scent element towards the at least one rider motion apparatus enclosed by that motion bay.

11. The motion simulation system of claim 1, wherein each rider accommodation is positioned forward of the bay front end of the corresponding motion bay when the corresponding rider motion apparatus is positioned in the ride position.

12. The motion simulation system of claim 1, wherein the motion simulation system omits any visual obstructions between the display and each rider accommodation in each motion bay when the rider motion apparatus corresponding to that rider accommodation is positioned in the ride position.

13. The motion simulation system of claim 1, wherein each rider motion apparatus comprises:
   (a) a fixed base having a front end and a rear end, the base comprising an upper base surface and a track, wherein the upper base surface extends between the front end and the rear end in a forward-rearward direction and the track extends in the forward-rearward direction;
   (b) a motion platform that extends between a platform front end and a platform rear end in the forward-rearward direction, wherein the motion platform is movably mounted on the track and the motion platform is movable along the track in the forward-rearward direction; and
   (c) a seating assembly that is mounted on the motion platform, wherein the seating assembly comprises at least one user seat having a seat base and a seat back, wherein each seat base extends between a seat front end and a seat rear end in the forward-rearward direction, and the at least one rider accommodation is defined by the at least one user seat.

14. A non-transitory computer readable medium having computer-executable instructions stored thereon for configuring a processor to perform a method of controlling a motion simulation system comprising a display screen, a plurality of rider motion apparatuses, wherein each rider motion apparatus is configured to support at least one rider accommodation, and each rider motion apparatus is positionable in a ride position with the at least one rider accommodation facing the display screen, and a plurality of motion bays wherein each motion bay encloses a bay set of rider motion apparatuses that includes at least one of the rider motion apparatuses from the plurality of rider motion apparatuses, wherein the method comprises:
   (a) positioning a set of rider motion apparatuses in the ride position, wherein the set of rider motion apparatuses includes at least some of the rider motion apparatuses from the plurality of rider motion apparatuses;
   (b) providing a visual display on the display screen, wherein the visual display is visible from each and every rider accommodation when the rider motion apparatus corresponding to that rider accommodation is positioned in the ride position; and
   (c) controlling motion of the rider accommodations during the visual display to move the rider accommodations supported by the set of rider motion apparatuses in a defined motion sequence, wherein the defined motion sequence is coordinated with the visual display provided on the display screen;
   (d) determining that at least one of the rider motion apparatuses is in an inactive state whereby a subset of the rider motion apparatuses is provided which comprises all of the rider motion apparatuses except the at least one of the rider motion apparatuses in the inactive state; and
   (e) actuating only the subset of the rider motion apparatuses in response to determining that the at least one of the rider motion apparatuses is in the inactive state, wherein the subset excludes the at least one of the rider motion apparatuses in the inactive state.

15. The computer readable medium of claim 14, wherein the method further comprises:
   (a) determining that a particular rider motion apparatus is in the inactive state when the particular rider motion apparatus is at least one of nonoperational and unoccupied.

16. The computer readable medium of claim 14, wherein:
   (a) each rider motion apparatus is adjustable between a load position and the ride position, wherein in the load position the rider motion apparatus is fully enclosed within the corresponding motion bay, and in the ride position a front end of the rider motion apparatus extends outward from the bay front end; and
   (b) the method further comprises positioning only the subset of rider motion apparatuses in the ride position.

17. The computer readable medium of claim 14, wherein:
   (a) each motion bay comprises an openable front door positioned at the bay front end, wherein the front door is adjustable between an open position and a closed position, wherein when the front door is in the open position the bay front end is open and the display is visible from an interior of the motion bay, and when the front door is in the closed position the bay front end is closed; and
   (b) the method further comprises:
      i) determining that at least one motion bay is in an inactive bay state in which all of the rider motion apparatuses in that motion bay are in the inactive state; and
      ii) adjusting the front door of the motion bays corresponding to the subset of rider motion apparatuses to the open position and retaining the front door of any motion bays in the inactive bay state in the closed position.

* * * * *